US012637382B2

(12) United States Patent
Bomba et al.

(10) Patent No.: US 12,637,382 B2
(45) Date of Patent: May 26, 2026

(54) GLASS PARTS AND GOB-PRESSING METHODS FOR MAKING SUCH

(71) Applicant: CORNING INCORPORATED, Corning, NY (US)

(72) Inventors: Richard Dominic Bomba, Rochester, NY (US); Cyril Rémy André Dedieu, Hericy (FR); Arnaud Dominique Dejean, Vaux le Penil (FR); Allan Mark Fredholm, Vulaines sur Seine (FR); Anne-Claire Jeanson, Avon (FR); David John McEnroe, Wellsville, NY (US); Mathieu Mondésir, Egreville (FR); Galan Gregory Moore, Henrietta, NY (US); Aniello Mario Palumbo, Painted Post, NY (US); David Sampaio, Nemours (FR); Thomas Matthew Sonner, Corning, NY (US); Joseph William Soper, Arkport, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/331,605

(22) Filed: Sep. 17, 2025

(65) Prior Publication Data

US 2026/0008711 A1     Jan. 8, 2026

Related U.S. Application Data

(63) Continuation of application No. PCT/US2025/024044, filed on Apr. 10, 2025, which
(Continued)

(51) Int. Cl.
*C03B 11/08* (2006.01)
*C03C 3/083* (2006.01)

(52) U.S. Cl.
CPC .......... *C03B 11/08* (2013.01); *C03B 2215/40* (2013.01); *C03C 3/083* (2013.01)

(58) Field of Classification Search
None
See application file for complete search history.

(56) References Cited

U.S. PATENT DOCUMENTS

| | | |
|---|---|---|
| 4,329,400 A | 5/1982 | Ference et al. |
| 4,336,303 A | 6/1982 | Rittler |

(Continued)

FOREIGN PATENT DOCUMENTS

| | | |
|---|---|---|
| CA | 2108002 A1 | 8/1993 |
| CN | 107522404 B | 12/2019 |

(Continued)

OTHER PUBLICATIONS

International Search Report and Written Opinion of the International Searching Authority; PCT/US2025/024044; mailed on Jul. 8, 2025, 17 pages; Commissioner for Patents.
(Continued)

*Primary Examiner* — Lisa L Herring
(74) *Attorney, Agent, or Firm* — Russell S. Magaziner

(57)     ABSTRACT

The present disclosure is directed to methods and techniques for gob-pressing a glass part of challenging geometries, such as large surfaces with thin thickness as well as features positioned far from a centroid of the part.

19 Claims, 48 Drawing Sheets

Related U.S. Application Data is a continuation of application No. 19/028,587, filed on Jan. 17, 2025, now Pat. No. 12,441,645, which is a continuation-in-part of application No. 18/677,404, filed on May 29, 2024, now Pat. No. 12,234,175.

(60) Provisional application No. 63/722,385, filed on Nov. 19, 2024, provisional application No. 63/634,535, filed on Apr. 16, 2024.

(56) References Cited

U.S. PATENT DOCUMENTS

| | | | |
|---|---|---|---|
| 5,192,353 | A | 3/1993 | Trentelman |
| 5,213,603 | A | 5/1993 | Giles et al. |
| 5,549,100 | A | 8/1996 | Thomas et al. |
| 5,766,293 | A | 6/1998 | Gearing |
| 5,931,152 | A | 8/1999 | Fafet et al. |
| 6,030,829 | A | 2/2000 | Dannoux et al. |
| 6,067,819 | A | 5/2000 | Tanaka et al. |
| 7,157,149 | B2 | 1/2007 | Belykh et al. |
| 7,721,572 | B2 | 5/2010 | Taplan et al. |
| 7,845,192 | B2 | 12/2010 | Murakami |
| 8,656,734 | B2 | 2/2014 | Zou et al. |
| 10,676,390 | B2 | 6/2020 | Yuan |
| 10,694,010 | B2 | 6/2020 | Jones |
| 10,917,505 | B2 | 2/2021 | Jones |
| 11,174,189 | B2 | 11/2021 | Li et al. |
| 11,419,231 | B1 | 8/2022 | Lancaster-Larocque et al. |
| 12,234,175 | B1 | 2/2025 | Bomba et al. |
| 2002/0009602 | A1 | 1/2002 | Kitayama et al. |
| 2005/0204777 | A1 | 9/2005 | Mori et al. |
| 2010/0014232 | A1 | 1/2010 | Nishimura |
| 2010/0077798 | A1 | 4/2010 | Fredholm et al. |
| 2010/0127420 | A1 | 5/2010 | Dannoux |
| 2010/0129602 | A1 | 5/2010 | Dejneka |
| 2011/0067450 | A1 | 3/2011 | Fredholm et al. |
| 2011/0092353 | A1 | 4/2011 | Amin et al. |
| 2013/0258569 | A1 | 10/2013 | Amin et al. |
| 2014/0049927 | A1 | 2/2014 | Kamakura |
| 2014/0050912 | A1 | 2/2014 | Isono et al. |
| 2016/0137550 | A1 | 5/2016 | Murata et al. |
| 2017/0137313 | A1 | 5/2017 | Bisson et al. |
| 2017/0283295 | A1 | 10/2017 | Immerman et al. |
| 2018/0037486 | A1 | 2/2018 | Liu et al. |
| 2018/0086663 | A1 | 3/2018 | Luzzato et al. |
| 2018/0088399 | A1 | 3/2018 | Fukushi et al. |
| 2018/0125756 | A1 | 5/2018 | Gerrish et al. |
| 2018/0127299 | A1 | 5/2018 | Dannoux et al. |
| 2018/0282207 | A1 | 10/2018 | Fujii et al. |
| 2018/0321425 | A1* | 11/2018 | Hart ..................... G06F 3/0604 |
| 2019/0071341 | A1* | 3/2019 | Hartman .............. B44C 5/0453 |
| 2019/0107751 | A1 | 4/2019 | Bazemore et al. |
| 2019/0263708 | A1 | 8/2019 | Bookbinder et al. |
| 2019/0275782 | A1 | 9/2019 | Bennett et al. |
| 2021/0303031 | A1 | 9/2021 | Poole et al. |
| 2022/0162110 | A1 | 5/2022 | Hwang et al. |
| 2022/0267195 | A1 | 8/2022 | Chen et al. |
| 2023/0051724 | A1 | 2/2023 | Gross et al. |
| 2023/0057346 | A1 | 2/2023 | Gross et al. |
| 2023/0250013 | A1 | 8/2023 | Noda et al. |
| 2023/0373846 | A1 | 11/2023 | Guo et al. |
| 2024/0067554 | A1 | 2/2024 | Burdette et al. |
| 2024/0150226 | A1* | 5/2024 | Kanehara .............. C03C 21/002 |

FOREIGN PATENT DOCUMENTS

| | | | |
|---|---|---|---|
| CZ | 285701 | B6 | 10/1999 |
| DE | 3216067 | A1 | 3/1983 |
| DE | 69218216 | T2 | 7/1997 |
| JP | 06-305735 | A | 11/1994 |
| JP | 10-194758 | A | 7/1998 |
| JP | 2000-319026 | A | 11/2000 |
| JP | 2001-348243 | A | 12/2001 |
| JP | 2012-214361 | A | 11/2012 |
| KR | 10-0519602 | B1 | 12/2005 |
| WO | 2012/132293 | A1 | 10/2012 |
| WO | 2013/081119 | A1 | 6/2013 |
| WO | 2015/111183 | A1 | 7/2015 |
| WO | 2022/231933 | A1 | 11/2022 |

OTHER PUBLICATIONS

Invitation to Pay Additional Fees of the International Searching Authority; PCT/US2025/024044; dated May 15, 2025; 3 pages; Commissioner for Patents.

* cited by examiner

1110

1410

1524     1556

1524     1556

1610

1614

1616

1612

1618

1910

2010

2110

2210

2414

2434

224

$T_3$  $T_2$     $T_0$  $T_1$  $T_2$  $T_3$

2510

2512

2610

2614

2612

2616

W

X

L

2710

2810

2812

2814

2816

2910

2912

GLASS PARTS AND GOB-PRESSING METHODS FOR MAKING SUCH

CROSS-REFERENCE TO RELATED APPLICATIONS

This Application is a continuation of U.S. application Ser. No. 19/028,587, filed Jan. 17, 2025, which is a continuation-in-part of U.S. application Ser. No. 18/677,404 filed May 29, 2024, now U.S. Pat. No. 12,234,175 issued on Feb. 25, 2025, which claims the benefit of priority of U.S. Application No. 63/634,535, filed on Apr. 16, 2024; and U.S. application Ser. No. 19/028,587 claims the benefit of priority of U.S. Application No. 63/634,535 filed on Apr. 16, 2024 and U.S. App. No. 63/722,385 filed Nov. 19, 2024; this Application claims the priority benefit of U.S. App. No. 63/722,385 filed Nov. 19, 2024; this Application is a continuation of International App. No. PCT/US2025/024044 filed Apr. 10, 2025, which is also continuation of U.S. application Ser. No. 19/028,587 filed Jan. 17, 2025, which has the above-described priority; International App. No. PCT/US2025/024044 is continuation-in-part of U.S. application Ser. No. 18/677,404 filed May 29, 2024, now U.S. Pat. No. 12,234,175 issued on Feb. 25, 2025, which has the above-described priority; and International App. No. PCT/US2025/024044 claims the priority benefit of U.S. App. No. 63/634,535 filed Apr. 16, 2024 and 63/722,385 filed Nov. 19, 2024, the contents of each of the above applications is hereby incorporated by reference herein in its entirety.

BACKGROUND

This Application relates to making glass and glass-ceramic parts, such as covers and housings, for electronic products, such as computers, tablets, smart phones and watches. More specifically, the Application relates to techniques for gob-pressing such glass parts as well as the gob-pressed glass parts.

Glass may be formed into end products in many ways. For thousands of years, craftsmen have been blowing and forming glass into the shape of containers, jewelry, windows, and other articles. Molten glass can be poured into a mold and solidified into a desired shape. Today a block of glass can be machined or milled down, such as with the aid of computer numerical control, and polished into a finished product. Alternatively, Applicants find that sheets of molten glass can be pressed or pulled into desired geometries. Other glass articles can be formed from a draw tower, a fusion isopipe, rolled between rollers, or floated on a pool of molten metal, etc.

One method of forming glass is so-called gob-pressing or stamping of a blob of molten glass (i.e. a gob) with a piston into a mold, to form the glass into the molded shape. As the gob is stamped, the molten glass spreads outward in all directions in the mold from the original location, such as in a center of the mold. Gob-pressing may be used to make articles of generally round or disc shapes, such as optical lenses and glass plates.

However, like other methods of glass forming, gob-pressing has limitations. Molten glass within a gob-pressing operation has viscosity and density, as well as complex momentum and cohesion effects, which may resist a desired shaping of the glass. Volume of the molten glass may rapidly change with temperature, such as when glass solidifies. Oblong or elongate glass articles may be particularly difficult or impossible to gob press, depending upon geometry and composition among other factors. Also, thin articles that have a large surface area may be particularly difficult or impossible to gob press because the glass may cool with surface contact and resist spreading when the gob becomes too thin within the mold. Similarly, sharp curvature, and/or large variations in thickness, especially those with thicker portions positioned in regions of the respective gob-pressed parts that are away from a geometric center of the part, may be problematic to make by gob-pressing. Glass of the gob may cool too quickly to reach and fill thicker portions of the mold, especially if molten glass must first traverse thin portions.

With that said, Applicants believe gob-pressing may efficiently form glass parts of new, elaborate geometries if able to overcome such problems. As such, a need exists for new methods to gob-press glass, to make glass articles that are otherwise difficult or impossible to make by this forming method.

SUMMARY

Applicants discovered new techniques and equipment that expand opportunities for making glass parts of new, elaborate geometries by gob-pressing. Applicants believe that gob-pressing such parts, as opposed to making the parts by other methods, preserves resources—less (if any) glass needs to be removed to finish a product, when compared to other methods of making glass articles, such as via computer numerical controlled milling from a block.

As further disclosed herein, Applicants discovered new mold structures for controlling local temperatures of surfaces of a mold. The mold structure includes gaps purposely built into the mold, beneath surfaces thereof, that limit heat transfer to and from the surfaces, as further explained below. Maintaining surfaces at desired temperatures, without too much heat conducting away therefrom, allows molten glass to move evenly and quickly through a mold during a gob-pressing operation. As a result, the molten glass can spread out within a mold over a large area and to a particularly thin thickness, without freezing up or becoming too viscous prior to reaching extreme ends of a desired geometry.

Further, Applicants created a system for precisely controlling volume of each gob, as well as glass flow rate to form such gobs. The system includes an auger of platinum that spins to a controlled degree, direction, and rate to move molten glass into a gob, or hold molten glass back, as needed to shape a gob, as further explained below. Placing a precise amount of glass into a gob at a particular moment for a given mold ensures that there is sufficient glass to reach extreme ends of complex part geometries described herein, but not too much glass so as to result in bulges within the glass parts or overly thick portions of the glass parts. For example, without such volume control, gob-pressed glass parts of complex geometries (e.g., thin, wide-area, curvature, juts away from center) may bulge near a geometric center, such as where a gob is dropped, and/or may not reach to fill and form extreme ends thereof.

Significantly, Applicants also invented a technology of gob shaping, prior to gob-pressing. Put another way, Applicants found that gobs may be pre-shaped and then dropped into molds for pressing. Pre-shaping the gobs facilitates formation of complex geometries that may otherwise fail in gob-press formation, such as oblong glass parts, because a starting volume of the gob may be pre-positioned such that as the gob expands outward from the pressing operation, and expands into a geometry that is not round and/or not even close to round. For example, as further explained below, Applicants pre-shape gobs into a dog-bone shape when gob-pressing an elongate rectangular part, such as a phone back or tablet housing. During the pressing, the dog-bone shaped gob expands to fill the mold, filling extreme ends of an elongate shape such as buttressed corners of the part. Without pre-shaping, especially if the gob-pressed part is thin, glass may never reach extreme ends of such an oblong mold before becoming too viscous.

Applicants discovered the use of a multi-stamp technique for gob-pressing glass parts. Put another way, the piston stamps, withdraws, and at least stamps the part one more time. Applicants have discovered that fine accuracy in geometry of a part improves with the multi-stamp technique, as opposed to just a single stamp and hold. As a result, such gob-pressed parts may have long linear profiles of near constant thickness, for parts requiring such profiles. Similarly, curvature of surfaces of the parts may be formed without sharp inflections and/or discontinuities that may otherwise be a source of stress concentration or weakness in such parts. Beyond these new methods for gob-pressing, Applicants have discovered other new aspects disclosed herein.

The molded parts can be identified by characteristic attributes in Raman spectra of the parts. In aspects, the difference is between a first location on a first major surface having a minimum local radius of curvature (and/or a center of geometry of the part and/or a location on the first major surface furthest from locations having a local radius of curvature of 1 m or less) and a second location having a maximum local convex radius of curvature (e.g., corner). In further aspects, a ratio of a quantity of a difference in Raman spectra of a second Raman spectrum at the second location (R2) minus a first Raman spectrum at the first location (R1) divided by a first scaling factor over wavenumbers from 300 $cm^{-1}$ to 500 $cm^{-1}$ can be less than or equal to $-70$ $cm^{-1}$ or from greater than or equal to $-160$ $cm^{-1}$ to less than or equal to $-100$ $cm^{-1}$, where the first scaling factor $max(|R2(a)-R1(a)|)$ is a maximum value of an absolute value between R2 and R1 at the same wavenumber a between 250 $cm^{-1}$ and 1600 $cm^{-1}$. In further aspects, a second integral of the ratio of the quantity of the difference in Raman spectra of the second Raman spectrum at the second location (R2) minus the first Raman spectrum at the first location (R1) divided by the first scaling factor (referred to above) over wavenumbers from 1000 $cm^{-1}$ to 1200 $cm^{-1}$ can be less than or equal to $-10$ $cm^{-1}$ or from greater than or equal to $-50$ $cm^{-1}$ to less than or equal to $-15$ $cm^{-1}$. Alternatively or additionally, in aspects, the difference is between a first location on a first major surface having a minimum local radius of curvature (and/or a center of geometry of the part and/or a location on the first major surface furthest from locations having a local radius of curvature of 1 m or less) and a third location at an edge of the part. In further aspects, a third integral of a ratio of a quantity of a difference in Raman spectra of a third Raman spectrum at the third location (R3) minus a first Raman spectrum at the first location (R1) divided by a third scaling factor over wavenumbers from 300 $cm^{-1}$ to 500 $cm^{-1}$ can be greater than or equal to 30 $cm^{-1}$ or from greater than or equal to 70 $cm^{-1}$ to less than or equal to 150 $cm^{-1}$, where the third scaling factor $max(|R3(a)-R1(a)|)$ is a maximum value of an absolute value between R3 and R1 at the same wavenumber a between 250 $cm^{-1}$ and 1600 $cm^{-1}$. In further aspects, the second location can correspond to a position of a maximum absolute value of a thermal gradient calculated by a thermal model of the glass-based article cooling from 500° C. to 25° C., and the first location can correspond to a position of a minimum absolute value of the thermal gradient by the thermal model for the same configuration that the maximum absolute value of the thermal gradient was identified. Based on any of the above aspects, it can be determined whether differences between Raman spectra at corresponding locations on a glass part are consistent with the glass part having been formed by a gob-pressing method.

Additional features and advantages are set forth in the detailed description that follows, and will be readily apparent to those skilled in the art from the description or recognized by practicing the technology as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE FIGURES

The accompanying figures are included to provide a further understanding and are incorporated in and constitute a part of this specification. Drawings of the figures illustrate aspects of the present disclosure, and together with the detailed description explain principles and operations of the various aspects. As such, the disclosure will become more fully understood from the following detailed description, taken in conjunction with the accompanying figures, in which.

DETAILED DESCRIPTION

Before turning to the following detailed description and above-described figures, which illustrate aspects of the present disclosure in detail, it should be understood that the present inventive technology is not limited to the details or methodology set forth in the detailed description or illustrated in the figures. For example, as will be understood by those of ordinary skill in the art, features and attributes associated with an aspect shown in one of the figures or described in the text relating to an aspect may be applied to another aspect shown in another of the figures or described elsewhere in the text.

Figure 1:
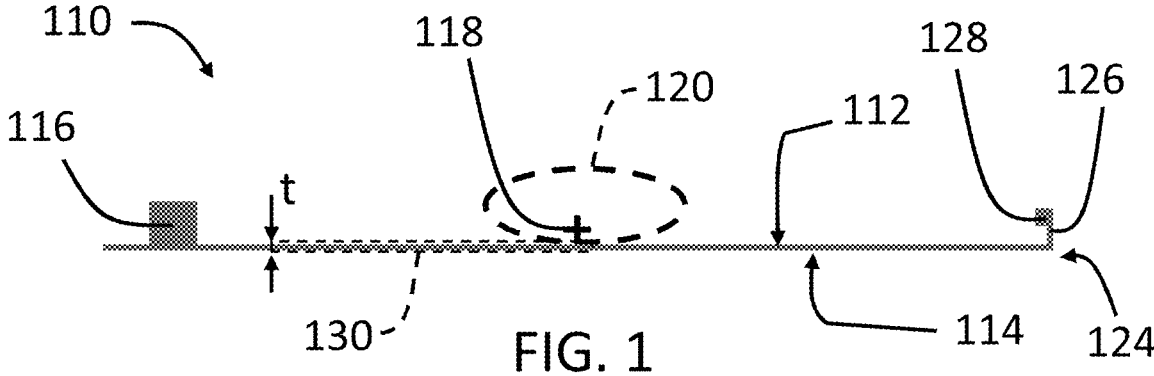
FIG. 1 is side view of a gob-pressed part according to aspects of the present disclosure.
Figure 2:
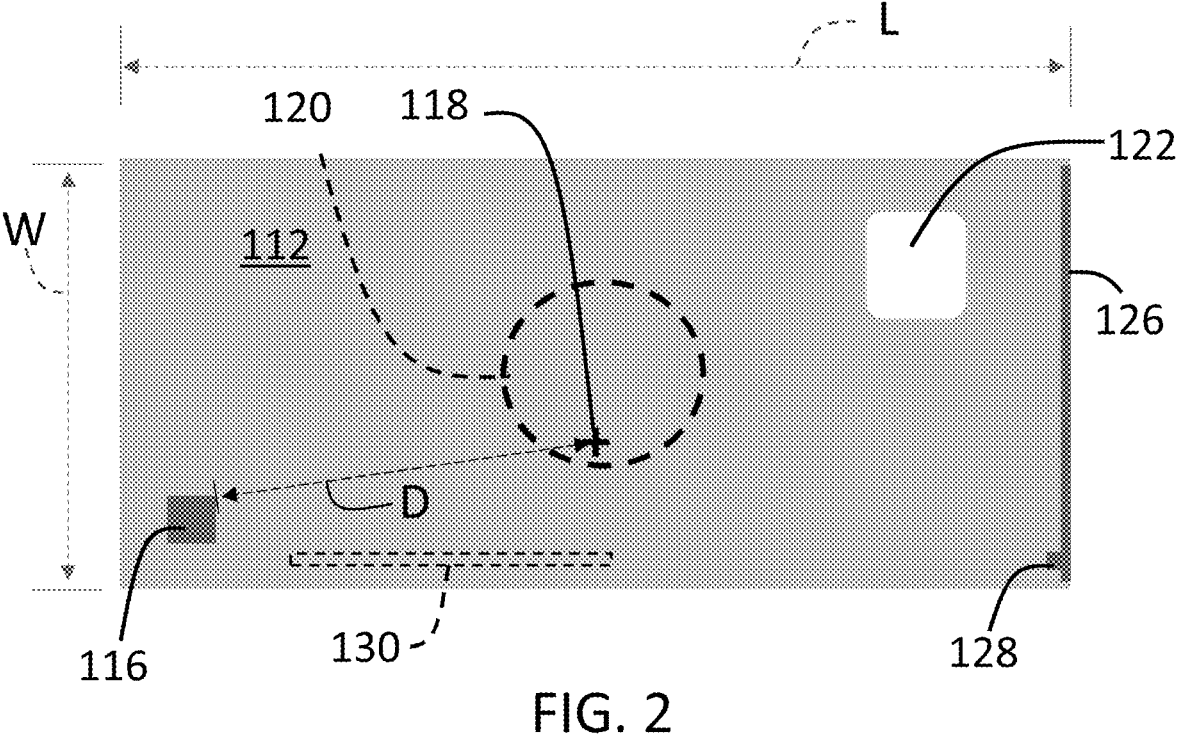
FIG. 2 is a top view of the gob-pressed part of FIG. 1.

Referring to FIGS. 1-2, a gob-pressed part 110 is formed from glass, such as glass compositions disclosed herein, which may be particularly well-suited for use with electronics that may transmit or charge through the glass. According to an aspect, the gob-pressed part 110 is particularly thin while having major surfaces 112, 114 (e.g., front and back) with large surface areas. In many such parts, the major surfaces 112, 114 of the gob-pressed part 110 face away from one another, as shown with the gob-pressed part 110 in FIG. 1. Thickness (t) of the gob-pressed part 110 is a distance directly between the major surfaces 112, 114, through the glass and normal to the major surfaces 112, 114. As further explained herein, the presently disclosed techniques facilitate forming thin parts with large surface areas. In FIGS. 1-2, a gob 120 is represented by a dotted line, but may not be so shaped, as further explained below.

Still referring to FIGS. 1-2, the gob-pressed part 110 may include a jut 116 (e.g., protrusion, extension, bump, projection). The jut 116 extends outward from the major surface 112 and includes a volume and corresponding thickness (t) of glass greater than adjoining, surrounding portions of the gob-pressed part 110. Additionally, according to an aspect of the present disclosure, the jut 116 is positioned away from a geometric centroid 118 (i.e. arithmetic mean position of all points on a surface of the respective gob-pressed part 110; approximately center of mass of the part for roughly constant density material, such as glasses disclosed herein, acknowledging that ion-exchanged glasses, for example, may have subtle variation) of the gob-pressed part 110. Excitingly, the presently disclosed manufacturing techniques facilitate forming such a jut 116 away from the geometric centroid 118, where molten glass of the gob 120 travels through a mold to fill and form the jut 116. Conversely, the gob-pressed part 110 may include a feature 122 such as a hole or area thinner than surrounding portions, such as region of reduced thickness and/or openings through the gob-pressed part 110.

According to an aspect, the jut 116 may have a thickness measured from the major surface 114 opposite the jut 116 that is greater than a thickness of the part 110 surrounding and adjoining the jut 116, such as at least 0.05 mm greater, at least 0.1 mm greater, at least 0.25 mm greater, at least 0.5 mm greater, at least 1 mm greater, at least 2 mm greater, and/or no more than 0.5 m greater, such as no more than 10 cm greater, such as no more than 2 cm greater. According to an aspect, the jut 116 is at least twice as thick as a portion of the part 110 surrounding and adjoining the jut 116, such as at least three times as great, such as at least four times. According to an aspect, the thinner, adjoining, surrounding portion is positioned between the jut 116 and the geometric centroid 118. As such, during gob-pressing, glass flows through a thinner portion of the mold to reach the wider portion corresponding to the jut 116, which is facilitated by the methods disclosed below, including mold surface treatment and gob-shaping, among others.

According to an aspect, the jut 116 is positioned away from a geometric centroid 118 of the part 110, such as by a distance (D) as shown in FIG. 2. As explained herein, locating a jut 116 a substantial distance from a geometric centroid 118 may be particularly difficult when making a part via gob-pressing because moving enough glass to that location before the glass becomes too viscous may be problematic, especially if an intervening thickness of the part is thin. According to an aspect, the jut 116 is positioned at least 1 cm from the geometric centroid 118, such as at least 1.5 cm, such as at least 3 cm, and/or no more than 1.5 m, such as no more than 1 m. While the jut 116 is a protrusion extending from the major surface 112 of the part 110, there is still an additional portion of the major surface 112 between the jut 116 and an edge or side of the major surface 112.

According to an aspect of the present disclosure, the gob-pressed part 110 may be a shape other than round, such as generally rectangular, oval, oblong, etc., and have an aspect ratio of length (L) to width (W) greater than 1:1, such as at least 1.25:1, such as at least 1.5:1, such as at least 2:1, such as at least 2.5:1, and/or no more than 30:1, such has no more than 20:1. Put another way, the gob-pressed part 110 may be elongate, as opposed to rotationally symmetric about the geometric centroid 118, such as where the gob 120 was originally dropped into the mold. Applicants are able to achieve this elongation by a number of techniques disclosed herein, including shaping the gob before dropping the gob into the mold, as well as selecting glass compositions and heating the glass and/or the mold to achieve a suitable viscosity, using a gob of a specific-, controlled-volume, and/or multi-press approach described herein.

Figure 36:
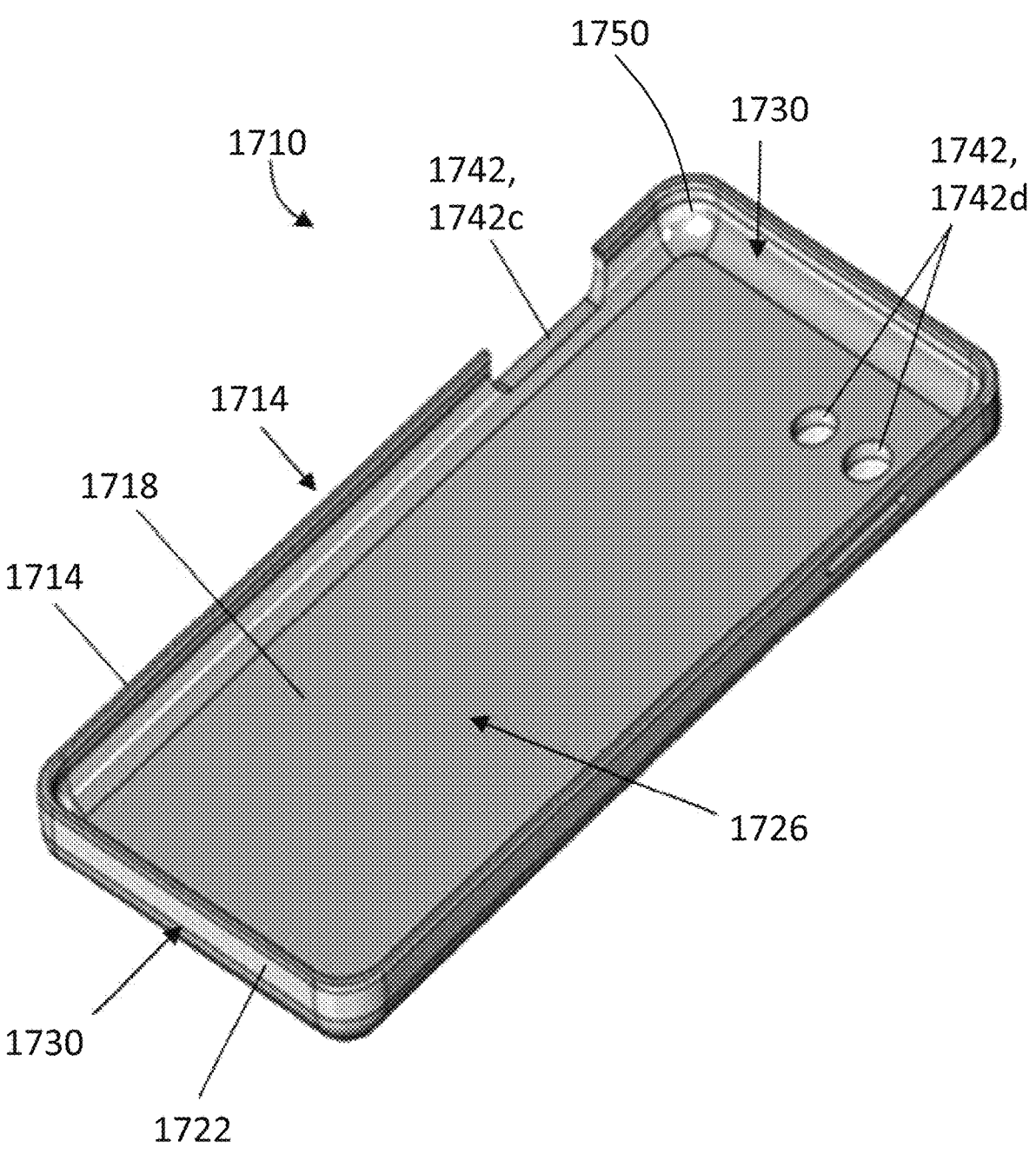
FIG. 36 is a perspective view of a glass part according to aspects of the present disclosure.

In FIGS. 1-2, the gob-pressed part 110 includes curvature 124 in the form of a sharp bend or corner. While the bend is particularly sharp in FIG. 1, the curvature may have a wider radius, such as curvature of at least a portion of surfaces of the part 110 that comprises a radius of curvature of less than 1 m, such as less than 0.5 m, such as less than 0.25 m, or bend radiuses disclosed herein. During manufacturing, molten glass of the gob-pressed mold travels to the curve and then is redirected about the curve to form the curvature 124. Such redirection may be difficult at narrower thicknesses because the glass may be too viscous when gob-pressing unless disclosure provided herein is used to facilitate such a geometry. According to an aspect, the curvature 124 is positioned away from the geometric centroid 118. According to an aspect, the curvature 124 is positioned at least 1 cm from the geometric centroid 118, such as at least 1.5 cm, such as at least 3 cm, and/or no more than 1.5 m, such as no more than 1 m. The gob-pressed part 110 may then extend beyond the curvature 124 to form a feature such as a side wall 126, which may be normal to the major surfaces 112, 114. According to an aspect the side wall extends at least 2 mm from and normal to the corresponding major surface from which the side wall extends, such as at least 4 mm, such as at least 4 mm, such as at least 6 mm, such as at least 10 mm, and/or no more than 1.5 m, such as no more than a meter, such as no more than 0.5 m. Applicants find that gob-pressing provides an advantage for forming side walls and curves of glass parts, such as part 110, because such curves and changes in direction may be a source of stress concentration and failure if instead milling is used to make such parts. In contemplated embodiments, the side wall 126 may include a feature 128, such as the jut 116 or the feature 122 (e.g., elongate hole, depression, series of holes) for example. While the side wall 126 only extends along one side of the part 110, other side walls may extend around a corner 1750 of the respective part, as shown in FIG. 36 for example. Further, the corner of such a side wall may be positions far from a geometric centroid of the respective part, such as at least 0.5 cm therefrom, such as at least 1 cm, such as at least 1.5 cm, such as at least 2 cm, such as at least 4 cm, such as at least 5 cm, and/or no more than 5 m, such as no more than 2 m, such as no more than 1 m, such as no more than 0.5 m for example. Further, the side wall has a thickness defined between inner and outer surfaces of the respective wall, and according to an aspect thickness of the side wall at corners of the part may be greater than other portions of the side wall between the corners. A thickness of the side wall at the corner 1750 may be at least 0.5 mm, such as at least 1 mm, such as at least 1.5 mm, such as at least 2 mm, such as at least 3 mm, such as at least 5 mm, which may strengthen the respective part against drop damage. Method and equipment disclosure facilitates getting enough glass to corners of the molded part, furthest from the center where a gob may be placed during the pressing. While the side wall is positioned around a periphery of the part 1710, other parts may have walls interior to a perimeter thereof, such as for partitioning internal componentry of a respective device using the part.

Figure 3:
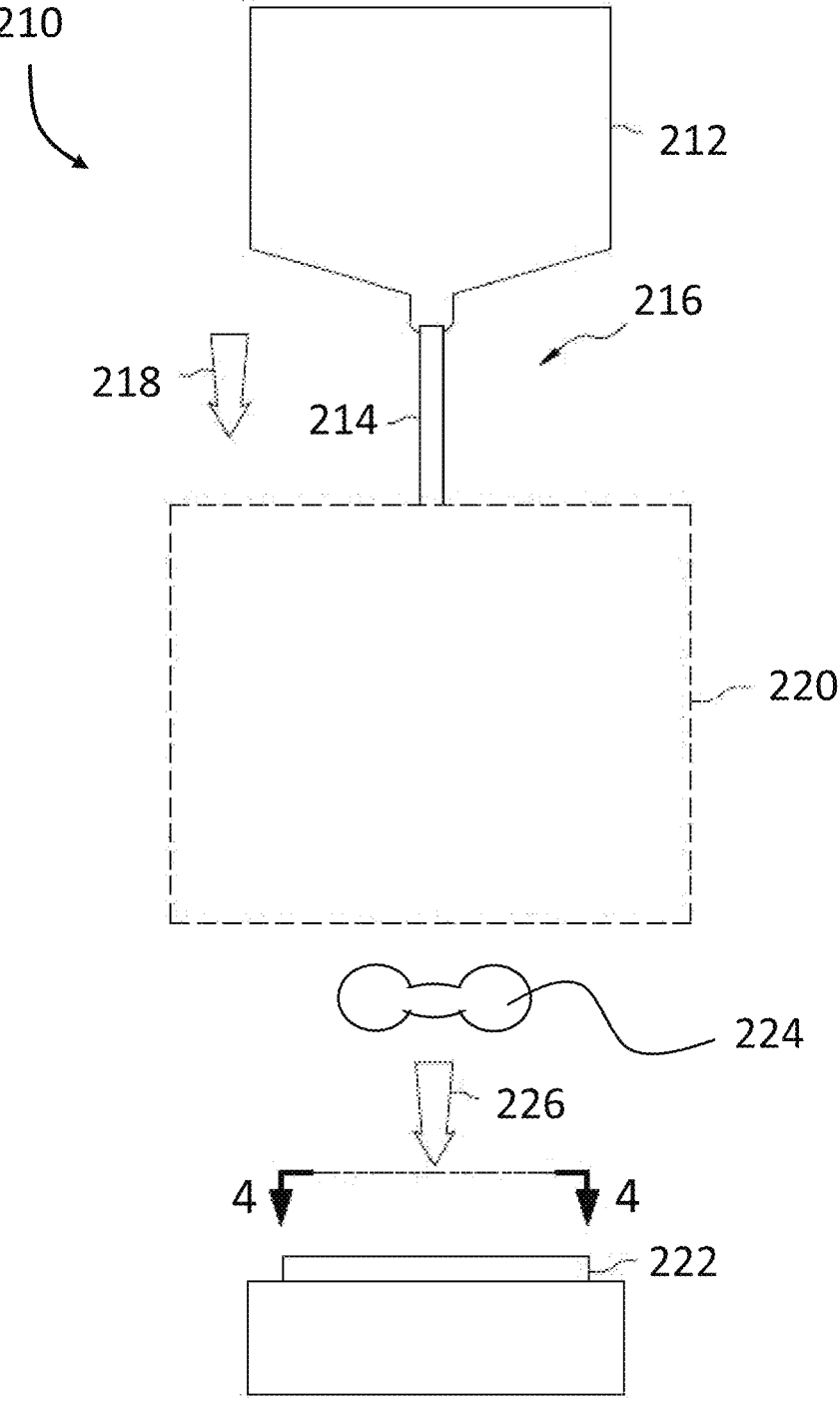
FIG. 3 is a conceptual diagram of a system for gob-pressing glass into part according to aspects of the present disclosure.

Referring now to FIG. 3, according to an aspect of the present disclosure, an exemplary manufacturing apparatus 210 can comprise a glass delivery apparatus 212 from which a stream of molten glass 214 may exit the glass delivery apparatus 212. For example, the glass delivery apparatus 212 may include an elongated passageway with an opening at the end of the glass delivery apparatus 212. According to an aspect, the glass delivery apparatus 212 and the stream of molten glass 214 flowing therefrom may be oriented so that the molten glass 214 flows in a direction of gravity through and/or from the delivery apparatus 212.

The glass delivery apparatus 212 may be an upstream portion of a travel path 216 of the glass, extending in a first travel direction 218. The glass delivery apparatus 212 may then convey the stream of molten glass 214 along the travel path 216 in the first travel direction 218. According to an aspect, the glass delivery apparatus 212 may convey the stream of molten glass 214 to a shaping apparatus 220 downstream from the glass delivery apparatus 212 and upstream from a mold 222. The shaping apparatus 220 is illustrated schematically with dashed lines in FIG. 3 because the shaping apparatus 220 may include features of different constructions (see, e.g., FIGS. 5-15 and corresponding text herein).

Figure 12:
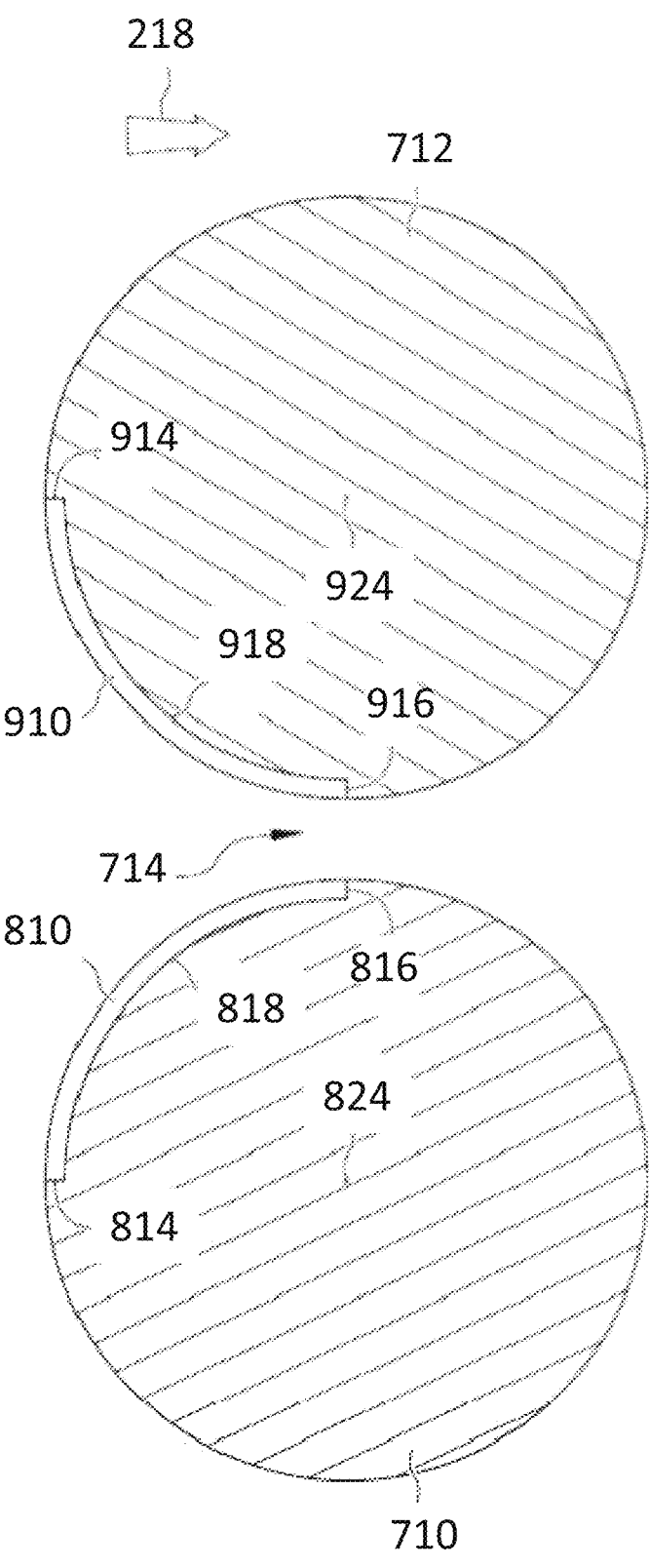
FIG. 12 is a side view of the parts of FIGS. 10-11 according to aspects of the present disclosure.
Figure 13:
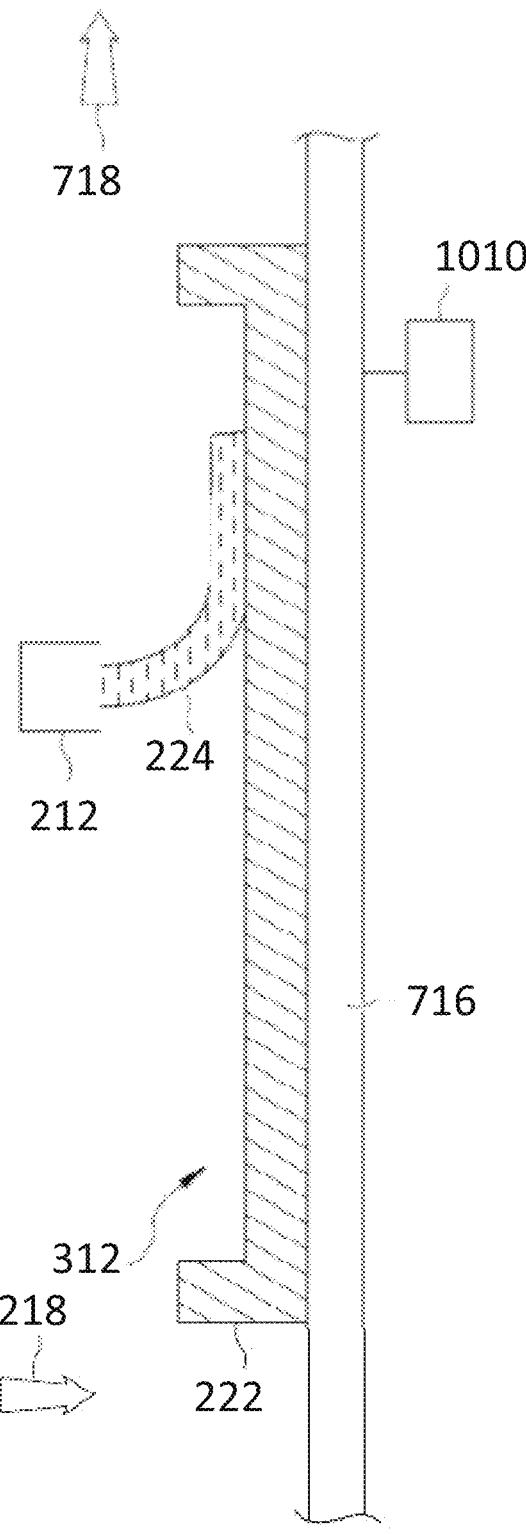
FIG. 13 is a side view of yet another apparatus for shaping a gob of glass according to aspects of the present disclosure.
Figures 35A, 35B:
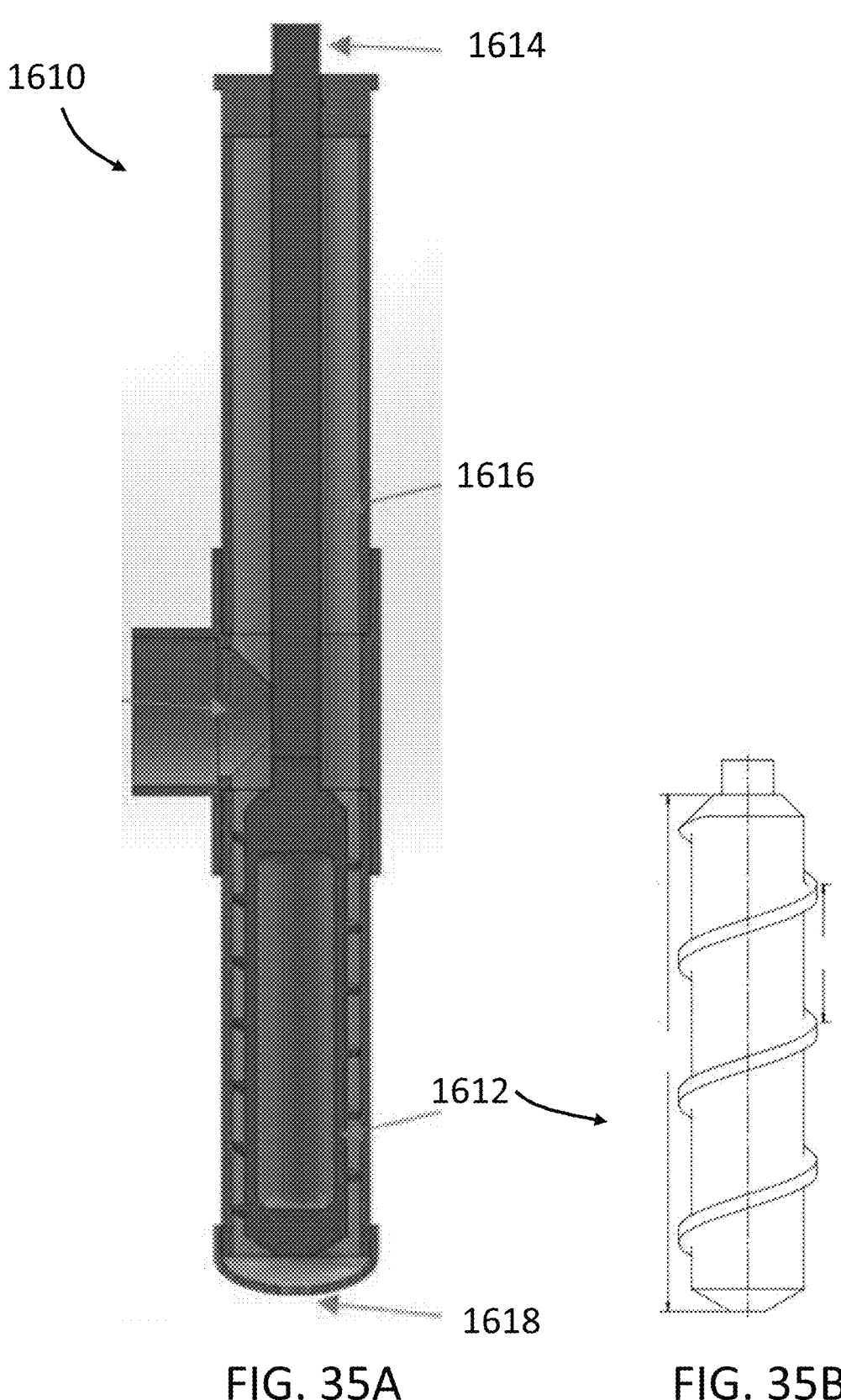
FIG. 35A is a side cross-sectional view of an auger system for controlling flow of glass into a mold according to aspects of the present disclosure.
FIG. 35B is a side view of an auger as may be used with a system of FIG. 35A according to aspects of the present disclosure.

For example, the shaping apparatus 220 may comprise a pre-forming apparatus (e.g., illustrated in FIGS. 5-8), a pair of forming rolls (e.g., illustrated in FIGS. 9-12), and/or a control apparatus that controls a velocity of the mold 222 relative to the delivery apparatus 212 (see generally FIG. 13, and also FIGS. 35A-35B). The shaping apparatus 220 may receive the stream of molten glass 214 from the glass delivery apparatus 212, which may then shape a gob 224 of the glass of the stream of molten glass 214 such that the gob 224 may then be received within the mold 222, with the gob 224 having a shape other than a generally round ball, such as cylindrical, conical, torus, pentagonal prism, etc.

According to an aspect of the present disclosure, shaping of the gob 224 facilitates application of pressure to the gob 224 within the mold 222 as well as useful placement of a sufficient volume of glass at a desirable viscosity for gob-pressing. For example, the shape may be elongated, wherein a length of the gob 224 may be greater than a width of the gob 224. As such, the shape of the gob 224 may help glass of the gob 224 to spread (e.g., in the length direction, width direction, etc.) in a relatively uniform manner in response to application of a pressing force into the mold 222. In this way, manufacturing methods as disclosed herein may include delivering (e.g., illustrated schematically with arrowhead 226 in FIG. 3) the stream of molten glass 214 to the mold 222. Methods may further include shaping glass of the stream of molten glass 214 such that the gob 224 has a shape upon being received on the mold 222.

Figure 4:
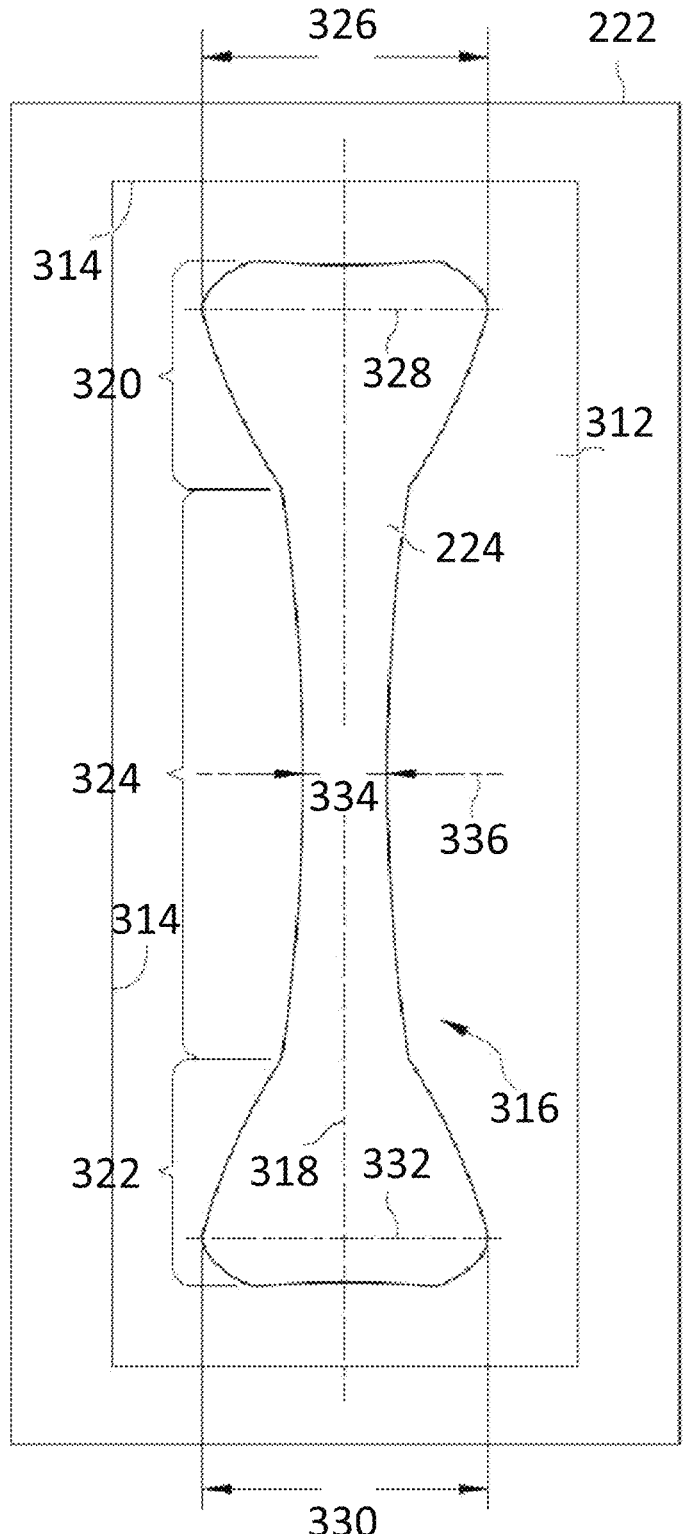
FIG. 4 is a top down view of a mold for shaping a gob of glass according to the present disclosure.

FIG. 4 shows a top-down view of the mold 222 as viewed from the perspective indicated by lines 4-4 of FIG. 3 after the gob 224 (e.g., non-spherical gob; pre-shaped gob) has been shaped and received by the mold 222. The mold 222 may comprise a mold cavity 312 within which the gob 224 is received. The mold 222 may comprise one or more mold walls 314 that surround and define the mold cavity 312. In the present example, the gob 224, upon being received upon the mold 222, may be dumbbell-, hourglass-, or dog-bone-shaped, such as having a shape 316 that may extend along a longitudinal axis 318 between a first glass end 320 and an opposing second glass end 322. The defined shape 316 of the gob 224 may include a central region 324 attached to, and extending between, the first glass end 320 and the second glass end 322. According to an aspect, the longitudinal axis 318 may extend through the first glass end 320, the second glass end 322, and the central region 324, with the longitudinal axis 318 bisecting the gob 224 into two substantially equal parts.

The shape 316 may include a non-constant cross-sectional size along the longitudinal axis 318 from the first glass end 320 and the second glass end 322. For example, the first glass end 320 may include a first width 326 along a first width axis 328 that is perpendicular to the longitudinal axis 318. The first width axis 328 may be substantially parallel to a surface of the mold 222 upon which the gob 224 is supported. According to an aspect, the first width 326 may comprise a maximum width of the first glass end 320 and/or a maximum width of the entire gob 224. The second glass end 322 may likewise comprise a second width 330 along a second width axis 332 that is perpendicular to the longitudinal axis 318. The second width axis 330 may be substantially parallel to the surface of the mold 222 upon which the gob 224 is supported. According to an aspect, the second width 330 may comprise a maximum width of the second glass end 322 and/or a maximum width of the entire gob 224. According to an aspect, the first width axis 328 may be substantially parallel to the second width axis 332, with the first width 326 substantially equal to the second width 330 (e.g., within 10% thereof).

The central region 324 may comprise a central width 334 along a central width axis 336 that is perpendicular to the longitudinal axis 318 and parallel to the first width axis 328 and the second width axis 332. According to an aspect, the central region 324 may comprise a substantially constant width (e.g., the central width 334) along the central region 324 between the first glass end 320 and the second glass end 322. Alternatively, the central region 324 can comprise a decreasing width from the first glass end 320 until reaching a minimum width (e.g., illustrated as the central width 334 in FIG. 4) before increasing in width again toward the second glass end 322. According to an aspect, the central width 334 may be less than the first width 326 and/or less than the second width 330 (e.g., at least 10% less; at least 1 mm less). In this way, the shape 316 of the gob 224 may comprise a greater (e.g., maximum) width at the glass ends 320, 322 and a lesser (e.g., minimum) width at the central region 324. However, the central width 336 may alternatively be equal to one of the first width 326 or the second width 330 or otherwise shaped, depending upon the desired shape of the corresponding part to be formed. According to an aspect, the glass ends 320, 322 and the central region 324 may be spaced a distance apart from the mold walls 314, such that the gob 224 may not be in contact with the mold walls 314 upon being received within the mold cavity 312.

Providing the gob 224 with the shape 316 of a dog-bone can yield several benefits when making an elongate, rectangular gob-pressed part 110. For example, it may be desirable to produce a substantially flat glass part (see, e.g., part 110 as shown in FIG. 1) in which a length L is greater than a width W. According to an aspect, the substantially flat part is produced by applying pressure (e.g., via a pressing force) to the gob 224. Generally, pressing glass gobs with elongated shape molds may be difficult because ends of a gob to spread uniformly in the length and width direction, resulting in overly thick centers and not enough glass at ends of the mold. However, the shape 316 comprises an increased volume of glass at the ends 320, 322 and a decreased volume of glass at the central region 324. The increased volume of glass at the ends 320, 322 can allow for more uniform spreading of the gob 224 in response to the application of pressure, such that gob 224 at the ends 320, 322 uniformly spreads in the length-wise and width-wise directions. Additionally, Applicants find the shape 316 can further reduce the amount of pressing force required to spread the gob 224 in such a mold 222. As such, damage to the formed glass part (see, e.g., part 110 of FIGS. 1-2) resulting from excessive force can be avoided.

Figure 34:
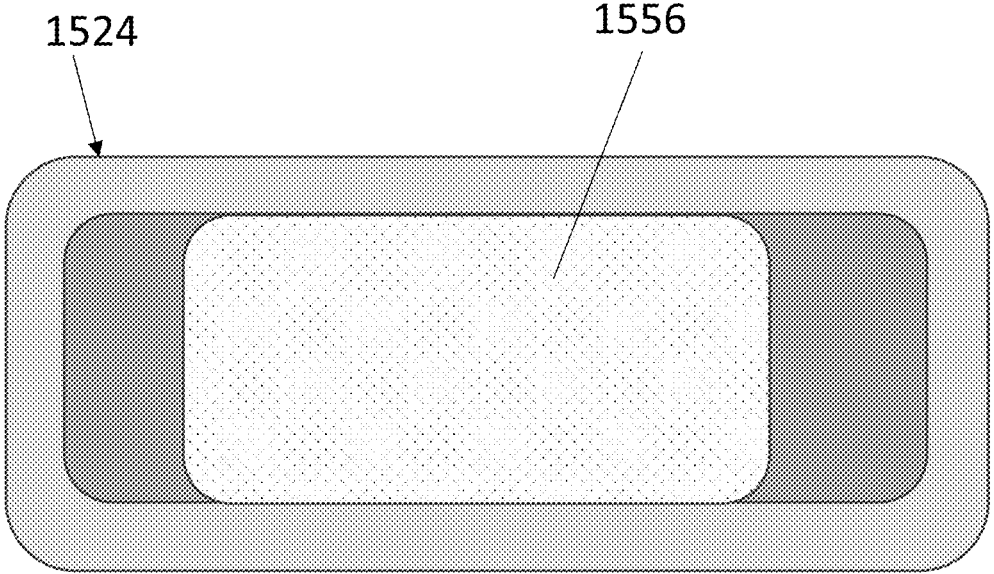
FIG. 34 is a digital image of the mold of FIG. 31 with a malformed part.

According to an aspect of the present disclosure, the part 110 comprises a cross-sectional portion (e.g., swath, section) along a 2 cm linear path 130 (FIGS. 1-2) across the first and second major surfaces 112, 114 where the thickness (t) of the part 110 varies less than 100 μm from an average thickness of the part 110 along the 2 cm linear path. Otherwise shaped parts may have other such consistency in thickness over a long length, such as varying less than 500 μm, such as less than 200 μm, such as less than 50 μm, such as less than 10 μm, such as less than 5 μm from an average thickness along a linear path across the first and second major surfaces 112, 114 of at least 0.5 cm, at least 1 cm, such as at least 2 cm, such as at least 4 cm, such as at least 8 cm, or even 10 cm. According to an aspect, the part 110 comprises a cross-sectional portion along a 2 cm linear path 130 (FIGS. 1-2) across the first and second major surfaces 112, 114 where the thickness (t) of the part 110 varies less than 100 μm. Otherwise shaped parts may have other such consistency in thickness over a long length, such as varying less than 500 μm, such as less than 200 μm, such as less than 50 μm, such as less than 10 μm, such as less than 5 μm along a linear path across the first and second major surfaces 112, 114 of at least 0.5 cm, at least 1 cm, such as at least 2 cm, such as at least 4 cm, such as at least 8 cm, or even 10 cm. Such a geometry may be particularly difficult to otherwise achieve when gob-pressing for particularly thin parts with large surface areas, as disclosed above, such as those also having an area of at least 10 cm², such as at least 20 cm², such as at least 50 cm² per major surface. Glass of a gob 224 may thin out and solidify, and not reach extreme ends of the mold, as shown in FIG. 34 for example, and/or glass may swell a middle of the part 110 resulting in varied thickness. Were such malformed parts made, the parts with such variations may then require extensive machining and polishing to correct, assuming such unevenness can be corrected.

Figure 5:
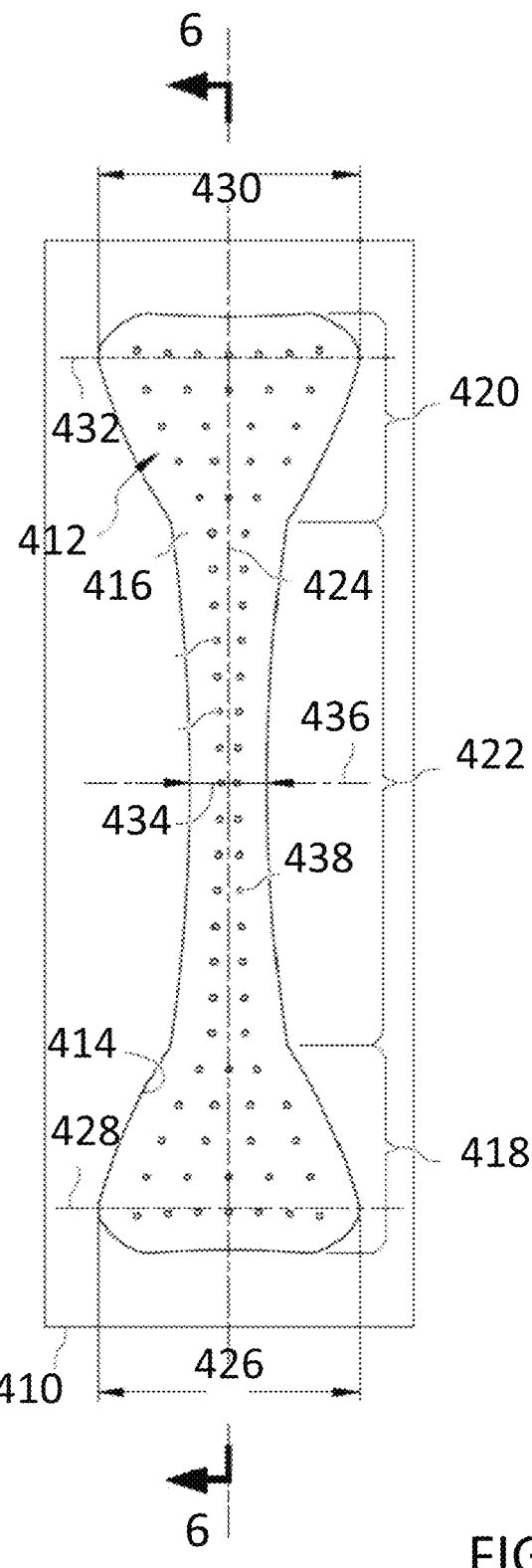
FIG. 5 is a top down view of an apparatus for shaping a gob of glass according to aspects of the present disclosure.

Referring to FIG. 5, according to an aspect of the present disclosure, the manufacturing apparatus 210 (FIG. 3) can comprise a pre-forming apparatus 410 that can function as the shaping apparatus 220 (FIG. 3). For example, the pre-forming apparatus 410 can be positioned at the location of the shaping apparatus 220 of FIG. 3, with the pre-forming apparatus 410 positioned downstream from the glass delivery apparatus 212 and upstream from the mold 222 relative to the travel direction 218. FIG. 5 illustrates a top-down view of the pre-forming apparatus 410. The pre-forming apparatus 410 can define a forming cavity 416 that can receive the molten glass 214 (FIG. 3) from the glass delivery apparatus 212, and can impart a corresponding shape to the gob 224. The pre-forming apparatus 410 can comprise several materials, for example, graphite, stainless steel, platinum, and/or nickel. According to an aspect, the molten glass 214, upon being received within the pre-forming apparatus 410, can comprise a viscosity that is within a range from about 100 poise to about 5000 poise, and in some instances to no more than about 1200 poise for thinner parts with larger surface areas, as disclosed herein. Glasses suitable to achieve such viscosities, along with other properties useful for certain parts, such as toughness and color, are disclosed herein.

The pre-forming apparatus 410 can comprise one or more walls 414 that surround and define the forming cavity 416. The forming cavity 416 comprises a hollow space or void, surrounded by the one or more walls 414, within which the molten glass 214 can be received, with the molten glass 214 (FIG. 3) adopting the shape of the forming cavity 416. The forming cavity 416 can comprise, for example, a first cavity end 418, a second cavity end 420, and a central cavity region 422 that extends between the first cavity end 418 and the second cavity end 420. The forming cavity 416 can extend along a forming axis 424 between the first cavity end 418 and the second cavity end 420. According to an aspect, the forming axis 424 can extend through the first cavity end 418, the second cavity end 420, and the central cavity region 422, with the forming axis 424 bisecting the forming cavity 416 into two substantially equal parts.

The forming cavity 416 can comprise a shape that substantially matches the shape 316 of the gob 224 illustrated in FIG. 4 (e.g. so-called dog-bone shape; or whatever shape is useful to achieve a particular gob-pressed glass part geometry). For example, the forming cavity 416 can comprise a non-constant cross-sectional size along the forming axis 424 from the first cavity end 418 to the second cavity end 420. The first cavity end 418 is sized and shaped to match and produce the first glass end 320, the second cavity end 420 is sized and shaped to match and produce the second glass end 322, and the central cavity region 422 is sized and shaped to match and produce the central region 324. According to an aspect, the first cavity end 418 can comprise a first width 426 along a first width axis 428 that is perpendicular to the forming axis 424. The first width axis 428 may be substantially parallel to a support surface 412 of the pre-forming apparatus 410 upon which the gob 224 is supported. According to an aspect, the first width 426 may comprise a maximum width of the first cavity end 418 and a maximum width of the forming cavity 416. The second cavity end 420 can comprise a second width 430 along a second width axis 432 that is perpendicular to the forming axis 424. The second width axis 432 may be substantially parallel to the support surface 412 of the pre-forming apparatus 410 upon which the gob 224 is supported. According to an aspect, the second width 430 may comprise a maximum width of the second cavity end 420 and a maximum width of the forming cavity 416. According to an aspect, the first width axis 428 may be substantially parallel to the second width axis 432, with the first width 426 substantially equal to the second width 430 (e.g., within 10%).

The central cavity region 422 can comprise a central width 434 along a central cavity axis 436 that is perpendicular to the forming axis 424 and parallel to the first width axis 428 and the second width axis 432. According to an aspect, the central cavity region 422 can comprise a substantially constant width (e.g., the central width 434) along the length of the central cavity region 422 between the first cavity end 418 and the second cavity end 420. Alternatively, the central cavity region 433 can comprise a decreasing width from the first cavity end 418 until reaching a minimum width (e.g., illustrated as the central width 434 in FIG. 5) before increasing in width toward the second cavity end 420. According to an aspect, the central width 434 may be less than the first width 428 and less than the second width 430. In this way, the forming cavity 416 can comprise a maximum width at the cavity ends 418, 420 and a minimum width at the central cavity region 422.

Figure 6:
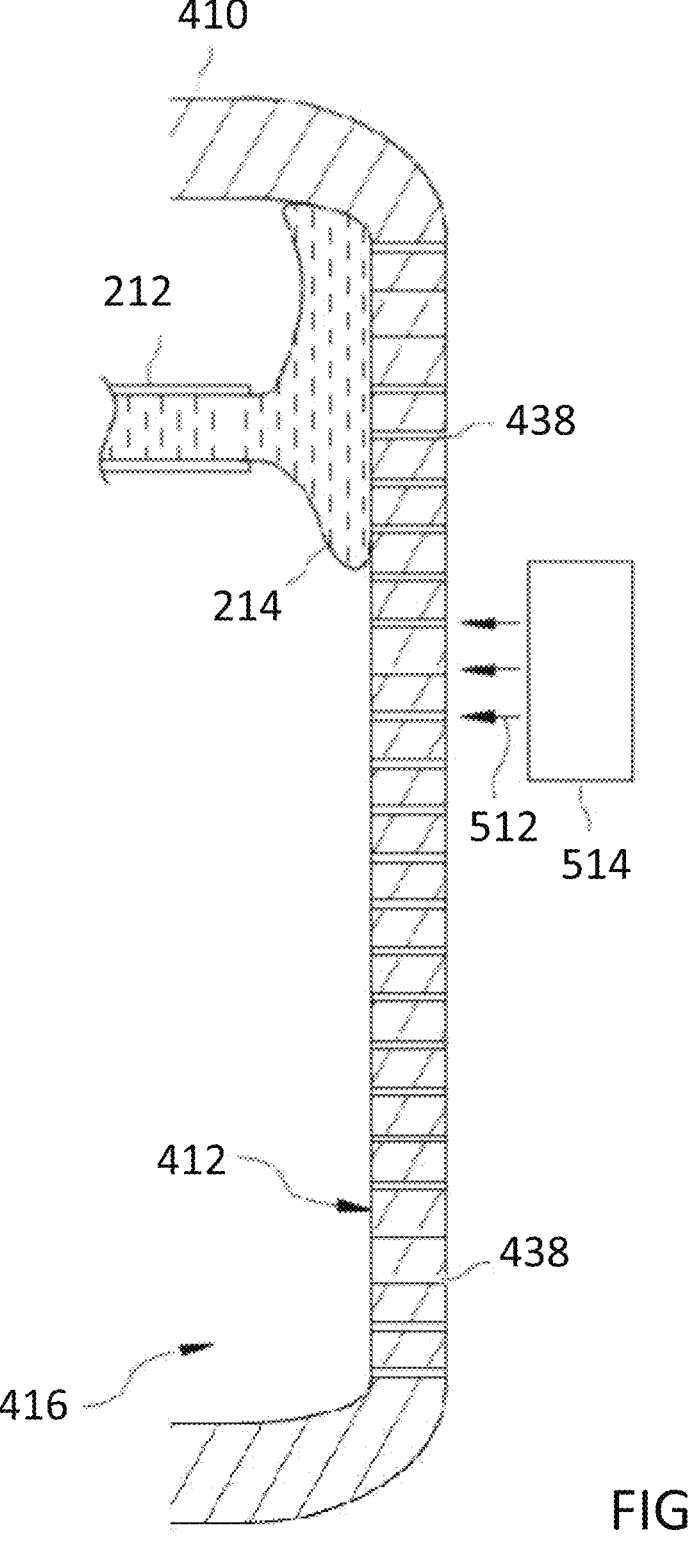
FIG. 6 is a cross-sectional view of the apparatus of FIG. 5 taken along line 6-6 of FIG. 5 with glass entering the apparatus according to aspects of the present disclosure.
Figure 8:
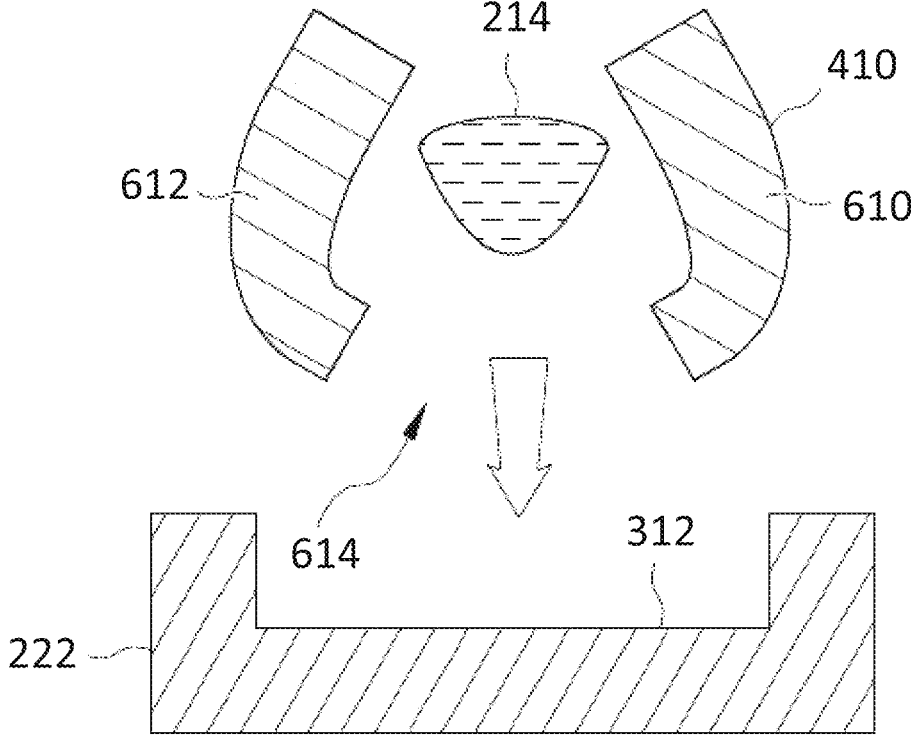
FIG. 8 is a front view of the apparatus of FIG. 7 from the vantage of line 8-8 in FIG. 7 according to aspects of the present disclosure.

Referring to FIGS. 5-6, according to an aspect of the present disclosure, the pre-forming apparatus 410 can comprise a plurality of openings 438 through which gas 512 (e.g., illustrated in FIG. 6) can flow to impinge upon the molten glass 214 when the molten glass 214 is received within the forming cavity 416. The gas may be heated to influence a temperature of the gob 224, such as at temperatures above 500° C. FIG. 6 illustrates a sectional view of the pre-forming apparatus 410 as viewed from the perspective indicated by lines 6-6 of FIG. 5, where the glass delivery apparatus 212 is delivering the glass 214 into the forming cavity 416. The plurality of openings 438 can be formed in a support surface 412 of the pre-forming apparatus 410, with the support surface 412 extending between the walls 414 and forming a bottom of the forming cavity 416. According to an aspect, the plurality of openings 438 can be spaced apart along the support surface 412 and may extend through the support surface 412. According to an aspect, the support surface 412 can comprise a rounded or curved shape (e.g., as illustrated in FIG. 8). According to an aspect, the support surface 412 can comprise a porous material, for example, porous graphite such that the plurality of openings 438 can extend through the porous material of the support surface 412. In this way, the porous material of the support surface 412 comprises the plurality of openings 438 in the form of void spaces or holes extending through the support surface 412. Accordingly, methods can comprise delivering a gas through the plurality of openings 438, wherein the plurality of openings 438 are the void spaces or holes that extend through the porous material of the support surface 412.

The pre-forming apparatus 410 can be coupled to a gas source 514 (FIG. 6) in fluid communication with the plurality of openings 438. For example, the gas source 514 can comprise a pump, a cannister, a cartridge, a boiler, a compressor, and/or a pressure vessel, for example. The gas source 514 can deliver compressed air or gas (e.g., air or gas kept under a pressure that is greater than atmospheric pressure) to the plurality of openings 438, whereupon gas 512 can flow through the plurality of openings 438 and into the forming cavity 416. In this way, the gas 512 can impinge upon the glass 214 (e.g., when the glass 214 is received within the forming cavity 416) and apply a force to the glass 214 to support the glass 214 spaced apart from the support surface 412. As indicated above, the gas may also be heated prior to receipt by the pre-forming apparatus 410. For example, the glass 214 may not contact the support surface 412, but, rather, may be spaced a distance apart from the support surface 412 while positioned within the forming cavity 416. In addition, or in the alternative, the walls 414 (FIG. 5) can also comprise some of the plurality of openings 438, such that the gas 512 may support the glass 214 spaced apart from the walls 414. According to an aspect, the gas 512 may comprise air, and/or nitrogen, for example.

Figure 7:
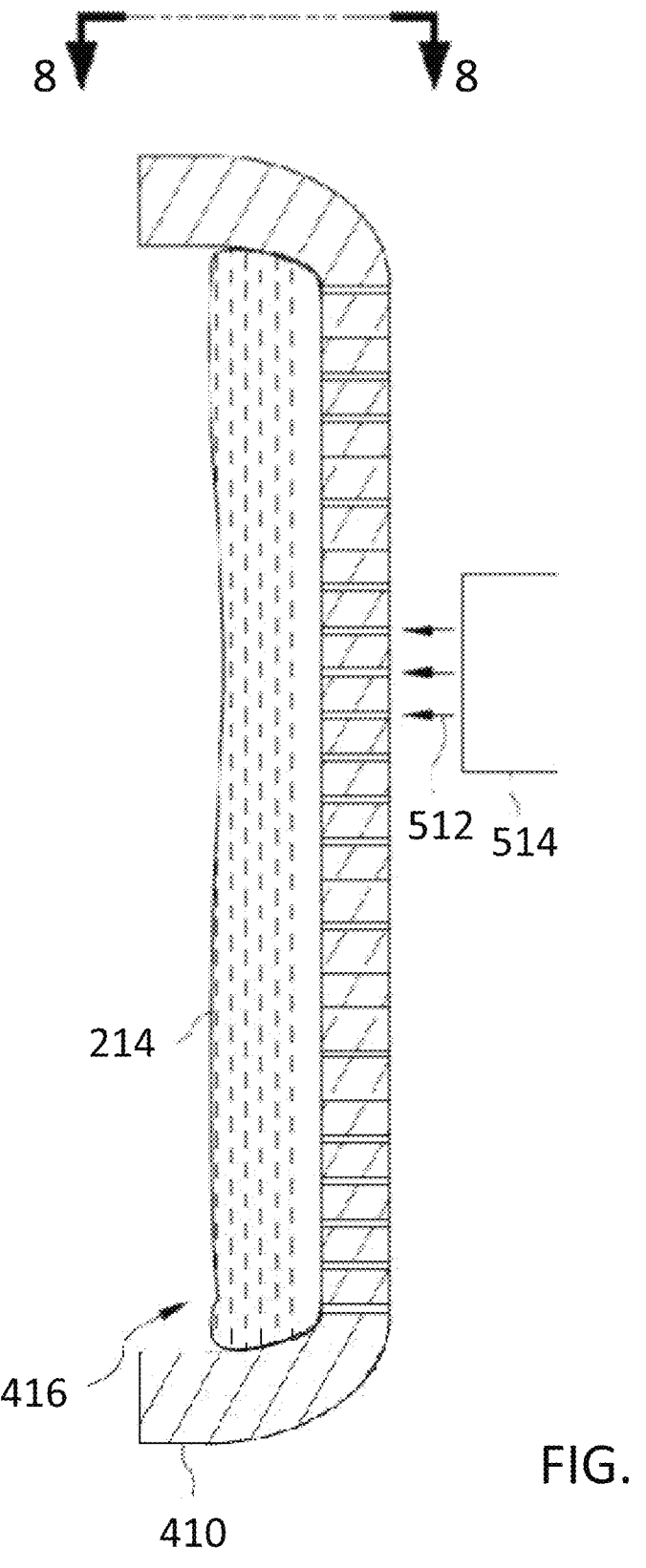
FIG. 7 is a cross-sectional view of the apparatus of FIG. 5 taken along line 6-6 of FIG. 5 with the glass filling the apparatus according to aspects of the present disclosure.

According to an aspect of the present disclosure, FIG. 7 illustrates the forming cavity 416 substantially filled with the glass 214 (see also gob 224) after a period of time has passed (e.g., after FIG. 6). Due to the shape of the forming cavity 416 (e.g., illustrated in FIG. 5), the glass 214 may form a shape that substantially matches the shape of the forming cavity 416, such that the glass 214 is in the shape 316.

According to an aspect of the present disclosure, FIG. 8 illustrates an end view of the pre-forming apparatus 410 as viewed from the perspective indicated by lines 8-8 of FIG. 7. For example, according to an aspect, the pre-forming apparatus 410 can comprise a plurality of segments, such as, a first segment 610 and a second segment 612. The first segment 610 and the second segment 612 may be moved between a first position and a second position. For example, when the first segment 610 and the second segment 612 are in the first position, the first segment 610 is attached to the second segment 612 and the forming cavity 416 is defined within the pre-forming apparatus 410. As used herein, by being attached, the first segment 610 and the second segment 612 can be connected or bonded to one another or, alternatively, may be positioned adjacent and/or in contact with one another while not being permanently affixed to one another. However, while being attached in the first position, the first segment 610 and the second segment 612 can be adjacent to one another to form the forming cavity 416 such that the glass 214 may not inadvertently exit the forming cavity 416 through a space between the first segment 610 and the second segment 612. That is, spaces between the first segment 610 and the second segment 612 may be minimized to avoid the likelihood of inadvertent exit of the glass 214. It will be appreciated that the glass 214 is illustrated generically/schematically in the end view of FIG. 8 so as not to obstruct the view of the segments 610, 612. Indeed, from a top-down view, the glass 214 comprises the shape of the forming cavity 416 illustrated in FIG. 5. However, for the purposes of illustration, FIG. 8 shows a generic/schematic representation of the glass 214 to illustrate a position of the glass 214 (e.g., between the segments 610, 612) and a travel path of the glass 214 when exiting the forming cavity 416 and passing to the mold cavity 312.

When the first segment 610 and the second segment 612 are in the second position (e.g., illustrated in FIG. 8), the first segment 610 may be separated from the second segment 612 and an opening 614 is defined between the first segment 610 and the second segment 612 through which the molten glass 214 comprising the shape 316 (FIG. 4) may pass. For example, when the first segment 610 and the second segment 612 are moved from the first position to the second position, the first segment 610 and the second segment 612 can separate from one another such that the first segment 610 and the second segment 612 may no longer be adjacent to and/or attached to one another. In this way, the first and second segments 610, 612 can be moved apart to form the opening 614 between the first segment 610 and the second segment 612. According to an aspect, the opening 614 may be formed along the forming axis 424 (FIG. 5), for example, with the forming axis 424 extending substantially parallel to the junction between the first segment 610 and the second segment 612 when the first segment 610 and the second segment 612 are in the first position. According to an aspect, the opening 614 may comprise a width (e.g., distance separating the first segment 610 and the second segment 612) that is greater than a maximum width of the glass 214 in the form of the gob 224. As such, the gob 224 may exit the pre-forming apparatus 410, for example, by falling downwardly (e.g., indicated with arrowhead in FIG. 8) along the direction of gravity from the pre-forming apparatus 410 to the mold 222. For example, the mold 222 may be positioned below the pre-forming apparatus 410, such that the glass 214 (e.g., in the form of gob 224) can be received within the mold 222. The glass 214 may maintain the shape 316 upon exiting the pre-forming apparatus 410 and upon being received within the mold cavity 312. In this way, after exiting the pre-forming apparatus 410 by passing through the opening 614 and being received within the mold cavity 312, the gob 224 can maintain the shape 316 and may be supported on the mold 222 in substantially the same manner as illustrated and described relative to FIG. 4. According to an aspect, the molten glass 214 may spend less than about one second pre-forming apparatus 410 prior to being delivered to the mold 222.

As illustrated in FIGS. 5-8, a method step of shaping the molten glass 214 can comprise receiving the molten glass 214 within the forming cavity 416 of the pre-forming apparatus 410 to impart the shape 316 to the molten glass 214, forming the shaped gob 224. For example, FIGS. 6-7 illustrate the molten glass 214 being received within the forming cavity 416. Due to the shape of the forming cavity 416 (e.g., illustrated in FIG. 5), the molten glass 214 can adopt the shape, with the shape substantially matching the shape 316 illustrated in FIG. 4 for example, however other shapes may be used depending upon the desired glass part. Methods can comprise separating the first segment 610 of the pre-forming apparatus 410 from the second segment 612 of the pre-forming apparatus 410 to form the opening 614 between the first segment 610 and the second segment 612, wherein the molten glass 214 can pass through the opening 614 while comprising the shape 316. In this way, the molten glass 214 can maintain the shape 316 upon exiting the pre-forming apparatus 410 and while being received by the mold 222. According to an aspect, and as illustrated in FIG. 6, methods can comprise delivering the gas 512 through the plurality of openings 438 in the pre-forming apparatus 410, with the gas 512 impinging upon the molten glass 214. As indicated, the gas 512 may be heated. In this way, the molten glass 214 may be maintained in a spaced apart configuration from the walls 414 and/or the support surface 412 of the pre-forming apparatus 410. According to an aspect, while FIGS. 5-8 illustrate a single pre-forming apparatus 410, additional pre-forming apparatuses 410 may be provided to increase output. For example, while one pre-forming apparatus is receiving molten glass 214, a second pre-forming apparatus can be delivering molten glass to the mold 222. Further, according to an aspect of the present disclosure, the pre-forming apparatus 410 can also be cooled (e.g., via air-cooling or water cooling) to limit the likelihood of the pre-forming apparatus 410 overheating.

It will be appreciated that FIG. 5 illustrates the mold segments 610, 612 (FIG. 8) together and in contact with one another, such that the mold segments 610, 612 can together form the forming cavity 416. The mold segments 610, 612 can be maintained together and in contact with one another as the molten glass 214 is delivered to the forming cavity 416. In this way, the molten glass 214 is limited from inadvertently exiting the forming cavity 416. With reference to FIG. 5, the mold segments 610, 612 are brought together and in contact with one another along the forming axis 424. As illustrated in FIG. 8, at a predetermined time, the mold segments 610, 612 can be moved apart to form the opening 614, with the opening 614 extending along the forming axis 424. With reference to FIGS. 5 and 8, by being moved apart (e.g., to form the opening 614), the first segment 610 can move relative to the second segment 612, and/or the second segment 612 can move relative to the first segment 610 in a direction having a component perpendicular to the forming axis 424, such that the first segment 610 and the second segment 612 can be separated. As such, the molten glass 214 can exit the forming cavity 416 through the opening 614.

Figure 9:
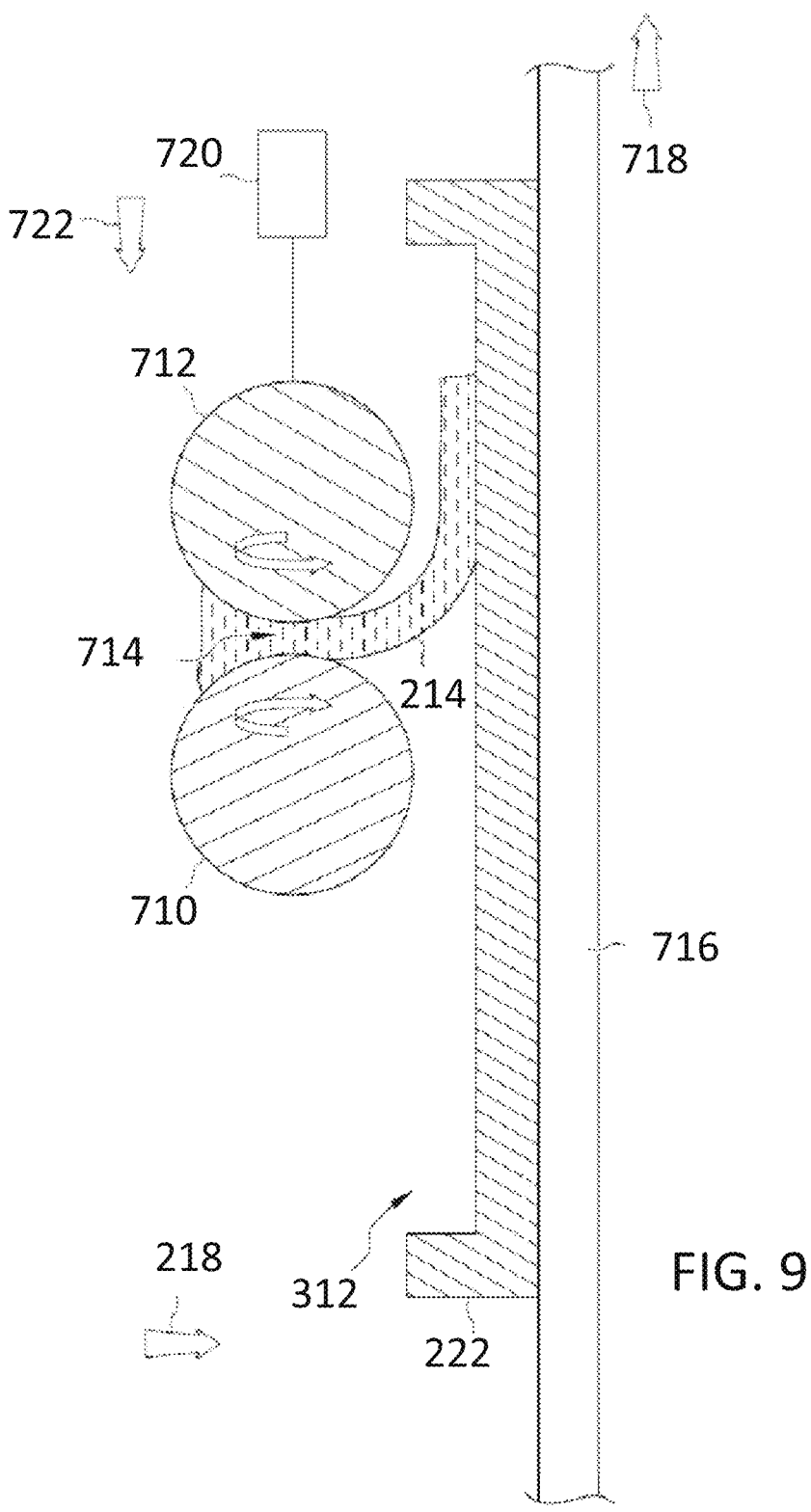
FIG. 9 is a side view of another apparatus for shaping a gob of glass according to aspects of the present disclosure.

Referring to FIG. 9, according to an aspect, the glass-based manufacturing apparatus 210 (FIG. 3) can comprise one or more forming rolls, for example, a first forming roll 710 and a second forming roll 712, that can function as the shaping apparatus 220. For example, the first forming roll 710 and the second forming roll 712 can be positioned at the location of the shaping apparatus 220 of FIG. 3, with the first forming roll 710 and the second forming roll 712 positioned downstream from the glass delivery apparatus 212 and upstream from the mold 222 relative to the travel direction 218.

FIG. 9 illustrates a side view of the first forming roll 710 and the second forming roll 712. The first forming roll 710 and the second forming roll 712 can be spaced apart from one another to define a gap 714 between the first forming roll 710 and the second forming roll 712, wherein the gap 714 can provide the molten glass 214 with a width and a thickness. As will be described relative to FIGS. 9-12, the first forming roll 710 and the second forming roll can impart the shape 316 to the glass 214.

As illustrated in FIG. 9, the mold 222 can be positioned downstream from the gap 714 and can receive the molten glass 214 comprising the shape 316. The molten glass 214 can be received within the mold cavity 312 of the mold 222 after passing through the gap 714. According to an aspect, the manufacturing apparatus 210 (FIG. 3) can comprise a conveyor 716 supporting the mold 222, with the conveyor 716 moving the mold 222 relative to the first forming roll 710 and the second forming roll 712 in a second travel direction 718 that is angled relative to the travel direction 218. The conveyor 716 can comprise, for example, a belt conveyor (e.g., comprising two or more pulleys with a conveyor belt or other endless loop carrying apparatus rotating about the pulleys), one or more air bearings, one or more rollers, etc. By being angled relative to the travel direction 218, the second travel direction 718 may be non-parallel with the travel direction 218. For example, according to an aspect, the second travel direction 718 can comprise the direction along which the mold 222 moves when the mold 222 receives the molten glass 214. According to an aspect, the second travel direction 718 can form an angle relative to the travel direction 218 that may be within a range from about 1° to about 179°, or within a range from about 45° to about 135°, or within a range from about 60° to about 120°, or within a range from about 85° to about 95°. In the illustrated example of FIG. 9, the second travel direction 718 can form an angle relative to the travel direction 218 that is about 90° (e.g., by being substantially perpendicular to the travel direction 218).

In addition, or in the alternative, the manufacturing apparatus 210 (FIG. 3) can comprise a movement apparatus 720 (e.g., linear actuator) attached to the first forming roll 710 and the second forming roll 712, with the movement apparatus 720 configured to move the first forming roll 710 and the second forming roll 712 relative to the mold 222 in a third travel direction 722 that is angled relative to the travel direction 218. For example, the movement apparatus 720 can be attached to the first forming roll 710 and the second forming roll 712 such that the movement apparatus 720 can move the first forming roll 710 and the second forming roll 712 while maintaining the size of the gap 714 between the first forming roll 710 and the second forming roll 712. By being angled relative to the travel direction 218, the third travel direction 722 may be non-parallel with the travel direction 218. For example, according to an aspect, the third travel direction 722 can comprise the direction along which the forming rolls 710, 712 move when the forming rolls 710, 712 deliver the molten glass 214 to the mold 222. According to an aspect, the third travel direction 722 can form an angle relative to the travel direction 218 that may be within a range from about 1° to about 179°, or within a range from about 45° to about 135°, or within a range from about 60° to about 120°, or within a range from about 85° to about 95°. In the illustrated example of FIG. 9, the third travel direction 722 can form an angle relative to the travel direction 218 that is about 90° (e.g., by being substantially perpendicular or normal to the travel direction 218). According to an aspect, the third travel direction 722 may be substantially opposite the second travel direction 718. In this way, the forming rolls 710, 712 can be moved (e.g., by the movement apparatus 720) in the third travel direction 722 relative to the mold 222. In addition, or in the alternative, the mold 222 can be moved (e.g., by the conveyor 716) in the second travel direction 718 relative to the forming rolls 710, 712. By moving the forming rolls 710, 712 and/or the mold 222, the mold 222 can receive the molten glass 214 after the molten glass 214 has adopted the shape 316, with the molten glass 214 received and positioned in a location similar to the location illustrated in FIG. 4.

Figure 10:
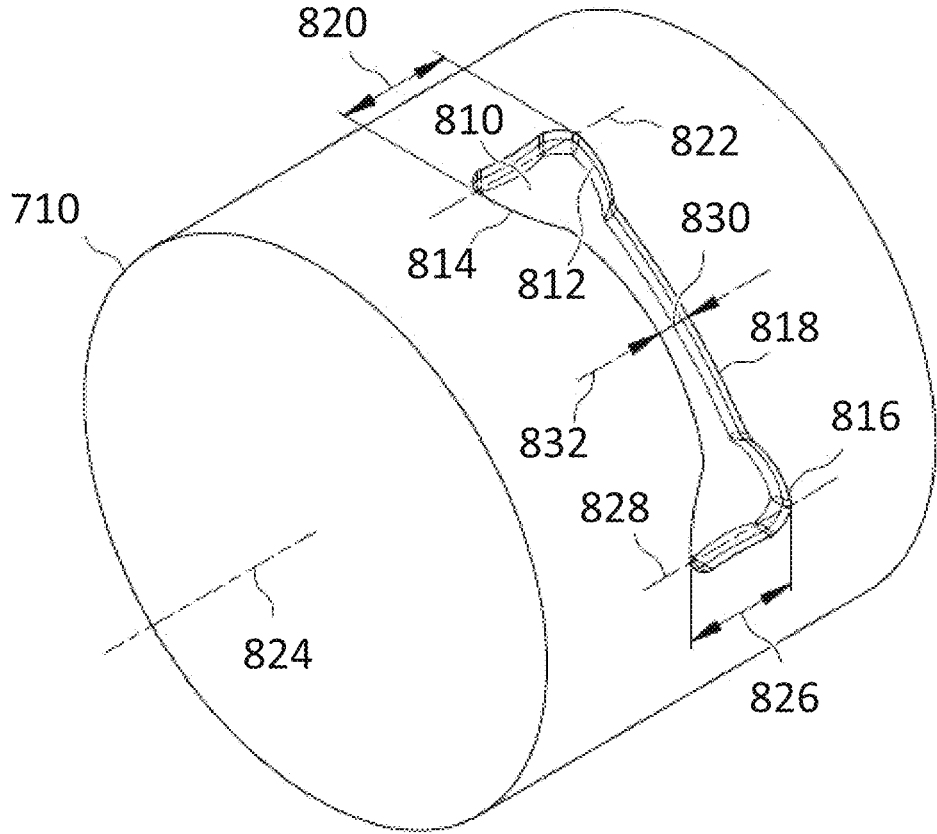
FIG. 10 is a perspective view of part of the apparatus of FIG. 9 according to aspects of the present disclosure.

FIG. 10 illustrates a perspective view of the first forming roll 710. According to an aspect, the first forming roll 710 can comprise a textured pocket 810 that can receive the molten glass 214 and impart the corresponding shape 316 to the molten glass 214. The textured pocket 810 can comprise a void, cavity, depression, channel, etc. formed in a surface of the first forming roll 710. The first forming roll 710 can comprise one or more walls 812 that surround and define the textured pocket 810. The textured pocket 810 can comprise, for example, a first pocket end 814, a second pocket end 816, and a central pocket region 818 that extends between the first pocket end 814 and the second pocket end 816. The textured pocket 810 may extend about a perimeter of the first forming roll 710.

The textured pocket 810 can comprise a shape that substantially matches the shape 316 illustrated in FIG. 2. For example, the textured pocket 810 can comprise a non-constant cross-sectional size from the first pocket end 814 to the second pocket end 816. For example, the first pocket end 814 can comprise a first width 820 along a first width axis 822 that is substantially parallel to a first roll axis 824 of the first forming roll 710. The first roll axis 824 can extend through the first forming roll 710 and the first forming roll 710 can rotate about the first roll axis 824. According to an aspect, the first width 820 can comprise a maximum width of the first pocket end 814 and a maximum width of the textured pocket 810. The second pocket end 816 can comprise a second width 826 along a second width axis 828 substantially parallel to the first width axis 822. According to an aspect, the second width 826 can comprise a maximum width of the second pocket end 816 and a maximum width of the textured pocket 810. The central pocket region 818 can comprise a central width 830 along a central pocket axis 832 substantially parallel to the first width axis 822. According to an aspect, the central pocket region 818 can comprise a substantially constant width (e.g., the central width 830) along the length of the central pocket region 818 between the first pocket end 814 and the second pocket end 816. Alternatively, the central pocket region 818 can comprise a decreasing width from the first pocket end 814 until reaching a minimum width (e.g., illustrated as the central width 830 in FIG. 10) before increasing in width toward the second pocket end 816. According to an aspect, the central width 830 may be less than the first width 820 and less than the second width 826. In this way, the textured pocket 810 can comprise a maximum width at the pocket ends 814, 816 and a minimum width at the central pocket region 818.

Figure 11:
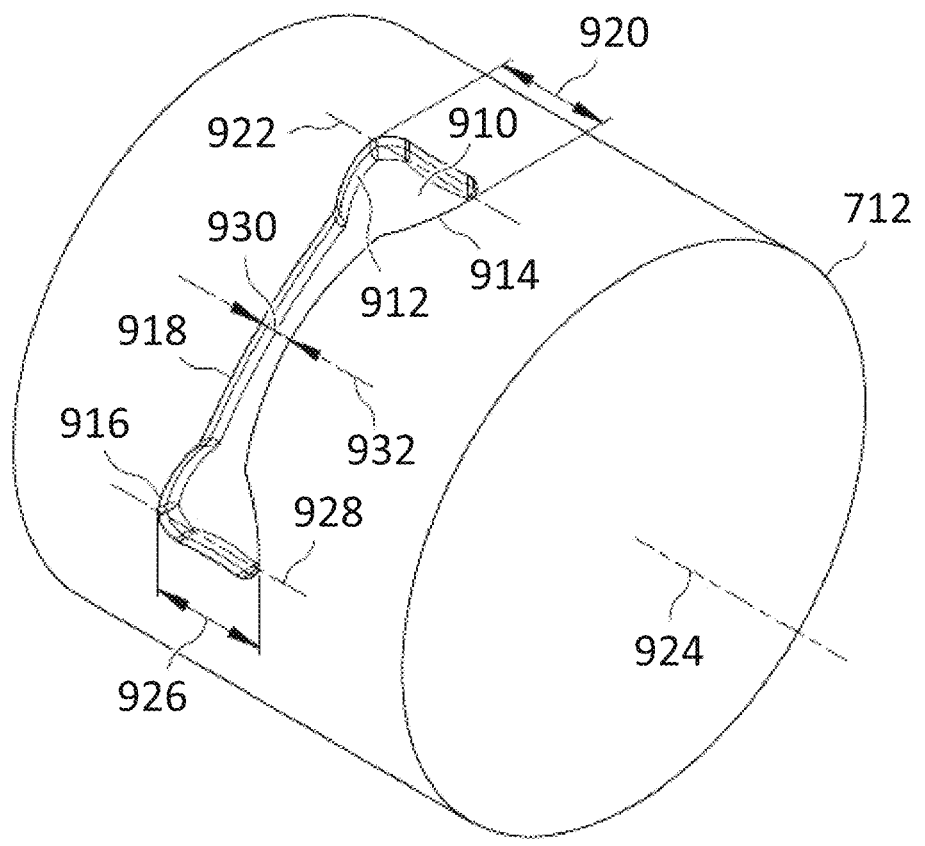
FIG. 11 is a perspective view of another part of the apparatus of FIG. 9 according to aspects of the present disclosure.

According to an aspect, one or more of the forming rolls 710, 712 may comprise a textured pocket (e.g., the textured pocket 810 illustrated in FIG. 8). For example, according to an aspect, the first forming roll 710 may comprise the textured pocket 810 while the second forming roll 712 may not comprise a textured pocket, but, rather, may comprise a substantially smooth outer circumferential surface. In this way, the glass 214 may be received within the textured pocket 810, such that the textured pocket 810 can impart the shape 316 to the glass 214. In the alternative, the first forming roll 710 and the second forming roll 712 may each comprise a textured pocket that, together, can assist in imparting the shape 316 to the glass 214. For example, FIG. 11 illustrates an example of the second forming roll 712 in which the second forming roll 712 can comprise a second textured pocket 910. The second textured pocket 910 may be substantially identical in shape and size to the textured pocket 810 of the first forming roll 710.

The second textured pocket 910 (FIG. 11) can comprise a void, cavity, depression, channel, etc. formed in a surface of the second forming roll 712. The second forming roll 712 can comprise one or more walls 912 that surround and define the second textured pocket 910. The second textured pocket 910 can comprise, for example, a third pocket end 914, a fourth pocket end 916, and a second central pocket region 918 that extends between the third pocket end 914 and the fourth pocket end 916. The second textured pocket 910 can extend about a perimeter of the second forming roll 712.

The second textured pocket 910 can comprise a shape that substantially matches the shape 316 illustrated in FIG. 2 or other shapes, depending upon the desired glass part. For example, the second textured pocket 910 can comprise a non-constant cross-sectional size from the third pocket end 914 to the fourth pocket end 916. For example, the third pocket end 914 can comprise a third width 920 along a third width axis 922 that is substantially parallel to a second roll axis 924 of the second forming roll 712. The second roll axis 924 can extend through the second forming roll 712 and the second forming roll 712 can rotate about the second roll axis 924. According to an aspect, the third width 920 can comprise a maximum width of the third pocket end 914 and a maximum width of the second textured pocket 910. The fourth pocket end 916 can comprise a fourth width 926 along a fourth width axis 928 substantially parallel to the third width axis 922. According to an aspect, the fourth width 926 can comprise a maximum width of the fourth pocket end 916 and a maximum width of the second textured pocket 910. The second central pocket region 918 can comprise a second central width 930 along a second central pocket axis 932 substantially parallel to the third width axis 922. According to an aspect, the second central pocket region 918 can comprise a substantially constant width (e.g., the second central width 930) along the length of the second central pocket region 918 between the third pocket end 914 and the fourth pocket end 916. Alternatively, the second central pocket region 918 can comprise a decreasing width from the third pocket end 914 until reaching a minimum width (e.g., illustrated as the second central width 930 in FIG. 11) before increasing in width toward the fourth pocket end 916. According to an aspect, the second central width 930 may be less than the third width 920 and less than the fourth width 926. In this way, the second textured pocket 910 can comprise a maximum width at the pocket ends 914, 916 and a minimum width at the second central pocket region 918.

According to an aspect of the present disclosure, the size and shape of the textured pocket 810 (FIG. 10) can substantially match or mirror the second textured pocket 910 (FIG. 11). For example, the first width 820 of the first pocket end 814 can be substantially equal to the third width 920 of the third pocket end 914. The second width 826 of the second pocket end 816 can be substantially equal to the fourth width 926 of the fourth pocket end 916. The central width 830 of the central pocket region 818 can be substantially equal to the second central width 930 of the second central pocket region 918. In this way, the glass 214 can be received within the textured pocket 810 and the second textured pocket 910, with the textured pockets 810, 910 configured to impart the shape 316 to the glass 214.

FIG. 12 illustrates a side view of the forming rolls 710, 712. According to an aspect, the textured pocket 810 can be rotationally aligned with the second textured pocket 910 such that as the forming rolls 710, 712 rotate, the textured pockets 810, 910 can be positioned and rotationally aligned to simultaneously receive the glass 214. For example, by being rotationally aligned, the first pocket end 814 can be rotationally aligned with the third pocket end 914. In this way, as the forming rolls 710, 712 rotate, the first pocket end 814 can be located at a matching circumferential location as the third pocket end 914. Likewise, by being rotationally aligned, the second pocket end 816 can be rotationally aligned with the fourth pocket end 916. In this way, as the forming rolls 710, 712 rotate, the second pocket end 816 can be located at a matching circumferential location as the fourth pocket end 916. Further, the central pocket region 818 can be rotationally aligned with the second central pocket region 918, such that as the forming rolls 710, 712 rotate, the central pocket region 818 can be located at a matching circumferential location as the second central pocket region 918. In this way, in addition to rotational alignment of the textured pockets 810, 910, the forming rolls 710, 712 can be synchronized to rotate at substantially the same rotational velocity such that the textured pockets 810, 910 may remain in rotational alignment. Accordingly, shaping the molten glass 214 can comprise receiving the molten glass 214 within the textured pocket 810 of the first forming roll 710 to impart the shape 316 to the molten glass 214 to make the gob 224. According to an aspect, methods can further comprise receiving the molten glass 214 within the second textured pocket 910 of the second forming roll 712 to impart the shape 316 to the molten glass 214.

After the glass 214 has been received within one or more of the textured pockets 810, 910, the glass 214 may fall downwardly along the direction of gravity from the forming rolls 710, 712 to the mold 222. For example, the mold 222 may be positioned below the forming rolls 710, 712 (e.g., as illustrated in FIG. 9), such that the gob 224, which is the glass 214 after shaping, can then be received within the mold cavity 312. The gob 224 may maintain the shape 316 upon exiting the textured pockets 810, 910 and upon being received within the mold cavity 312. In this way, after exiting the textured pockets 810, 910 and being received within the mold cavity 312, the gob 224 can maintain the shape 316 and may be supported on the mold 222 in substantially the same manner as illustrated and described relative to FIG. 4.

Figure 14:
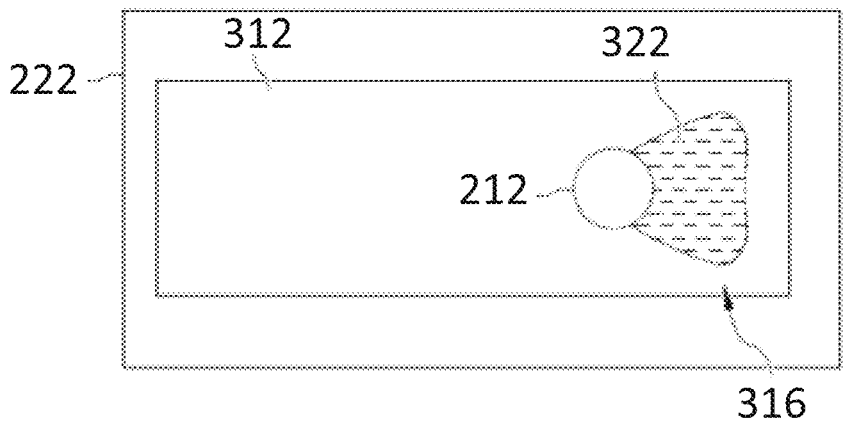
FIGS. 14-16 are top down views of part of the apparatus of FIG. 13 with different amounts of glass filling the apparatus according to aspects of the present disclosure.
Figure 15:
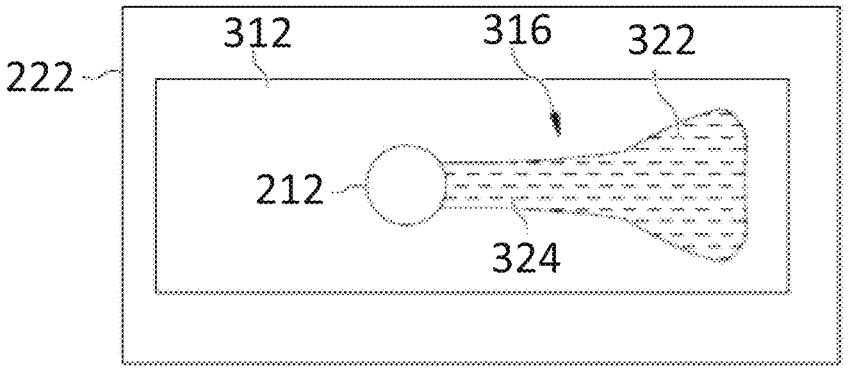
Figure 16:
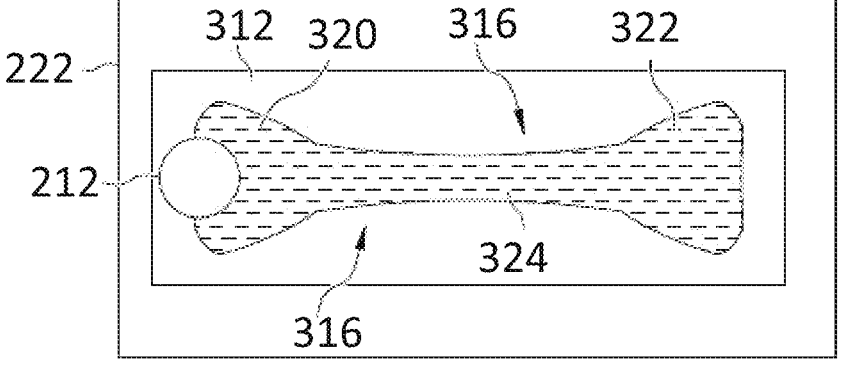

Referring to FIG. 13, according to an aspect, the conveyor 716 can move the mold 222 in the second travel direction 718 relative to the glass delivery apparatus 212. The conveyor 716 can be controlled by a control apparatus 1010 which can alter the velocity at which the mold 222 moves in the second travel direction 718. The control apparatus 1010 can be in operative association with the mold 222 and the conveyor 716. For example, the control apparatus 1010 can be electrically connected to the conveyor 716 and can control movement (for example, velocity, start and/or stop time) of the conveyor 716, for example, a belt of the conveyor 716. The conveyor 716 can support the mold 222 such that as the control apparatus 1010 controls movement of the conveyor 716, the resulting movement of the conveyor 716 can be transferred to the mold 222 with the conveyor 716 moving the mold 222 relative to the delivery apparatus 212 in the second travel direction 718. In this way, the control apparatus 1010 can control a velocity of the mold 222 in the second travel direction 718 via controlling movement of the conveyor 716. Accordingly, the change in velocity, as controlled by the control apparatus 1010, can function as the shaping apparatus 220. As such, according to an aspect, zero intervening structures may be positioned in the travel path 216 (FIG. 3) of the glass 214 between the delivery apparatus 212 and the mold 222. FIG. 13 illustrates a side view of delivery apparatus 212 and the mold 222, while FIGS. 14-16 illustrate top-down views of the delivery apparatus 212 delivering glass 214 to the mold 222. With reference to FIG. 13, shaping the molten glass 214 can comprise moving the mold 222 relative to the delivery apparatus 212 from which the molten glass 214 is delivered, for example, with the molten glass 214 exiting the delivery apparatus 212 in the travel direction 218. According to an aspect, the molten glass 214, upon being received within the mold 222, can comprise a viscosity that is within a range from about 100 poise to about 5000 poise.

With reference to FIGS. 14-16, moving the mold 222 may comprise altering a velocity of the mold 222 relative to the delivery apparatus 212. For example, FIG. 14 illustrates the delivery apparatus 212 delivering the glass 214 to the mold cavity 312 and the formation of the second glass end 322. Initially, and during the formation of the second glass end 322, the mold 222 can be moved relative to the delivery apparatus 212 in the second travel direction 718 at a first velocity while the molten glass 214 is delivered to the mold 222 to form the second glass end 322. Referring to FIG. 13, following the formation of the second glass end 322, the mold 222 can be moved relative to the delivery apparatus 212 in the second travel direction 718 (FIG. 13) at a second velocity while the molten glass 214 is delivered to the mold 222 to form the central region 324. According to an aspect, the first velocity may be different than the second velocity. For example, the first velocity may be less than the second velocity. The difference in velocity may be based on the volume of the glass 214 that comprises the various portions of the shape 316. For example, due to the second glass end 322 comprising the second width 330, which is greater than the central width 334 of the central region 324, the second glass end 322 may comprise a larger volume of molten glass 214 than the central region 324. As such, the initial first velocity of the mold 222 may be slower, such that the delivery apparatus 212 can have sufficient time to deliver an amount of molten glass 214 that can form the second glass end 322. This approach may be used in conjunction with the hot glass delivery system 1610, as shown in FIG. 35A to further control flow of the glass 214, to shape the gob 224.

Following the formation of the second glass end 322 (e.g., illustrated in FIG. 12), the control apparatus 1010 can increase the speed of the conveyor 716, which can increase the velocity of the mold 222 from the first velocity to the second velocity. The second velocity may be greater than the first velocity due to the central region 324 comprising the central width 334 that is less than the second width 330 of the second glass end 322. As illustrated in FIG. 13, the mold 222 can continue moving in the second travel direction 718 at the second velocity at least until the delivery apparatus 212 has delivered the glass 214 to the mold cavity 312 to form the central region 324. As illustrated in FIG. 14, following the formation of the central region 324, the control apparatus 1010 can decrease the speed of the conveyor 716, which can decrease the velocity of the mold 222 from the second velocity to the third velocity. The third velocity may be different than the second velocity, for example, with the third velocity being less than the second velocity. According to an aspect, the third velocity may be substantially equal to the first velocity. The third velocity may be less than the second velocity due to the first glass end 320 comprising the first width 326 that is greater than the central width 334 of the central region 324. The mold 222 can be moved at the third velocity while the molten glass 214 is delivered to the mold 222 to form the first glass end 320. Accordingly, the control apparatus 1010 can move the mold 222 at (1) the first velocity as the mold 222 receives the molten glass 214 to form the second glass end 322 comprising the second width 330; (2) the second velocity, which is greater than the first velocity, as the mold 222 receives the molten glass 214 to form the central region 324 comprising the central width 334; and (3) the third velocity, which is less than the second velocity, as the mold 222 receives the molten glass 214 to form the first glass end 320 comprising the first width 326 that is less than the central width 334, wherein the central width 334 is less than the first width 326 and the second width 330. While FIGS. 12-14 illustrate the formation of the shape 316 of the gob 224 by altering the velocity of the mold 222 relative to the delivery apparatus 212, such a method of formation is not intended to be limiting. Rather, in addition, or in the alternative, the shape 316 can be formed by altering flow rates of the glass 214 passing through the delivery apparatus 212, as further explained below with respect to FIG. 35A and the corresponding auger 1612. For example, during formation of one or more of the ends 320, 322 and/or the central region 324, the flow rate can be altered such that the amount of the glass 214 delivered to the mold cavity 312 can be changed, thus affecting the shape of the glass 214 (e.g., and allowing the ends 320, 322 and the central region 324 to be formed).

Following the formation of the gob 224 of molten glass 214 comprising the shape 316, a pressing force can be applied to the molten glass 214 to cause the molten glass 214 to compress (e.g., in a thickness direction) and expand in a length-wise and width-wise direction. According to an aspect, following the application of the pressing force, the molten glass 214 can comprise a thickness that is within a range from about 1.25 millimeters to about 2 millimeters, or other thicknesses as disclosed herein. According to an aspect, following the application of the pressing force, the molten glass 214 can comprise a length within a range from about 100 millimeters to about 200 millimeters, or from about 140 millimeters to about 180 millimeters, or about 160 millimeters. According to an aspect, following the application of the pressing force, the molten glass 214 can comprise a width within a range from about 50 millimeters to about 100 millimeters, or from about 60 millimeters to about 90 millimeters, or about 75 millimeters. By providing the non-constant width of the shape 316, the glass 214 may spread (e.g., in response to the pressing force) in a more desirable and uniform manner in the length and width directions. That is, the glass 214 may exhibit more uniform spreading in the length and width directions.

In addition to shaping the gob 224, as disclosed above, Applicants find pressing down to make a particularly thin part, such as on the order of 1 mm in thickness, may be difficult due to the strong contact cooling from the metal mold and plunger. Further, Applicants find that the most impactful cooling happens during a dwell of the plunger, when the hot glass sits in the mold for a time (e.g., a few seconds) such as while waiting for the plunger. Applicants find that methods for controlling thermal response of the mold may minimize heat transfer while preventing the surface of the mold from overheating and entering the sticking regime, where it may be difficult if not impossible to remove such thin glass parts with large surfaces. To this end, Applicants have created a mold design with an air gap inside, for better control of the mold temperature response when glass gob-pressing. Thermal stability in the mold influences glass viscosity change during the pressing cycle, which impacts forces required to press the gob down to a target thickness. Keeping required forces under control, such as within a capability of pressing equipment, facilitates production of thinner glass parts.

Figure 17:
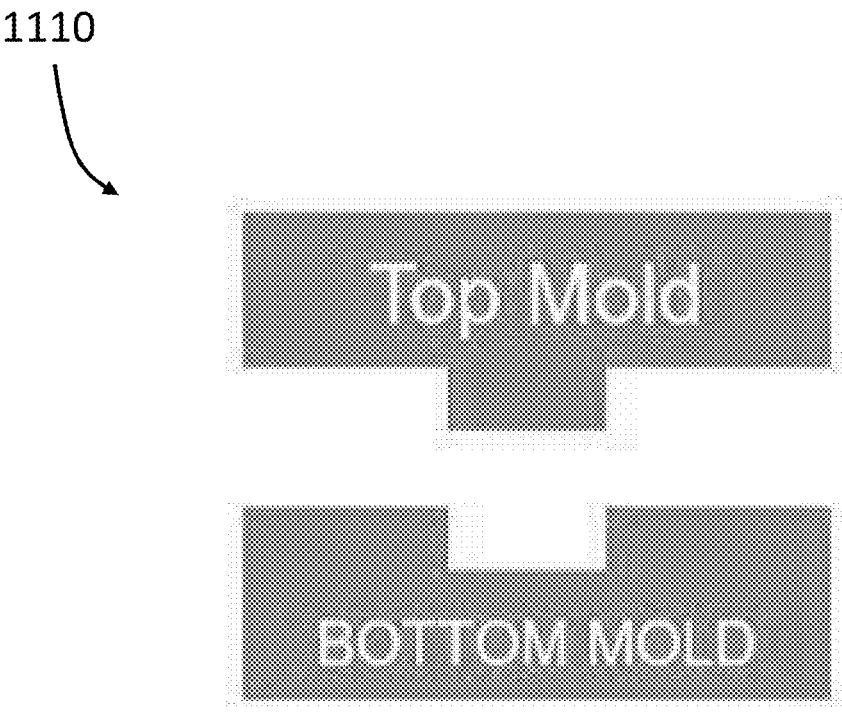
FIG. 17 is a conceptual diagram of a mold according to aspects of the present disclosure.
Figure 18:
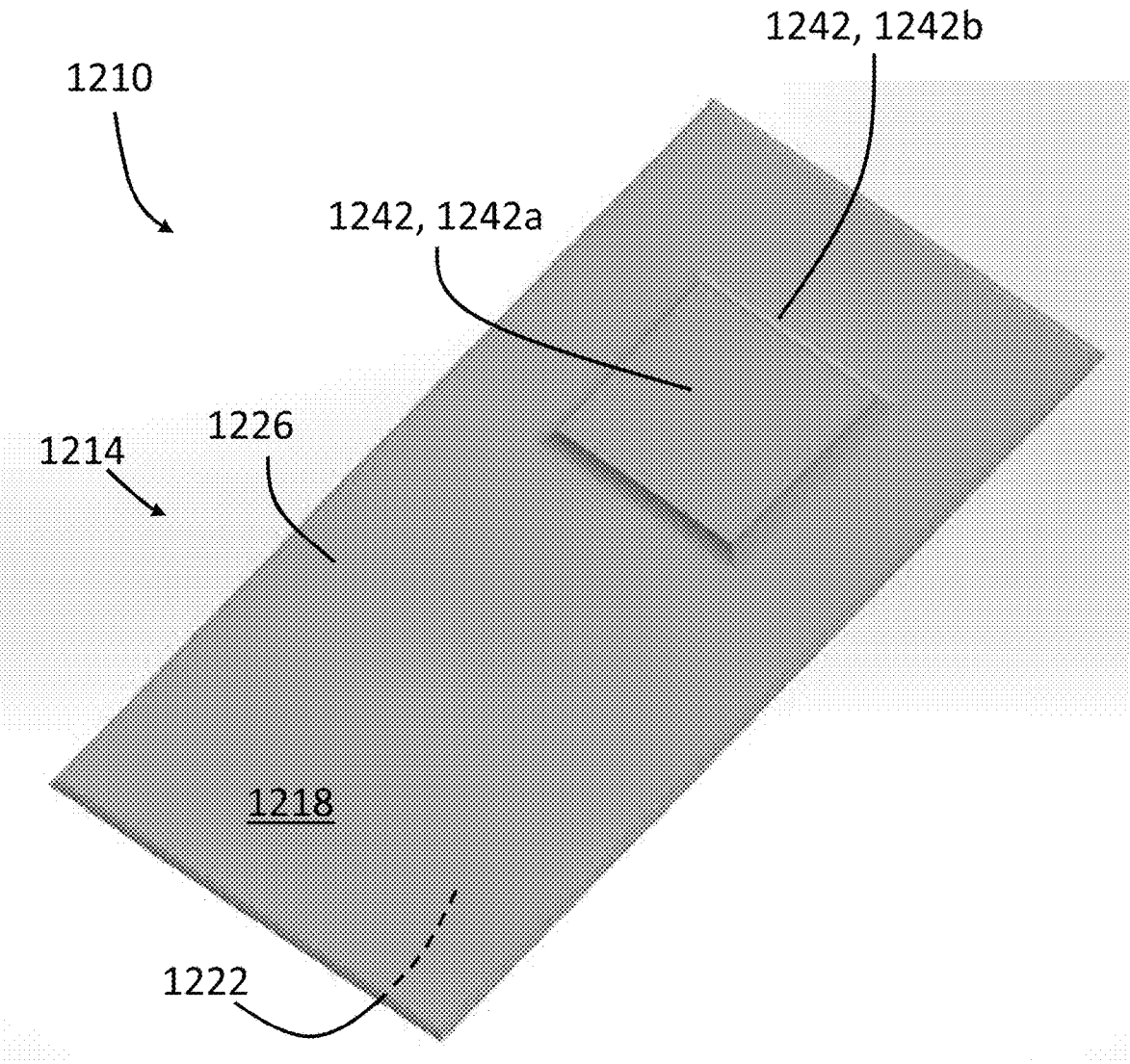
FIG. 18 is a perspective view of a glass part according to aspects of the present disclosure.

Referring to FIG. 17, a mold 1110 is configured to receive a gob 224 (FIG. 3) of glass for forming a glass part (see, generally part 110 of FIGS. 1-2). In a gob-pressing process, molten glass gob 224 at viscosity greater than 100 poise and/or less than 1200 poise is poured onto the mold 1110. Depending upon setup, the mold 1110 may be moved to a pressing station, where a plunger travels down and presses the gob 224 against the mold 1110 until a desired shape of the glass is achieved. Applicants find that allowing the glass to stay in a molten state in the mold 1110 longer helps produce a part 1210 of uneven thickness, as shown in FIG. 18 for example.

In general, during pressing, glass of the gob 224 loses heat to the mold 1110 and plunger mainly through contact heat transfer conducting heat away from the glass. While the glass becomes colder, viscosity of the glass quickly increases, resulting in higher pressing forces required to shape the gob 224 in the mold 1110. Applicants have found that preserving heat of the glass during the pressing provides time for the glass to move into crevasses and fully across the mold 1110. However, according to an aspect of the present disclosure, the mold 1110 comprises a thermal discontinuity, such as an air pocket, inside the mold 1110 to control heat transfer through the mold 1110.

Figure 19:
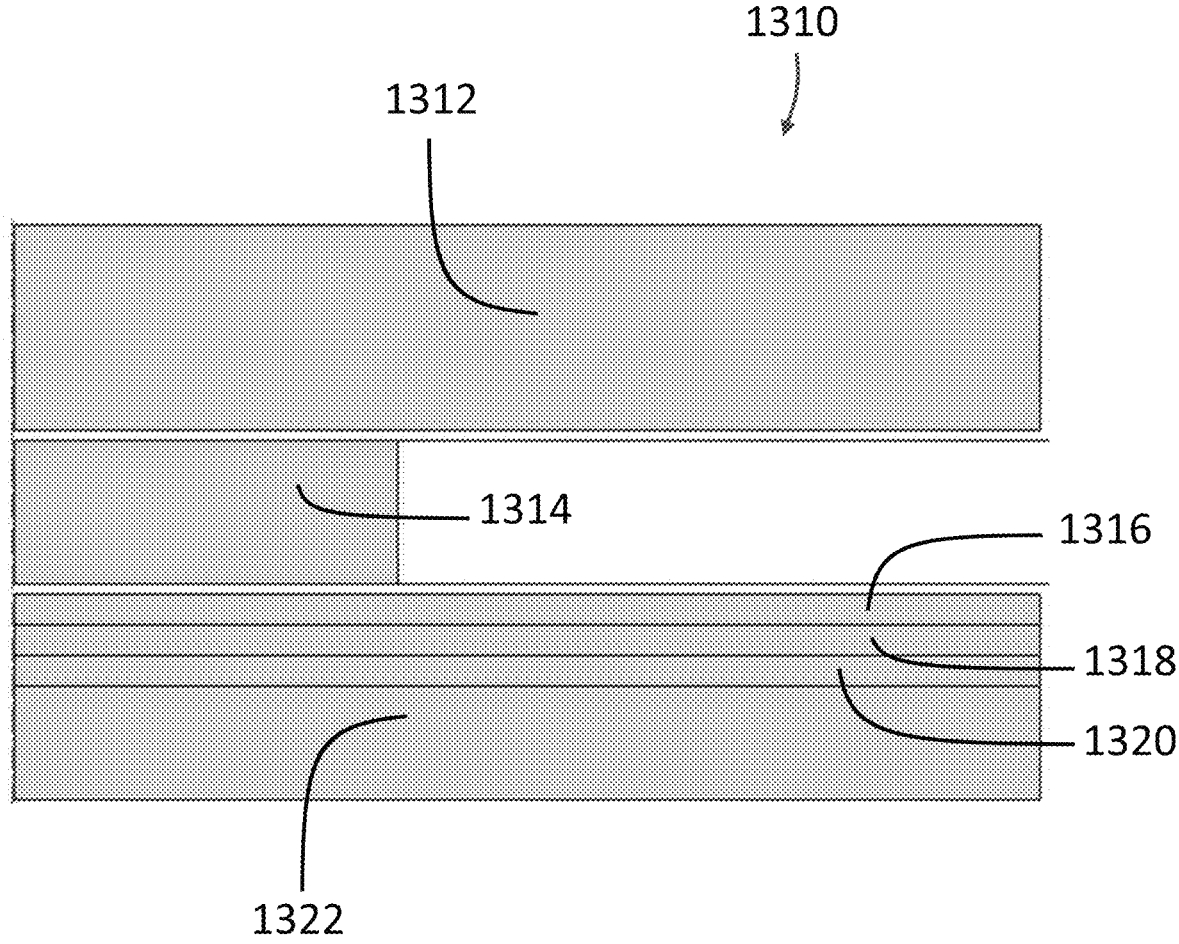
FIG. 19 is side view of a thermal conductivity model of a system for gob-pressing a glass part according to aspects of the present disclosure.

FIG. 19 is a heat transfer (NoGrid) model representing an axisymmetric system 1310 to simulate a pressing process of a glass part, for estimating pressing force benefits and surface temperature response for different material layers to influence heat transfer. The system includes a plunger 1312, molten glass 1314, a first layer 1316, a second layer 1318, a third layer 1320, and a mold 1322 (see, e.g., mold 1110 of FIG. 17). The layers 1316, 1318, 1320 of materials are added onto a surface of the mold 1322, and different combinations of materials for the layers 1316, 1318, 1320, according to Table 1 below, were simulated in the model via COMSOL finite element analysis.

TABLE 1

| Simulation | Layer 1316 | Layer 1318 | Layer 1320 | Mold 1322 |
|---|---|---|---|---|
| 1 | cast iron | cast iron | cast iron | cast iron |
| 2 | Ni 10% Cr | cast iron | cast iron | cast iron |
| 3 | cast iron | alumina | cast iron | cast iron |
| 4 | Ni 10% Cr | cast iron | alumina | cast iron |
| 5 | Ni 10% Cr | copper | cast iron | cast iron |
| 6 | Ni 10% Cr | copper | alumina | cast iron |
| 7 | cast iron | air | cast iron | cast iron |

Figure 20:
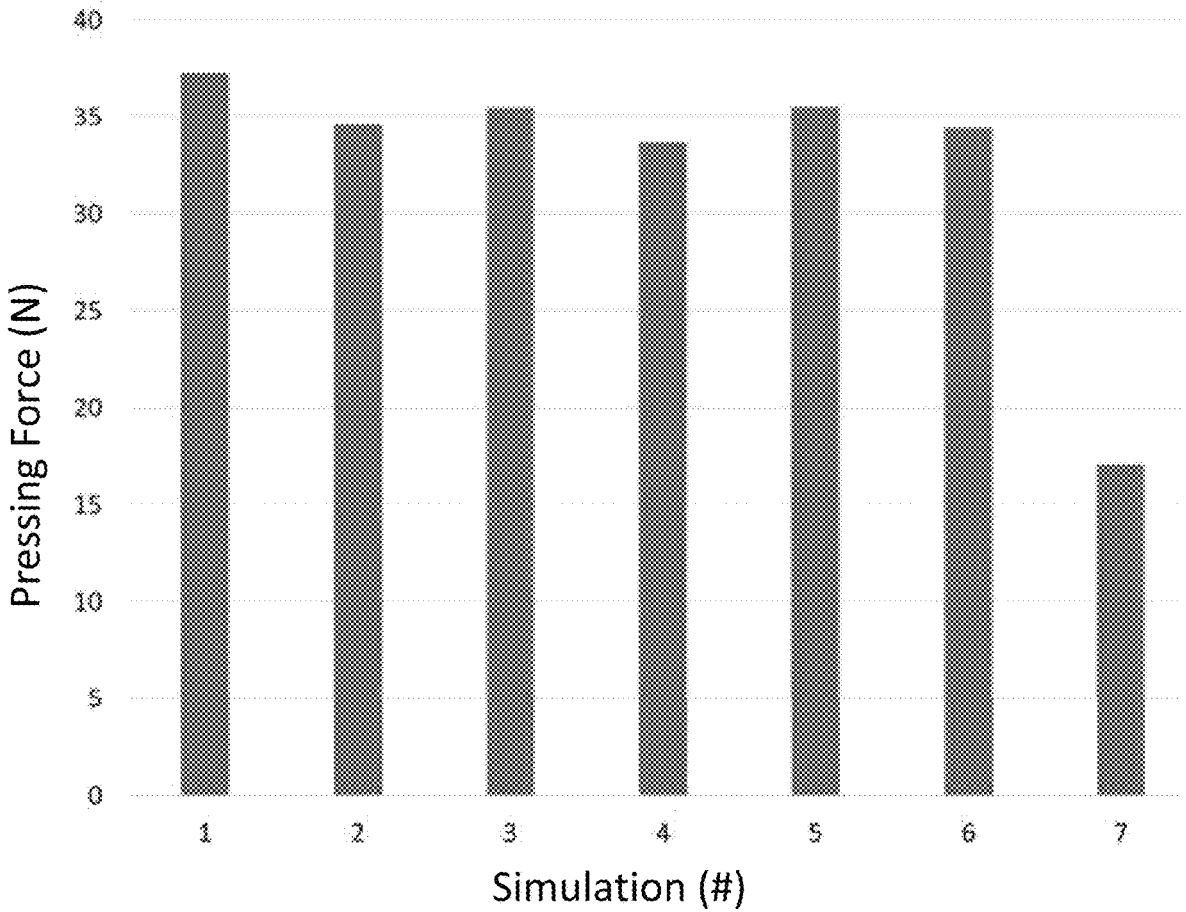
FIGS. 20-22 are bar charts comparing performance of different materials for the mold of the system of FIG. 19 according to aspects of the present disclosure.
Figure 21:
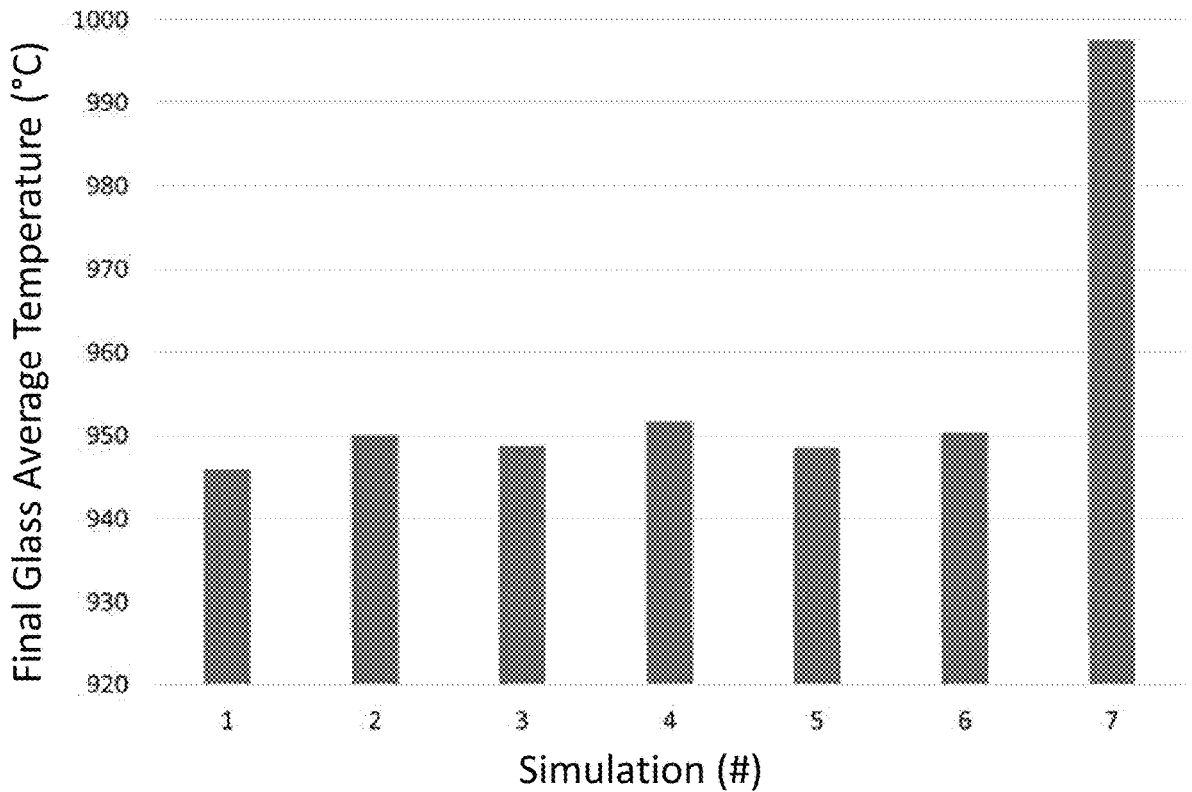
Figure 22:
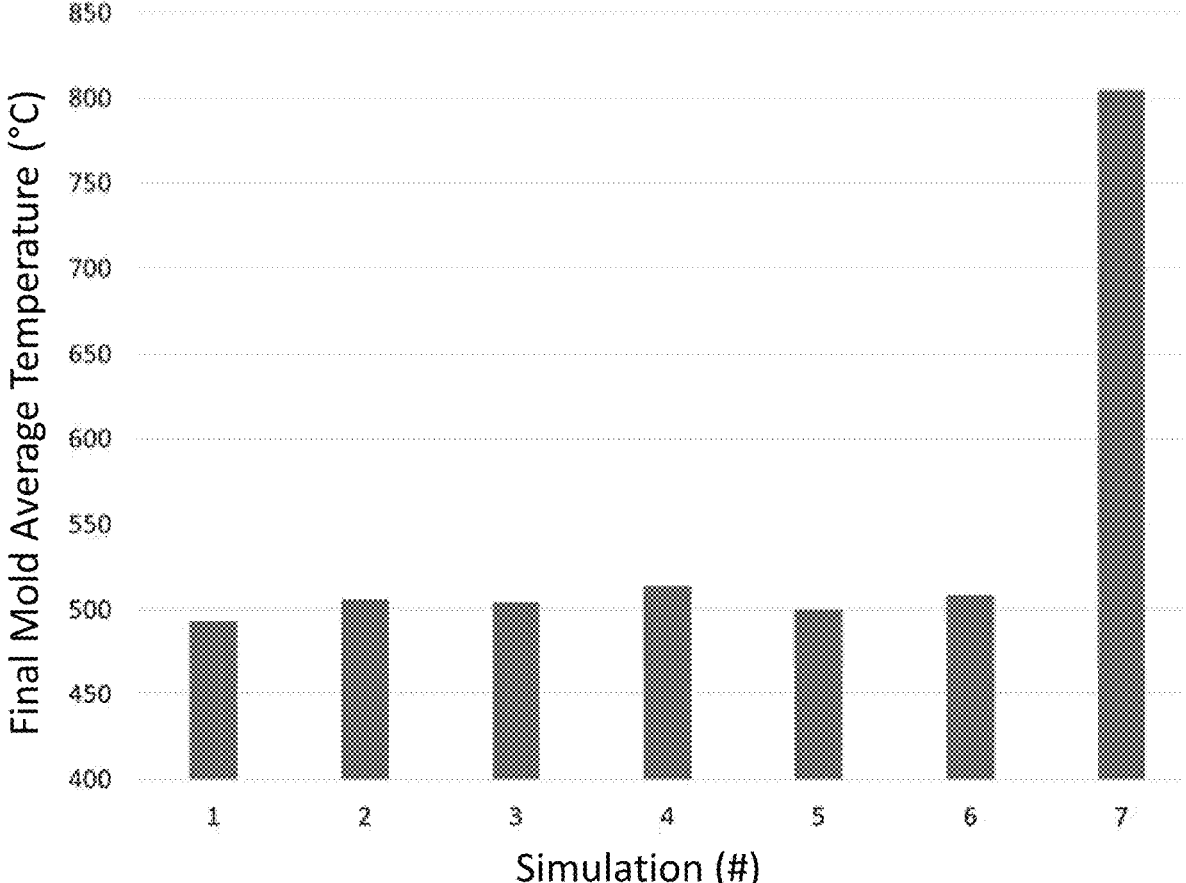

FIGS. 20, 21, and 22 show results of the simulations in terms of pressing force required to press the molten glass 1314 (FIG. 20), which was found to be inversely related to temperature of the molten glass (FIG. 21) and the mold (FIG. 22). As evidenced by these simulations, thermal insulation of the mold 1322 by providing the layer 1318 with air as a thermal barrier allows for lesser gob-pressing force and retains higher temperatures of the mold 1322 and molten glass 1314. However, increased temperature of the mold 1322 also increases risk of sticking between the mold 1322 and the glass 1314.

Next, Applicants contemplated that heat diffusivity of the glass through the system relates to depth of the layer 1318 with air, or air gap depth. Applicants compared a characteristic time of conduction against contact time seen in the gob-pressing process to assess local impact of air gap depth. A 2D cartesian model assessed changes in pressing force required for different air gap depths. The model accounts for glass flow, as well as heat transfer between the glass, mold, and plunger. As a result, Applicants find that for certain depths of air gap, this process improvement will only have an impact for air gaps located beneath the gob 224 in the system 1310.

Figure 23:
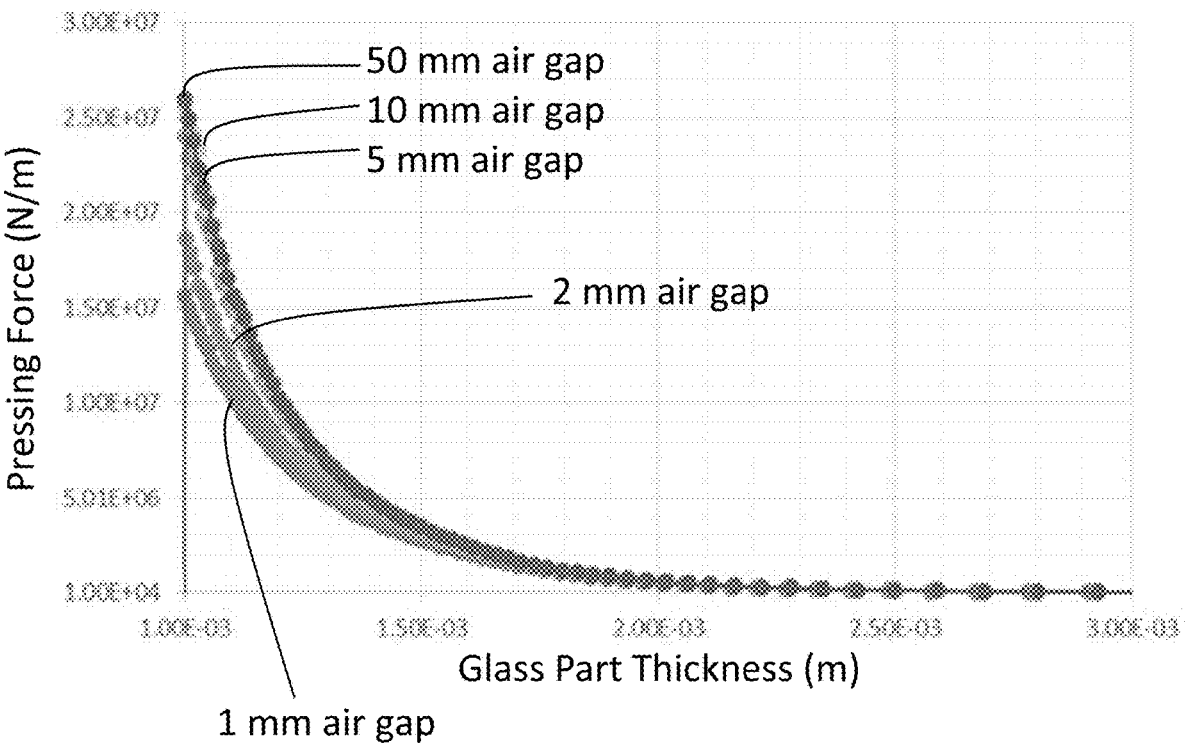
FIGS. 23-24 are plots of mold performance for different size air gaps from the model of FIG. 19 according to aspects of the present disclosure.

Referring to FIG. 23, a plot of gob-pressing force versus part thickness for molds having different air gap depths is provided. For thicker parts requiring substantially lesser pressing forces, such as those glass parts over 2 mm in thickness and especially those over 2.5 mm in thickness, size of the air gap makes little difference. For thinner glass parts, such as those less than 1.5 mm in thickness, air gap depth influences pressing force, where narrower air gaps, on the order of 1 mm, require less applied pressing force for a given part thickness.

Figure 24:
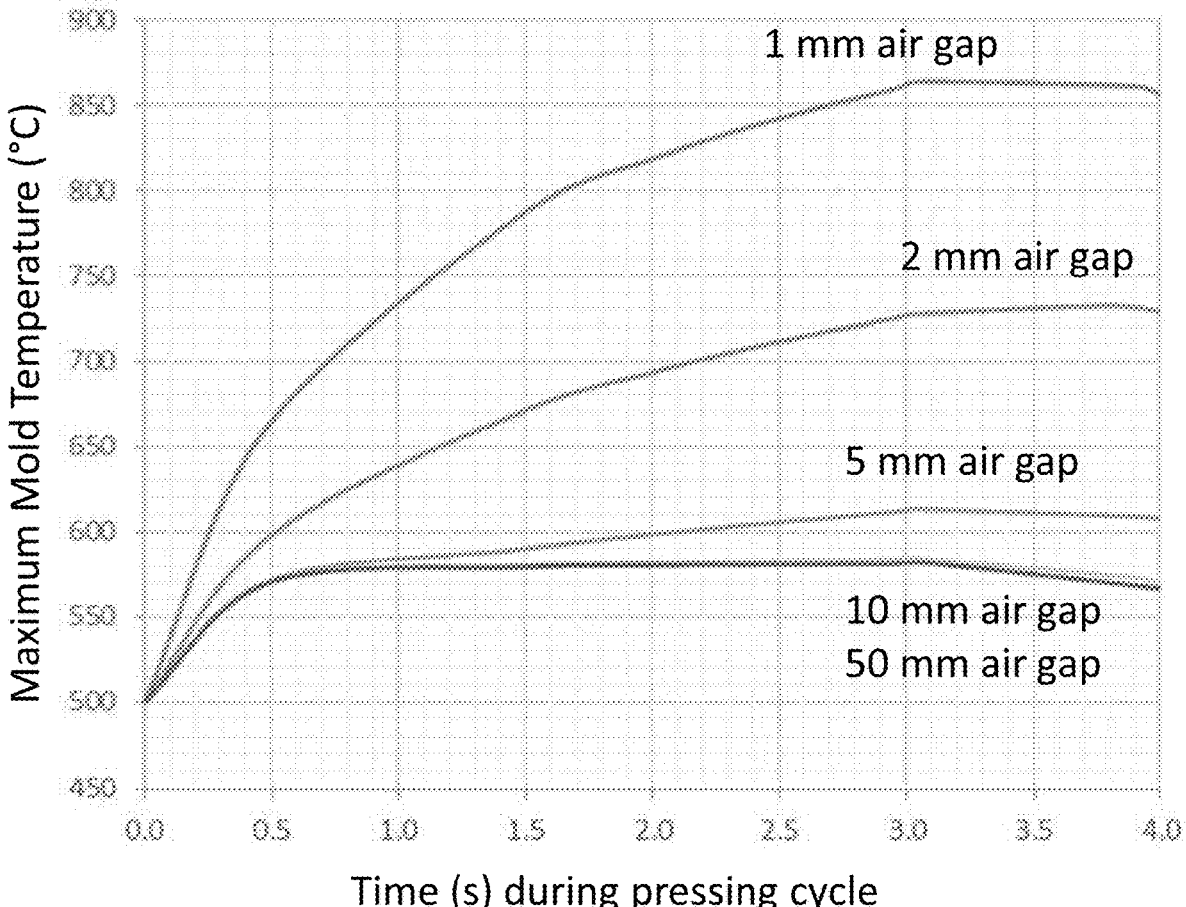

Referring now to FIG. 24, while smaller air gap in FIG. 23 led to lower pressing forces at small part thicknesses, as shown in FIG. 24, the maximum mold temperatures during the pressing cycles decreased as air gap depths increased. Accordingly a mold 1322 with 5 mm air gap had a max temperature of about 600° C. versus over 850° C. for 1 mm air gap depth. However, the mold temperature stopped decreasing at 10 mm air gap depth, such that the curve in FIG. 24 for 50 mm air gap depth overlapped the 10 mm air gap depth curve. With increased mold temperature to achieve lesser pressing force, for thinner parts and for parts with variations in thickness (e.g., jut 116 and side wall 126 in FIGS. 1-2), Applicants find increased risk of glass sticking to the mold.

Maintaining temperature of the mold allows the glass to keep a desired viscosity as the glass moves through the mold. Mold temperature may become even more important as glass parts thin and surfaces areas increase because thin flows of glass have a low thermal mass, and may quickly cool upon new contact within the mold. If cooled too quickly, the glass may fail to reach extremes of the particular geometry. Without such control in combination with other manufacturing disclosure provided herein, thick features, juts, and side walls, such as those spaced well apart from a geometric centroid of the respective glass part, may be difficult if not impossible to make by gob-pressing. See generally malformed part in FIG. 34 for example, in contrast to the glass part formed in FIG. 33.

Applicants have further discovered, solid lubrication formed on the active surfaces of a mold beneficially changes friction conditions to help form thin, three-dimensional shaped glass parts via pressing. The systems and methods disclosed herein are particularly useful when forming thin, three-dimensional shaped glass articles having large thickness variations and/or a small radii of curvature, which features may suggest pressing of molten glass to form the parts. The systems and methods disclosed herein are unique in that the same solid lubricant is configured to strongly reduce friction on all effective areas of the mold assembly during gob-press compression, which may be induced by stroke of a plunger so as to extend the process window and facilitate formation of significantly thinner three-dimensional shaped glass articles. In other words, for a given press, process conditions, and glass composition, forming a thin, three-dimensional shaped glass article becomes feasible using the systems and the methods disclosed herein. With that said, use of other solid lubricants, such as carbon or boron nitride powder, are contemplated within the present disclosure.

Figure 25:
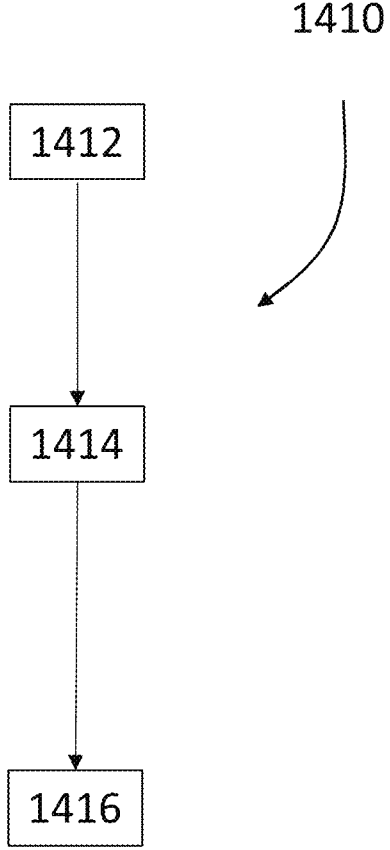
FIG. 25 is a flowchart diagram of a method of making a glass part according to aspects of the present disclosure.
Figure 26:
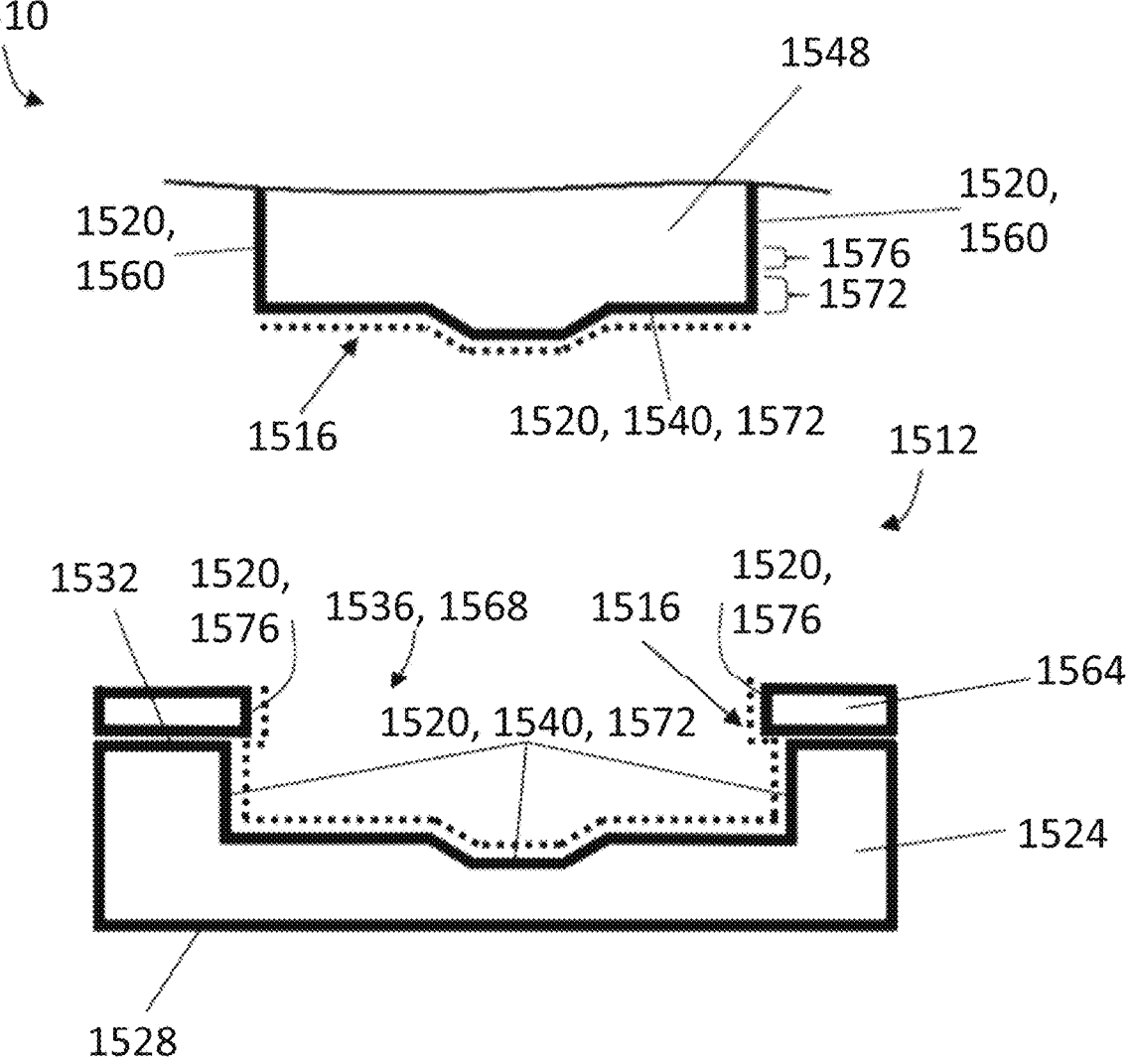
FIG. 26 is a front view of a system for gob-pressing a glass part according to aspects of the present disclosure.

According to an aspect of the present disclosure, FIG. 25 shows a flow chart of a method 1410 for forming a thin, three-dimensional shaped glass article via pressing. The method 1410 comprises a step 1412 of forming a solid lubricant on active surfaces of a mold assembly, a step 1414 of depositing a glass into the mold, and a step 1416 of actuating a plunger toward the mold to press the glass into a closed volume defined by the mold to form a glass part. The method 1410 is further described with reference to FIGS. 26-30, which include cross-sectional representations of a system 1510 comprising a mold assembly 1512 and a burner assembly 1514 (FIG. 27) with the system 1510 configured to perform various aspects of the method 1410 according to the present disclosure. The burner assembly 1514 may treat surfaces of the system 1510 with flame and/or soot, which may heat surfaces thereof. The method 1410 comprises forming a solid lubricant 1516 on active surfaces 1520 of the mold assembly 1512 (step 1412 of FIG. 25). The mold assembly 1512, as shown in FIG. 26, comprises a mold body 1524 with a bottom end 1528 and a top end 1532 disposed opposite the bottom end 1528. According to an aspect of the present disclosure, the mold body 1524 has an open cavity 1536 within which one or more mold surfaces 1540 of the mold body 1524 are configured to define a mold pattern or shape. The open cavity 1536 opens to the top end 1532 of the mold body 1524.

Figure 29:
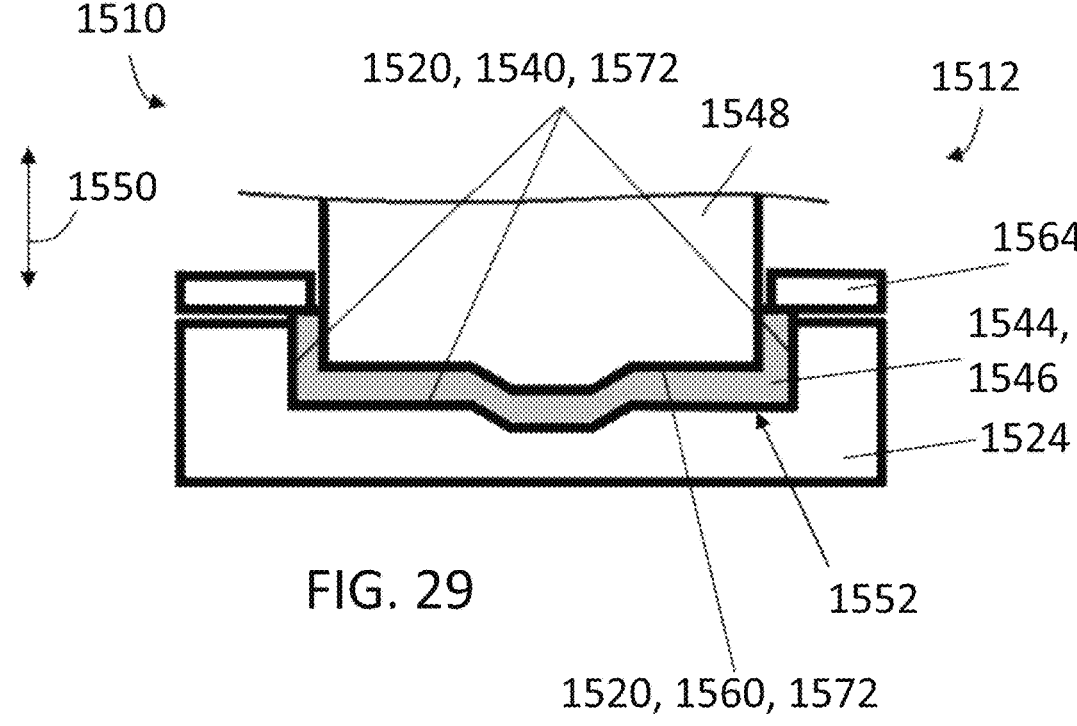
FIG. 29 is a front view of the system of FIG. 26 with the gob of FIG. 28 pressed in the system according to aspects of the present disclosure.

Referring to FIGS. 25 and 29, the method 1410 further comprises depositing a gob 224 of glass in a molten state into the open cavity 1536 of the mold body 1524 of the mold assembly 1512 after forming the solid lubricant 1516 on the active surfaces 1520 (step 1414 of FIG. 25). The gob 224 can be placed in the mold body 1524 (also referred to as gathering), and according to an aspect the gob 224 can be placed approximately at the center or spaced from the center.

According to an aspect of the present disclosure, the gob 224 is deposited into the mold body 1524 according to gathering conditions. For example, a deposit of the glass-containing material (e.g., glass or glass-ceramic) configured with a target temperature, shape, and mass/weight is directed (e.g., delivered) into the mold body 1524. There are several considerations for determining the target temperature, shape, and mass/weight of the glass-containing material. For instance, temperature may influence viscosity of the glass as the glass enters the mold body 1524, and thus its ability to fill out the mold body 1524 (if desired) prior to pressing the glass with a plunger 1548 (FIG. 26). Another consideration is the die design (e.g., the mold pattern and the plunger pattern), which includes the thickness, tightness of tolerances and/or scale of the features in the die design (e.g., how far the glass has to travel and/or the size or smallness of the features). The die may comprise a volume of air therein, such as for insulation as disclosed above. Another consideration is the amount of pressure generated on the molten glass via the pressing force. The gathering conditions are configured to be compatible with the specifications of the mold assembly 1512.

Figure 28:
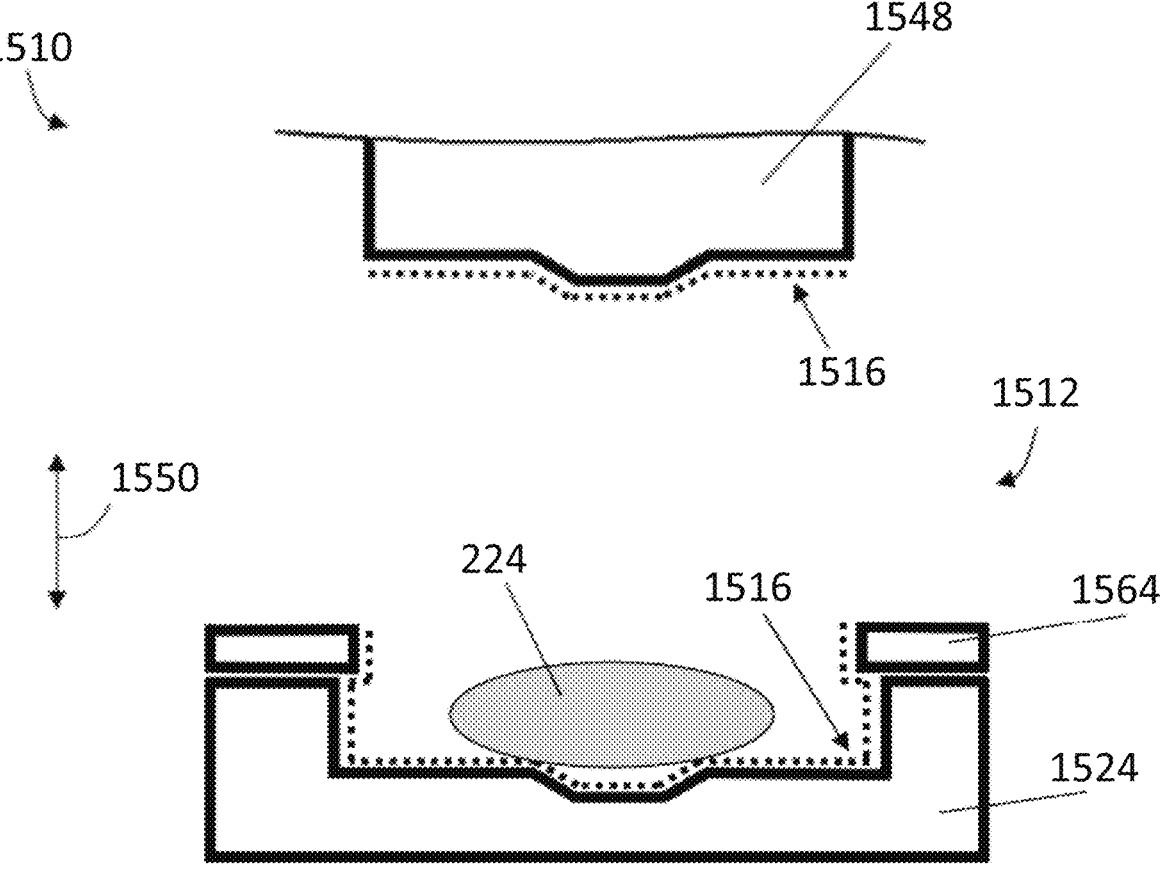
FIG. 28 is a front view of the system of FIG. 26 with a gob of glass positioned in the system according to aspects of the present disclosure.
Figure 30:
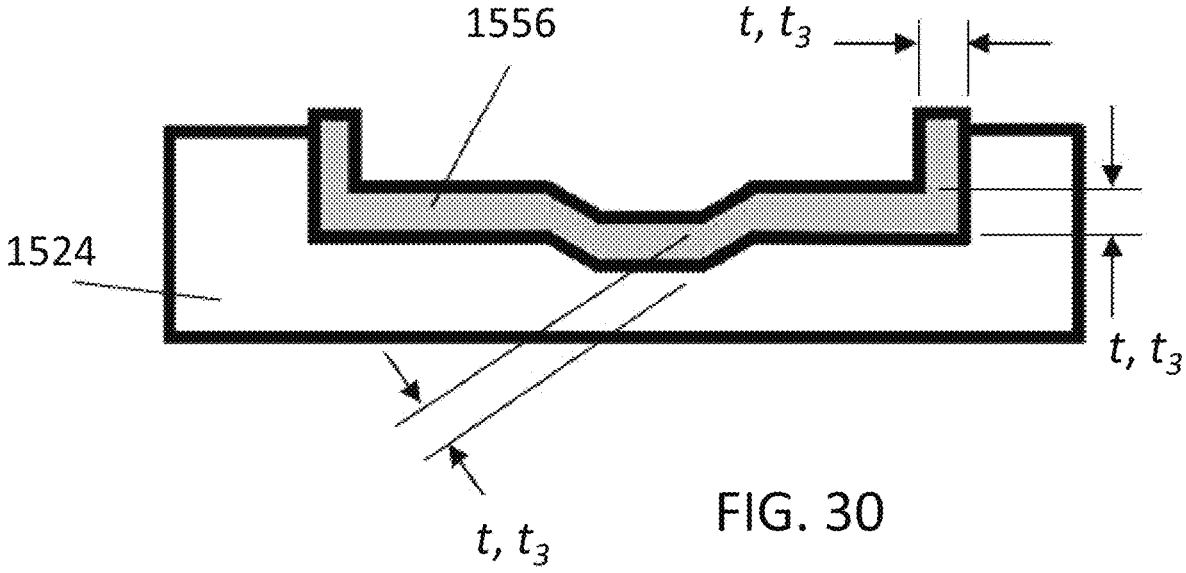
FIG. 30 is a front view of the system of FIG. 26 with a glass part formed therein according to aspects of the present disclosure.

Referring to FIGS. 25, 29, and 30, the method 1410 further comprises actuating a plunger 1548 of the mold assembly 1512 towards the mold body 1524 and into the open cavity 1536 to press the gob 224 into a closed volume 1552 (FIG. 29) to form the glass part 1556 (see also part 110 of FIGS. 1-2) (step 1416 of FIG. 25). According to an aspect, the plunger 1548 is configured to translate along an axis (arrow 1550 in FIG. 29) towards the mold body 1524 in a first direction when actuated to press the gob 224 into the closed volume 1552. The plunger 1548 is configured to translate along the axis (arrow 1550 in FIG. 29) away from the mold body 1524 in a second direction opposite the first direction when actuated to release the glass part 1556 from the mold assembly 1512. The plunger 1548, as shown in FIG. 28, has plunger surfaces 1560 with at least some of the plunger surfaces 1560 configured to define a plunger pattern. The closed volume 1552 is defined by the mold body 1524 (e.g., the mold pattern) and the plunger 1548 (e.g., the plunger pattern).

According to an aspect of the present disclosure, the closed volume 1552 has a three-dimensional shape such that when the gob 224 is pressed into the closed volume 1552, the glass part 1556 is formed with the three-dimensional shape of the closed volume 1552. Each of the mold pattern and the plunger pattern has a configuration of features that is imparted/formed (e.g., in the negative) into respective areas or regions of the gob 224 when pressed by the plunger 1548 so as to form the glass part 1556 with minimal or no post-processing required. The surfaces of the glass part 1556 imparted/formed via the mold pattern and the plunger pattern can be planar and/or curved in portions though the surfaces are preferably configured with the three-dimensional shape.

The mold assembly 1512 may further comprise a ring portion 1564 configured to cover a portion, such as a peripheral portion, of the open cavity 1536 of the mold body 1524. The ring portion 1564 is configured to define a portion of the closed volume 1552. For example, when the plunger 1548 is actuated towards the mold body 1524 and presses the gob 224, the gob 224 is squeezed between the plunger pattern of the plunger 1548 and the mold pattern of the mold body 1524 with portions of the gob 224 moving laterally outwardly until contact with the ring portion 1564. According to an aspect of the present disclosure, the ring portion 1564 is separate from (i.e., not an integral part of) the mold body 1524 and the plunger 1548. According to such an aspect, the ring portion 1564 is disposed on the mold body 1524 (e.g., on the top end 1532 of the mold body 1524) and configured to define a ring opening 1568 through which the plunger 1548 moves and makes sliding contact with the ring portion 1564 when the plunger 1548 is actuated during a pressing operation.

During a pressing operation while the plunger 1548 is actuated towards the mold body 1524, the closed volume 1552 (also referred to as a compression volume) decreases or reduces until the plunger 1548 is actuated to or reaches a predetermined distance from the mold body 1524, such as a position of the plunger 1548 shown in FIG. 29. The plunger 1548 is actuated with a pressing force configured to ensure the plunger 1548 reaches the predetermined distance and the gob 224 is pressed so as to completely fill closed volume 1552. According to an aspect of the present disclosure, the plunger 1548 is actuated with a pressing force less than or equal to 16.7 kN, or 15.7 kN, or 14.7 kN, or 13.7 kN, or 12.7 kN, or 11.8 kN, or 10.8 kN, or 9.8 kN. According to an aspect of the present disclosure, the plunger 1548 is actuated with a pressing force greater than or equal to 1.5 kN, or 2.0 kN, or 2.5 kN, or 3 kN, or 3.4 kN, or 3.9 kN, or 4.4 kN, or 4.9 kN.

It should be appreciated that the pressing force used during the pressing operation may depend on the shape, the aspect ratio, and the thickness (among other attributes or factors) of the glass part 1556 to be formed, and different pressing forces (e.g., larger or smaller) can be used according to an aspect of the present disclosure. For example, according to an aspect, the plunger 1548 is actuated with a pressing force in range as low as 1 kN and as high as 1410 kN even when the solid lubricant 1516 is formed on the active surfaces 1520 of the mold assembly 1512. In such an aspect, the plunger 1548 can be actuated with a pressing force in a range of from about 1 kN to about 75 kN, or from about 1 kN to about 50 kN, or from about 1 kN to about 25 kN, or from about 25 kN to about 1410 kN, or from about 50 kN to about 1410 kN, or from about 75 kN to about 1410 kN, or from about 2 kN to about 90 kN, or from about 4 kN to about 80 kN, or from about 5 kN to about 70 kN, or from about 10 kN to about 60 kN, and also comprising all sub-ranges and sub-values between these range endpoints.

The active surfaces 1520 of the mold assembly 1512 are further described with reference to FIG. 29. In particular, the mold assembly 1512 comprises first surfaces 1572 that define the closed volume 1552 and one or more pairs of second surfaces 1576 that make sliding contact during actuation of the plunger 1548. The closed volume 1552 is shown with gray shading in FIG. 29. Since the first surfaces 1572 define the closed volume 1552, the first surfaces 1572 comprise any surfaces or surface portions of the mold body 1524, the plunger 1548, and the ring portion 1564 that bound the closed volume 1552, as indicated in FIG. 29. The active surfaces 1520 include all of the first surfaces 1572.

The second surfaces 1576 are pairs of surfaces that make sliding contact during the actuation of the plunger 1548. As shown in FIG. 29, surfaces of the ring portion 1564 that define the ring opening 1568 make sliding contact with a portion of the (vertical) plunger surfaces surrounded by the ring opening 1568. As such, the noted surfaces of the plunger 1548 and the ring portion 1564 constitute second surfaces 1576 at the position of the plunger 1548 depicted in FIG. 29. The active surfaces 1520 include at least one second surface 1576 of each of the one or more pairs of second surfaces 1576 (i.e., the noted surface of the plunger 1548 and/or the noted surface of the ring portion 1564).

It should be appreciated that some surfaces of the mold assembly 1512 may be first surfaces 1572 and second surfaces 1576. For example, when the plunger 1548 is first inserted through the ring opening 1568, surfaces of the plunger 1548 at a tip portion of the plunger 1548 make sliding contact with surfaces of the ring portion 1564 that define the ring opening 1568. As such, the noted surfaces of the plunger 1548 and the ring portion 1564 would constitute second surfaces 1576 at the noted position of the plunger 1548. As the plunger 1548 is further actuated towards the mold body 1524, the surfaces of the plunger 1548 at the tip portion no longer make sliding contact with the surfaces of the ring portion 1564 that define the ring opening 1568, for example, at the position of the plunger 1548 depicted in FIG. 29. Instead, the surfaces of the plunger 1548 at the tip portion now define the closed volume 1552. Thus, the noted surfaces of the plunger 1548 would constitute first surfaces 1572 at the position of the plunger 1548 depicted in FIG. 29.

Figure 27:
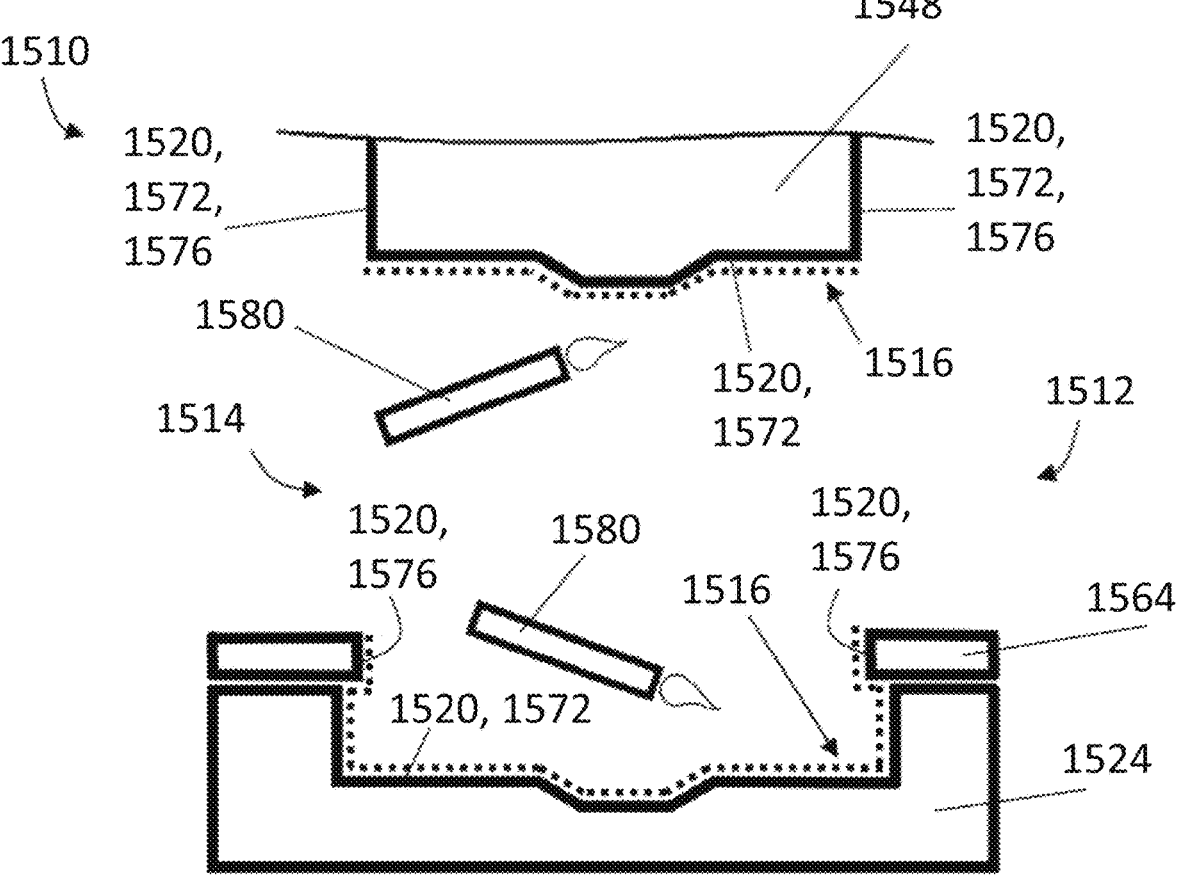
FIG. 27 is a front view of the system of FIG. 26 with flames preparing surfaces of the system according to aspects of the present disclosure.

The burner assembly 1514 of the system 1510 is further described with reference to FIGS. 26 and 27. The burner assembly 1514 may comprise one or more burners, such as multi-port burners 1580 schematically illustrated in FIG. 27. The burner assembly 1514 is configured to form the solid lubricant 1516 in a continuous layer on the active surfaces 1520. The continuous layer of the solid lubricant 1516 is depicted as a continuous dotted line positioned adjacent to the active surfaces 1520. As shown in FIGS. 26 and 27, there is a first continuous layer of the solid lubricant 1516 disposed on the active surfaces 1520 of the plunger 1548 and a second continuous layer of the solid lubricant 1516 disposed on the active surfaces 1520 of the mold body 1524 and the ring portion 1564. The continuous layer of the solid lubricant 1516 can have any thickness that is useful for modifying the friction conditions between the glass-containing material and the active surfaces 1520 of the mold assembly 1512. According to an aspect of the present disclosure, the continuous layer of the solid lubricant 1516 can have a thickness that approximates the thickness of the individual particles of the solid lubricant. According to an aspect of the present disclosure, the continuous layer of the solid lubricant 1516 has a thickness of a few nanometers, tens of nanometers, hundreds of nanometers, a few microns, tens of microns, or hundreds of microns.

According to an aspect of the present disclosure, the solid lubricant 1516 is carbon soot formed in a continuous layer on the active surfaces 1520. According to an aspect, the carbon soot is formed by thermally decomposing a hydrocarbon, such as a hydrocarbon gas, using a flame. According to an aspect, the hydrocarbon is thermally decomposed by selectively pulsing a supply of the hydrocarbon to the multi-port burner(s) 1580 with the flame to form the carbon soot. According to an aspect, the flame is maintained by continuously supplying natural gas to the multi-port burner(s) 1580 when the multi-port burner(s) 1580 are not pulsed with the hydrocarbon to form the carbon soot. According to an aspect, the hydrocarbon is acetylene. According to such an aspect, the solid lubricant 1516 that results from thermally decomposing the acetylene is acetylene black.

As perhaps best shown in FIG. 30, the closed volume 1552 is configured to form the glass part 1556 with a thickness t when the plunger 1548 is at the predetermined distance. The glass part 1556 can have a thickness t at different regions thereof, such as a first thickness $t_1$ at a vertical-extending region, a second thickness $t_2$ at a horizontal-extending region, and a third thickness $t_3$ at a diagonal-extending region. According to an aspect, the first ($t_1$), second ($t_2$), and third ($t_3$) thicknesses can be the same (e.g., such that the glass part 1556 has a constant thickness over its extent) or different (e.g., such that the glass part 1556 has a variable thickness over its entire extent or over portions thereof).

According to an aspect of the present disclosure, the closed volume 1552 is configured to form the glass part 1556 with a thickness t of at least a portion thereof of less than or equal to approximately 4 mm, or 3.75 mm, or 3.5 mm, or 3.25 mm, or 2 mm, or 1.75 mm, or 1.5 mm, or 1.4 mm, or 1.25 mm, or 1.15 mm, or 1.05 mm, or 1 mm, and/or with a thickness t of at least a portion thereof of greater than or equal to approximately 0.25 mm, or 0.3 mm, or 0.35 mm, or 0.5 mm, or 0.6, mm, or 0.75 mm, or 0.8 mm, or 0.9 mm.

According to an aspect of the present disclosure, the ring portion 1564 can be integral with and/or connected to the plunger 1548 such that the ring portion 1564 moves with the plunger 1548 during actuation of the plunger 1548. According to such an aspect of the present disclosure, the ring portion 1564 is configured to contact the mold body 1524 to define the closed volume 1552 at least when the plunger 1548 is positioned at the predetermined distance.

EXAMPLES

Various aspects of the present disclosure can be better understood by reference to the following Examples which are offered by way of illustration. The present disclosure is not limited to the Examples given herein.

Example 1

Figure 31:
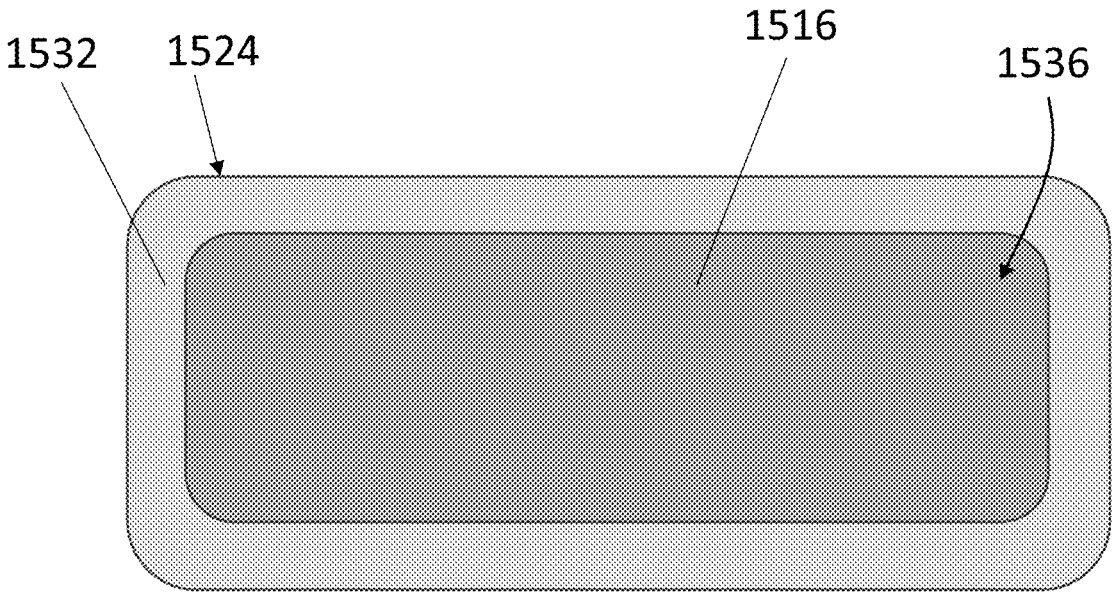
FIG. 31 is a digital image of a mold according to aspects of the present disclosure.
Figure 32:
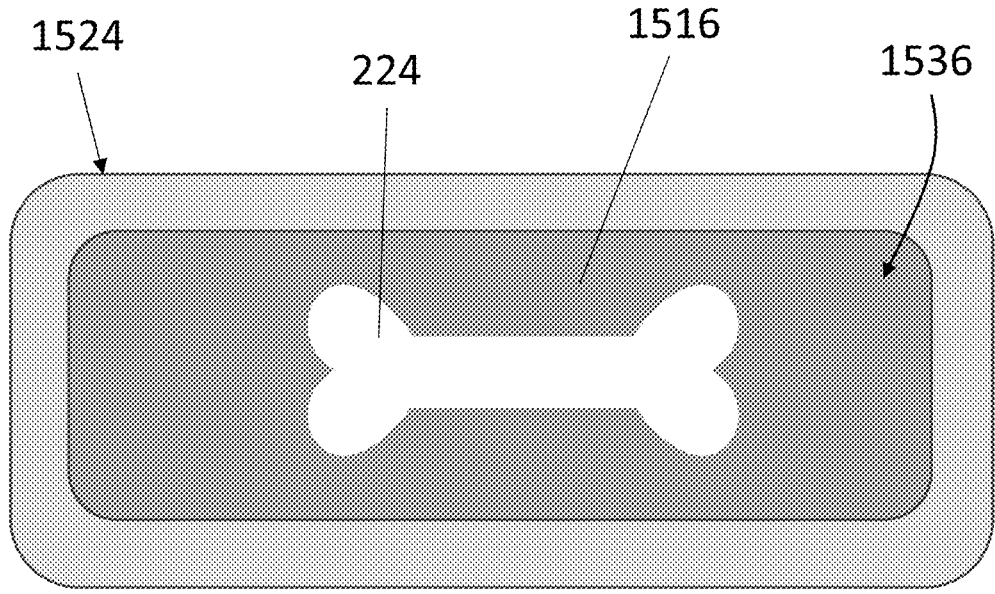
FIG. 32 is top down conceptual diagram of the mold of FIG. 31 with a gob of glass therein according to aspects of the present disclosure.
Figure 33:
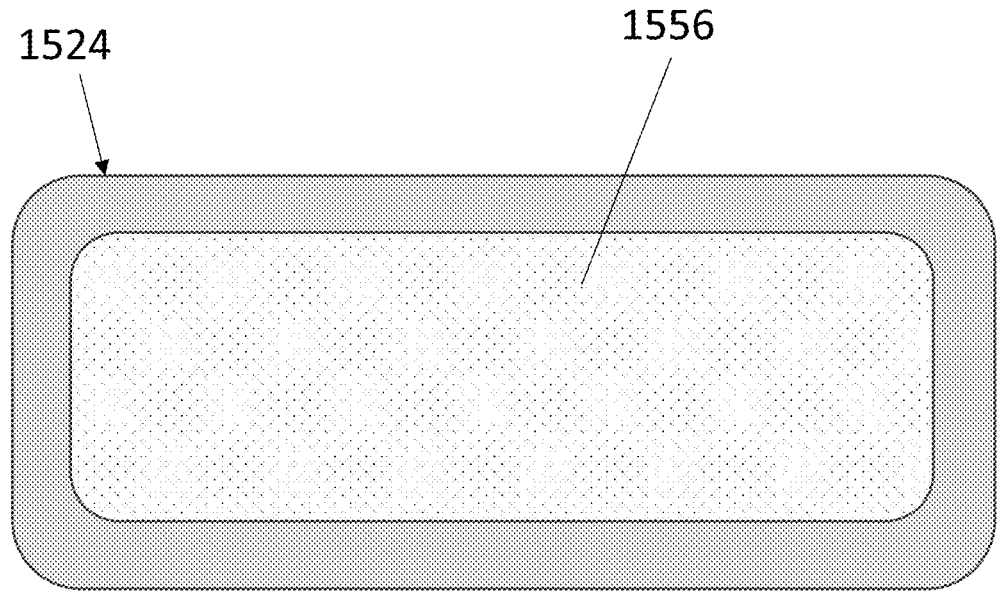
FIG. 33 is a digital image of the mold of FIG. 31 with a glass part formed therein according to aspects of the present disclosure.

FIGS. 31-33 illustrate use of the system and the method disclosed herein to form a thin, three-dimensional shaped glass part via gob-pressing. FIG. 31 is an image of the open cavity 1536 of the mold body 1524 comprising the solid lubricant 1516 (e.g., acetylene black) formed in a continuous layer on the active surfaces 1520 of the mold body 1524. The mold body 1524 was paired with a plunger (see generally plunger 1548 as shown in FIG. 28) that cooperates with the mold body 1524 to define the closed volume configured to form the part 1556.

FIG. 32 is an image of the gob 224 deposited into the open cavity 1536 at the center of the mold body 1524. According to an aspect of the present disclosure the gob 224 may alternatively or preferably be dog-bone shaped as disclosed above to achieve thickness consistency and other associated geometric attributes. The glass-containing material or gob 224 had a mass of approximately 50 g in Example 1. The ring portion (see generally ring portion 1564 as shown in FIG. 29) was then positioned on the top end 1532 of the mold body 1524, and the plunger was inserted through the ring opening (see generally ring opening 1568 as shown in FIG. 26). The plunger 1548 was then actuated towards the mold body 1524 to press the gob 224 into the closed volume 1552 (FIG. 29). In Example 1, the plunger 1548 was actuated with a pressing force of approximately 500 kgf (equivalent mass) or approximately 4.9 kN.

FIG. 33 is an image of the 3D-shaped glass article completely formed while remaining in the mold body 1524 after actuating/pressing of the plunger 1548 and with the plunger 1548 and the ring portion 1564 removed. In Example 1, the three-dimensional shaped glass part 1556 had a thickness of approximately 1.4 mm and a surface area of approximately 160 mm by 80 mm. Pressing pressure on the surface of the glass part at the point when the molten gob is pressed with the pressing force (e.g., about 4.9 kN) to completely fill the closed volume 1552 between the mold body 1524 and the plunger 1548 is approximately 0.383 MPa.

Example 2

The same mold assembly from Example 1 was used to attempt formation of another thin, glass part. However, the solid lubricant 1516 present in the mold body 1524 in Example 2 was residues associated with prior pressing, for example, according to Example 1. In other words, the solid lubricant 1516 was not replenished during the pressing of Example 2. Also, flame treatment was not used to concurrently heat surfaces of the mold. Using the same pressing parameter as described above with respect to Example 1, except with regard to the solid lubricant and surface temperatures, the resulting glass part 1556 was incompletely ill-formed, as shown in FIG. 34. In particular, the glass-containing material or gob 224 in Example 2 was not sufficiently squeezed laterally outwardly from the center of the mold body 1524 to fill the closed volume formed by the mold body 1524 and the plunger 1548. A technical effect of not using techniques disclosed herein is apparent.

Example 3

A thin, three-dimensional shaped glass part was formed via pressing using the mold assembly of Example 1 with the solid lubricant (e.g., acetylene black) formed in a continuous layer on the active surfaces of the mold body. The gob 224 had a mass of approximately 49 g in Example 3. The plunger was actuated with a pressing force of approximately 9.8 kN. The three-dimensional shaped glass part that resulted from the gob-pressing according to Example 3 had a thickness of approximately 1 mm and a surface area of approximately 160 mm by 80 mm. Pressing pressure on the surface of the glass article at the point when the molten gob is pressed with the pressing force (e.g., about 9.8 kN) to completely fill the closed volume between the mold body and the plunger is approximately 0.766 MPa. In a further experiment, a larger pressing force, such as a pressing force of 50 kN, could be used to form the 3D-shaped glass article according to Example 3. The pressing pressure on the surface of the glass article at the point when the molten gob is pressed with the larger pressing force (e.g., about 50 kN) to completely fill the closed volume between the mold body and the plunger is approximately 4.0 MPa.

As evidenced by the above-described gob-pressing techniques, a volume of glass in the gob 224 is important to making a glass part, such as the part 110. With too much glass and depending upon the pressing conditions, the resulting part may be too thick or uneven in thickness. Alternatively, without enough glass, the resulting part may thin at or not even reach extreme ends furthest from the gob. To this end, Applicants created a hot glass delivery system 1610, as shown in FIG. 35A, which includes an auger 1612 (see also the auger 1612 in FIG. 35B). The auger 1612 may be platinum and connected to a downcomer of a continuous glass melter. For context with the above disclosure, the hot glass delivery system 1610 may be part of the glass delivery apparatus 212 of FIG. 3.

According to an aspect of the present disclosure, controlled operation of the auger 1612 of the hot glass delivery system 1610 provides a start/stop capability to the stream of molten glass 214 (FIG. 3). Flow rate of glass gobs supplied by the auger 1612 may be adjusted by change in rotational velocity. For example, if the mold 222 is moved along a conveyor, as described above (see generally FIG. 9 and FIGS. 14-16), the start/stop capability of the hot glass delivery system 1610 prevents overflow of the mold and stops the stream of molten glass 214 when the mold 222 is not beneath.

According to an aspect of the present disclosure, beyond a start/stop capability, the hot glass delivery system 1610 also functions as a precision gob formation tool. Variations in gob size/volume can give differing results in glass parts made with the same press parameters (pressure, dwell time, etc.). The hot glass delivery system 1610 includes a connection shaft 1614 to a motor for rotating the auger 1612. The auger 1612 and connection shaft 1614 are located in a housing forming a reservoir 1616 through which flows the stream of molten glass 214 at a rate proportional to rotation of the auger 1612. Beneath the auger 1612, the hot glass delivery system 1610 includes an orifice 1618 from which flows gobs of molten glass.

For some systems such as the manufacturing apparatus 210, a cycle time from gob formation in the mold, to pressing, to part removal is around 20 seconds before the mold is ready for another gob 224. But 20 seconds is far too long for gob formation. If the gob is gathered over 20 seconds, the gob may lose far too much heat and by the time the gob is dropped into the mold the gob may be far too cold to press. By contrast, for such a system, a gob in the range of 50-90 grams may benefit from a flow rate of about 400 gobs/hr in such a system. So rather than cooling for 20 seconds, the precision gob formation of the hot glass delivery system 1610 may deliver a gob of glass in 1-2 seconds and may also hold back the stream of glass between gobs.

A hot glass delivery system 1610 was designed. In development, a viscosity of a test fluid used was 500 poise, chosen to match a viscosity of glass used in gob-pressing. The auger 1612 sits vertical in the downcomer section and test fluid is introduced at the top of the auger 1612. As the test fluid begins to flow, the test fluid fills the downcomer around the auger 1612. Above the auger 1612 is a reservoir 1616 to hold an additional volume of the test fluid. Below the auger 1612 is a cap on the end of the downcomer, which has an orifice 1618 in the center, in this case, a 0.5-inch diameter orifice.

With an incoming mass flow rate of about 30 #/hr (i.e. 30 gobs per hour in terms of flow volume), once the auger 1612 and reservoir 1616 are full, the auger 1612 rotates at a rotational velocity to extrude test fluid at 300 #/hr, which delivers a 60-gram gob in about 1 second. Once the gob has been extruded the auger 1612 begins to rotate in reverse direction which holds the test fluid back and prevents leaking. As stated above, the cycle time of the gob-pressing machine may be around 20 seconds, which means the auger may extrude a gob in 1 second and then turn in reverse rotation for 19 seconds, while the gob-press operation goes through a cycle. In this case the required gob is quickly and precisely delivered within the necessary amount of time, at a hot temperature, and then the hot glass delivery system 1610 holds the stream of molten glass back while the manufacturing apparatus 210 cycles. Further this auger 1612 may be used in coordination with the method corresponding to FIGS. 13-16 for shaping a gob, and can pause delivery of molten glass as the conveyor 716 advance a new mold.

Referring to FIGS. 18 and 36-38, glass parts 1210, 1710, 1810 are made using gob-pressing processes disclosed herein. According to an aspect of the present disclosure, the part 1210, 1710, 1810 may be a three-dimensional (3D) enclosure for a consumer electronic device, such as a cover or housing for an electronic device having a display.

Referring still to FIGS. 18 and 36-38, the glass part 1210, 1710, 1810 includes a body 1214, 1714, 1814 having major surfaces, such as a first surface, such as an inside surface 1218, 1718, 1818 or interior surface and a second surface, such as an outside surface 1222, 1722, 1822 or exterior surface, facing away and spaced apart from the inside surface 1218, 1718, 1818 by the body 1214, 1714, 1814. Spacing between the inside surface 1218, 1718, 1818 and the outside surface 1222, 1722, 1822 defines a thickness t of the glass part 1210, 1710, 1810. If the glass part 1210, 1710, 1810 is positioned on or adjacent to an electronic device, the inside surface 1218, 1718, 1818 may be on the inside of the assembly, whereas the outside surface 1222, 1722, 1822 may be on the outside of the assembly or outward facing.

Each inside surface 1218, 1718, 1818 and outside surface 1222, 1722, 1822 may be smooth, characterized by surface roughness. The inside surface 1218, 1718, 1818 and the outside surface 1222, 1722, 1822 may have a different surface roughness from one another, such as with the inside surface 1218, 1718, 1818 having greater roughness. According to an aspect, the surface roughness of one or both of the inside surface 1218, 1718, 1818 and the outside surface 1222, 1722, 1822 can be imparted by the method of forming the glass part 1210, 1710, 1810 (e.g., gob-pressing using a mold assembly) as described herein.

According to an aspect of the present disclosure, a portion (e.g., a central portion) of the glass body 1214, 1714, 1814 includes a flat section 1226, 1726, 1826 (e.g., planar section). The portions of the inside surface 1218, 1718, 1818 and the outside surface 1222, 1722, 1822 defined by the flat section 1226, 1726, 1826 of the glass body 1214, 1714, 1814 are generally flat or planar. The flat section 1226, 1726, 1826 may be configured to cover at least part of a display area of an electronic device. The glass body 1214, 1714, 1814 can also include a bend or curved section 1230, 1730, 1830 disposed adjacent to at least a portion of the flat section 1226, 1726, 1826. According to an aspect, the bend section 1230, 1730, 1830 is adjacent to one side (e.g., a long or elongated side) of the flat section 1226, 1726, 1826, giving the glass part 1710 a slide shape.

According to an aspect, the glass body 1214, 1714, 1814 includes two, separate bend sections 1230, 1730, 1830 adjacently disposed on opposite sides of the flat section 1226, 1726, 1826, giving the glass part 1210, 1710, 1810 a sled shape. According to an aspect, the bend section 1230, 1730, 1830 surrounds a periphery of the flat section 1226, 1726, 1826, giving the glass part 1210, 1710, 1810 a dish shape. The portions of the inside surface 1218, 1718, 1818 and the outside surface 1222, 1722, 1822 defined by the bend section 1230, 1730, 1830 of the glass body 1214, 1714, 1814 are generally curved. According to an aspect, the central portion of the glass body 1214, 1714, 1814 is curved (instead of flat or planar) and the glass body may not contain a bend section 1230, 1730, 1830, giving the glass part 1210, 1710, 1810 a contour shape. According to such an aspect, the glass body 1214, 1714, 1814 may have an edge surface or edge 1234, 1834 that extends between the inside surface 1218, 1718, 1818 and the outside surface 1222, 1722, 1822.

The bend section 1230, 1730, 1830 comprises at least one bend with a bend radius or curvature. According to an aspect, the bend section 1230, 1730, 1830 can include at least two bends, at least three bends, or greater than three bends with each bend having the same bend radius or a different bend radius. For example, FIG. 38 depicts a cross section along line A-A of FIG. 37 through a portion of the glass body 1814 of the glass part 1810. As shown in FIG. 38, the bend section 1830 has two bends, including a first bend B1 and a second bend B2. The bend radius can be constant having a fixed radius with a constant center point, or the bend radius can be variable, as in the case of a spline structure. According to an aspect, the bend can be a complex bend that has a changing radius, such as described by a Burmester curve. The bend can also have a bend angle. According to an aspect, the bend angle can be measured using the inside surface 1818, the outside surface 1822, or a central plane disposed along a midpoint between the inside and outside surfaces 1818, 1822 of the glass body 1814, or the bend angle can be measured using a centerline disposed between the inside and outside surfaces 1818, 1822, if the glass body 1814 is viewed in cross-section. According to an aspect, the bend angle and the bend radius can be selected based on a peripheral side geometry of the electronic device.

According to an aspect, the bend angle is from greater than 0° to 90°. According to an aspect, the bend angle can be greater than 90°. According to an aspect, the bend radius is about 1 mm or greater. According to an aspect, the bend radius is from about 0.25 mm to about 20 mm, about 0.5 mm to about 20 mm, about 1 mm to about 20 mm, about 1 to about 15 mm, about 1 mm to about 10 mm, about 1 mm to about 5 mm, about 2 mm to about 20 mm, about 2 to about 15 mm, about 0.75 mm to about 10 mm, about 2 mm to about 10 mm, about 2 mm to about 5 mm, about 5 to about 15 mm, about 5 mm to about 10 mm, or about 1 mm to about 20 mm, and also comprising all sub-ranges and sub-values between these range endpoints. According to an aspect, the bend radius is about 0.25, 0.5, 0.75, 1.0, 1.25, 1.5, 1.75, 2.0, 2.25, 2.5, 2.75, 3.0, 3.5, 4.0, 4.5, 5.0, 6.0, 7.0, 8.0, 9.0, 10.0, 15.0, 20.0 mm or more.

As described above, spacing between the inside surface 1218, 1718, 1818 and the outside surface may define the thickness t of the glass part 1210, 1710, 1810. According to an aspect, the thickness t is measured as the most direct distance between the inside surface 1218, 1718, 1818 and the outside surface 1222, 1722, 1822 at a given location on the part 1210, 1710, 1810 and may vary between locations. According to an aspect, the thickness t is measured in a direction normal to one or both of the inside surface 1218, 1718, 1818 and the outside surface 1222, 1722, 1822.

According to an aspect, the thickness t of the glass part 1210, 1710, 1810 (e.g., wall thickness) is in a range of from about 0.3 mm to about 4.0 mm, about 0.5 mm to about 4.0 mm, about 0.75 mm to about 3.0 mm, or about 0.9 mm to about 2.1 mm, and also comprising all sub-ranges and sub-values between these range endpoints. According to an aspect, the thickness t may be about 0.3, 0.4, 0.5, 0.6, 0.7, 0.75, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 mm. For some such parts, a variation of the thickness t of the glass part may be within ±200 µm, ±175 µm, ±150 µm, ±125 µm, ±100 µm, ±75 µm, ±50 µm, ±20 µm, or ±20 µm. For some such parts, variation in the thickness of the glass body is within ±10 µm, ±20 µm, ±30 µm, ±40 µm, ±50 µm, ±60 µm, ±70 µm, ±80 µm, ±90 µm, ±100 µm, ±125 µm, ±150 µm, ±200 µm, or ±250 µm of an average thickness of the glass body 1214, 1714, 1814. For other parts with more varied thicknesses, a variation of the thickness t of the glass part at different locations thereon may be greater than 200 µm, 175 µm, 150 µm, 125 µm, 100 µm, 75 µm, 50 µm, 20 µm, or 20 µm. For some such parts, variation in the thickness of the glass body is greater than 10 µm, 20 µm, 30 µm, 40 µm, 50 µm, 60 µm, 70 µm, 80 µm, 90 µm, 100 µm, 125 µm, 150 µm, 200 µm, or 250 µm of an average thickness of the glass body.

According to an aspect, the glass body 1214, 1714, 1814 has at least two sections each with an average wall thickness t that differs from the other (e.g., by at least 20 µm, 25 µm, 50 µm, 75 µm, 100 µm, 150 µm, 175 µm, 200 µm, 225 µm, 250 µm, or more). For example, the glass body 1214, 1714, 1814 of FIG. 4 has a first section (e.g., the flat section 1226, 1726, 1826) with a first thickness t1 and a second section (e.g., the bend section 1230, 1730, 1830) with a second thickness t2 that is different (e.g., greater) than the first thickness t1. The second section (e.g., the bend section 1230, 1730, 1830) also has a third thickness t3 that is different (e.g., greater) than the first thickness t1 and the second thickness t2. As used herein, a "section" of the glass body 1214, 1714, 1814 refers to a portion of the glass body 1214, 1714, 1814 that includes the inside surface 1218, 1718, 1818, the outside surface 1222, 1722, 1822, and the glass disposed therebetween. The sections can have any size and shape sufficient to define and/or describe the different attributes and features associated with the sections as described herein.

According to an aspect, in each section of the glass body 1214, 1714, 1814 that is configured to have a constant wall thickness (even if one or more other sections of the glass body are configured to have different constant wall thicknesses), the total variation of the wall thickness along a given section of the glass body is ±10% of the average wall thickness of that given section. According to an aspect, the total variation of the wall thickness along a given section of the glass body is ±3% of the average wall thickness of that given section. According to an aspect, the total variation in the wall thickness along a given section of the glass body is ±20%, ±15%, ±10%, ±9%, ±8%, ±7%, ±6%, ±5%, ±4%, ±3%, ±2%, or ±1% of the average wall thickness of that given section.

According to an aspect, the glass body 1214, 1714, 1814 has at least one section along which the wall thickness t continuously increases or decreases (e.g., for at least 1, 2, 3, 4, 5, 6, 7 mm, or more mm along the at least one section. For example, the glass body 1814 of FIG. 38 has a section (e.g., the section disposed after the bend B2 and adjacent to the edge surface 1834) along which the third thickness t3 continuously increases as the section extends towards the edge surface 1834. The third thickness t3 increases because the portion of the outer surface 1822 defined by the section has an outward angle α relative to a vertical direction (e.g., indicated by the vertical construction line defining the angle). Thus, the portions of the inner surface 1818 and the outer surface 1822 defined by the section are not parallel. According to an aspect, one or both of the inner surface 1818 and the outer surface 1822 can be configured with an angle α (e.g., inward or outward) such that the wall thickness continuously increases or decreases along an extent of the section. Use of such a taper or draft angle on the outer surface 1822 may facilitate extracting the part from the mold, in contrast to a straight vertical side.

According to an aspect, the glass part 1710 is transparent and has an optical transmission (total transmission) greater than 85% in a wavelength range of 400 nm to 800 nm (such as at some, most i.e. >50%, or all wavelengths therein) at thicknesses disclosed herein, such as through 1 mm of the glass. According to an aspect, the glass part 1710 is transparent and has an optical transmission greater than 75%, 80%, 85%, 87%, 90%, or 93% in a wavelength range of 400 nm to 800 nm (such as at some, most i.e. >50%, or all wavelengths therein) at a thickness of the respective part, and/or such as at thicknesses disclosed herein, such as through 1 mm of the glass. In other embodiments, glass of part disclosed herein may be opaque or have a transmission less than 75%, such as less than 40%, such as less than 10% in a wavelength range of 400 nm to 800 nm (such as at some, most i.e. >50%, or all wavelengths therein) at a thickness of the respective part, and/or such as at thicknesses disclosed herein, such as through 1 mm of the glass.

The inside surface 1718, 1818 and the outside surface 1722, 1822 of the glass body 1814 can have a profile deviation from a target three-dimensional shape. As used herein, a "target three-dimensional shape" refers to an intended or designed shape, such as a three-dimensional shape defined electronically as a computer-aided design (CAD) solid model or rendering of the glass part 1710, 1810.

According to an aspect, each of the inside surface 1718, 1818 and the outside surface 1722, 1822 has a profile deviation within ±200 μm from the target three-dimensional shape. According to an aspect, each of the inside surface 1718, 1818 and the outside surface 1722, 1822 of the glass body 1714, 1814 can have a larger or smaller profile deviation, such as within ±250 μm, ±225 μm, ±200 μm, ±150 μm, ±125 μm, ±75 μm, ±50 μm, ±45 μm, ±40 μm, ±35 μm, ±30 μm, ±25 μm, ±20 μm, ±15 μm, ±10 μm, or less. According to an aspect, at least one of the inside surface 1718, 1818 and the outside surface 1722, 1822 has a profile deviation within ±50 μm (e.g., ±40 μm, ±30 μm, ±20 μm, ±10 μm, or less) from the target three-dimensional shape.

Figure 37:
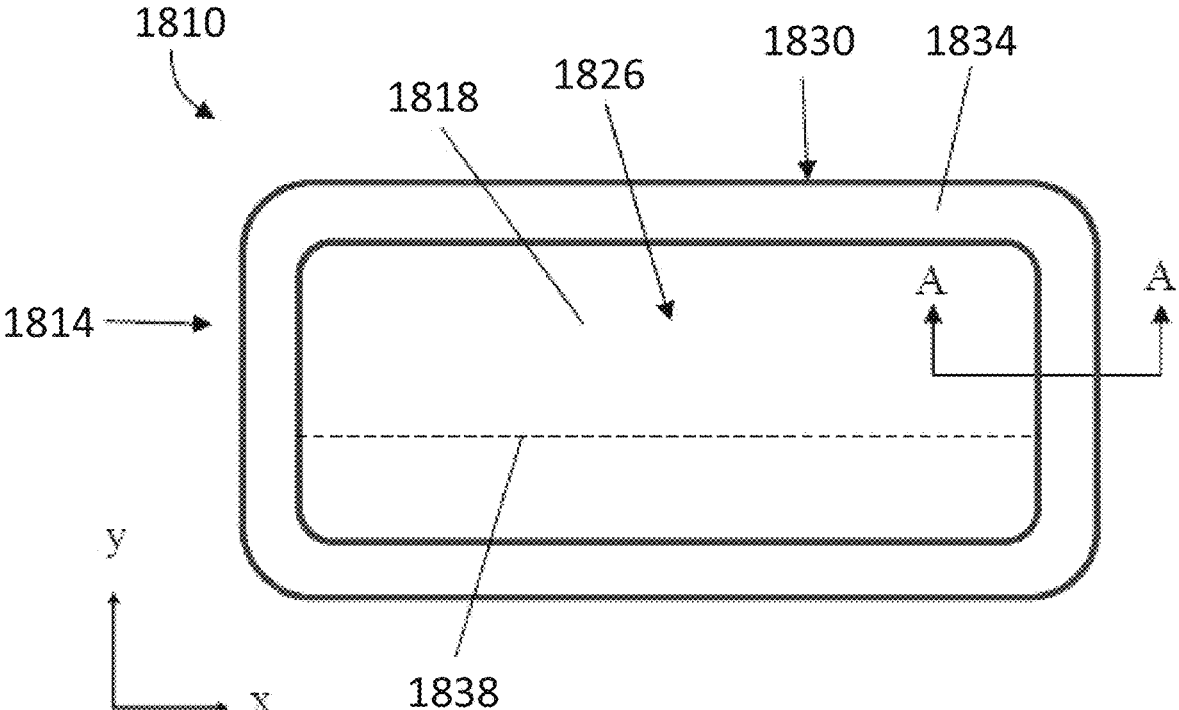
FIG. 37 is a top down view of a rectangular-shaped glass part according to aspects of the present disclosure.
Figure 38:
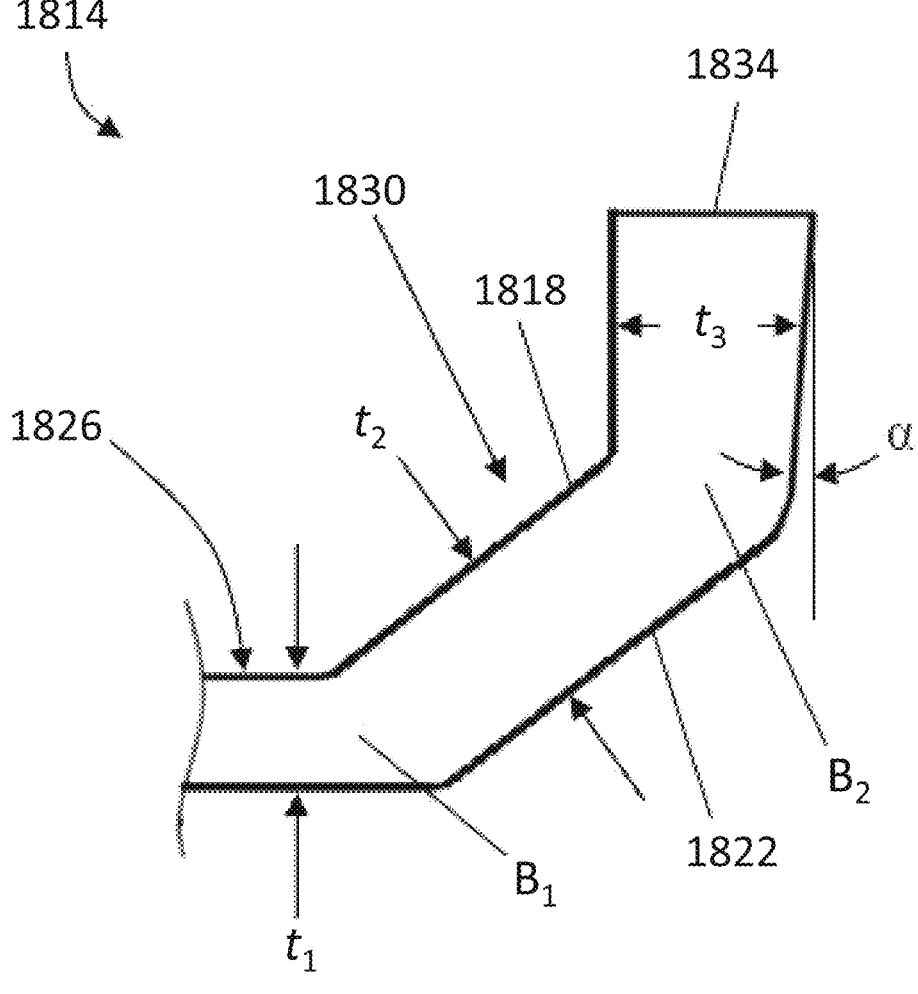
FIG. 38 is a side cross-sectional view of the part of FIG. 37 taken along line A-A of FIG. 37 according to aspects of the present disclosure.

Referring now to FIG. 37, further aspects of the profile deviation are depicted. The profile deviation is taken along a line that extends across the inside surface 1818 and/or the outside surface 1822 of the glass body 1814. According to an aspect, the line along which the profile deviation is taken extends across an entirety of the inside surface 1818 and/or the outside surface 1822, such as the line 1838 extending across the inside surface 1818 of the glass body 1814 shown in FIG. 37.

According to an aspect, the glass body 1814 is non-axisymmetric such that the glass body 1814 has a first dimension (e.g., a length) along a first axis (e.g., x axis) that is different (e.g., longer in FIG. 37) than a second dimension (e.g., a width) along a second axis (e.g., y axis) orthogonal to the first direction. According to an aspect, the profile deviation is taken parallel to the longest axis of the glass body 1814. According to an aspect the part 1810 is not round in profile, and has a length greater than a width thereof (see also FIG. 2 with length and width). While the part 1810 is rectangular in shape, other geometries may be made using the methods and techniques disclosed herein, such as hourglass, oblong, pill-shaped, rainbow, etc. Corners of the rectangular part 1810 are notably rounded, in contrast to the rectangular gob-pressed part 110 (FIG. 1).

Figures 39, 40, 41, 42:
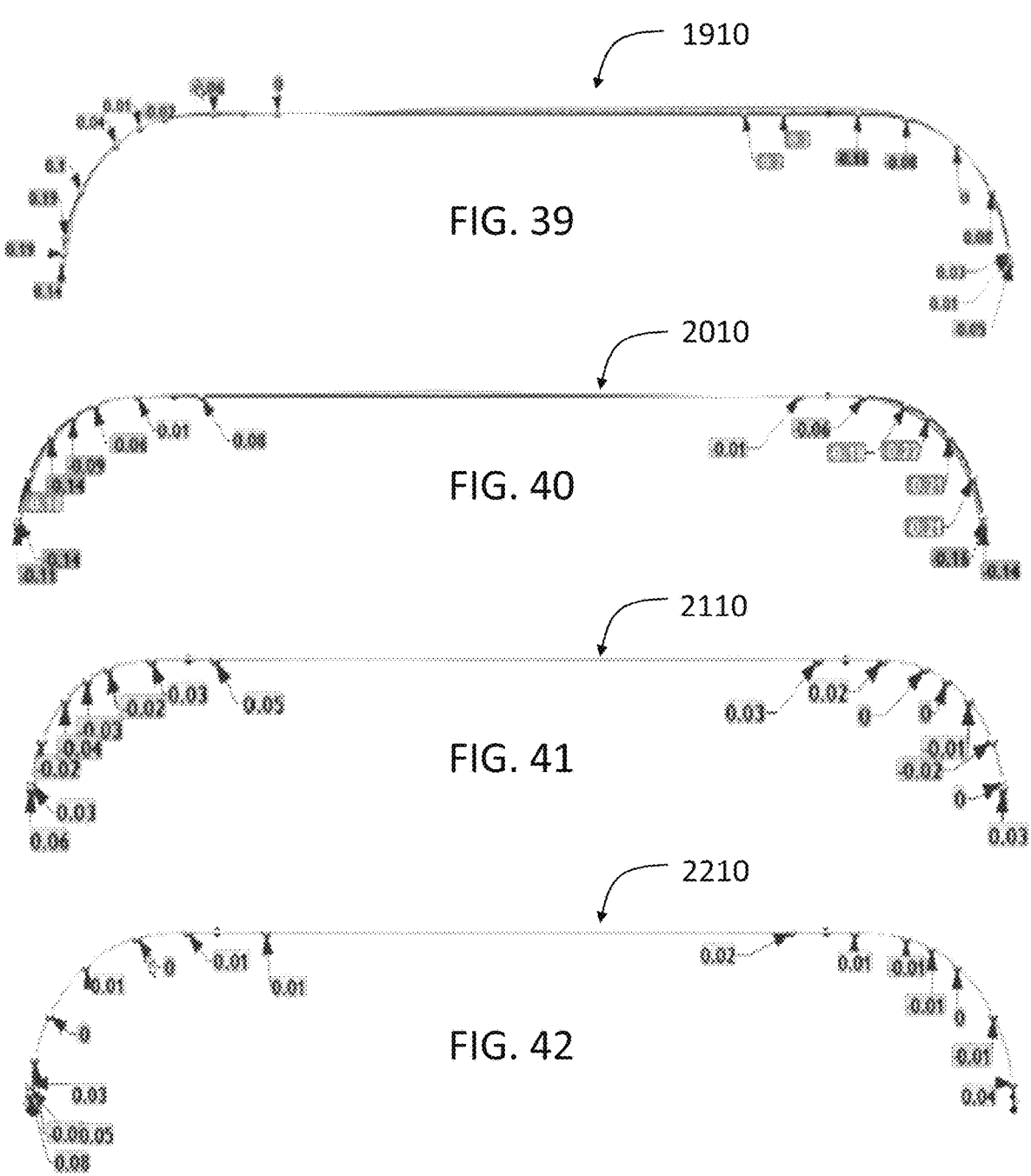
FIGS. 39-42 are profiles of a glass part showing deviation of the part from a target shape according to aspects of the present disclosure.

Referring now to FIGS. 39-42, example profile deviations 1910, 2010 of inside surfaces 1818 of sample enclosures are depicted. Profile deviations 1910, 2010 shown in FIGS. 39 and 40 are taken from sample enclosures formed using a gob-pressing process that did not include a process modification to account for profile deviations that may exceed specifications. The profile deviations 2110, 2210 shown in FIGS. 41 and 42 are taken from sample cover glass articles using a gob-pressing process that includes one or more process modifications. The gob-pressing process and one or more process modifications used to reduce or eliminate profile deviations are described in this disclosure.

The example profile deviations 1910, 2010, 2110, 2210 of FIGS. 39-42 include a solid line that represents the target three-dimensional shape of the profile of the inside surface 1818 and a colored and/or dashed line that represents the as-measured shape of the profile of the inside surface 1818. The example profile deviations 1910, 2010, 2110, 2210 also include balloon text that indicates the direction of the profile deviation (e.g., positive "+" or negative "−") and the amount of the profile deviation in millimeters at various points along the inside surface 1818.

The profile deviations 2110, 2210 illustrated in FIGS. 39 and 40 have maximum deviations from the target three-dimensional shape of +0.19 mm and −0.22 mm, respectively. The profile deviations 2110, 2210 illustrated in FIGS. 41 and 42 have maximum deviations from the target three-dimensional shape of +0.06 mm and +0.08 mm, respectively. Thus, the profile deviations 1910, 2010 illustrated in FIGS. 39 and 40 are larger than the profile deviations 2110, 2210 illustrated in FIGS. 41 and 42. This comparison underscores the advantage of gob-pressing near net shape components using the one or more process modifications described hereinbelow.

According to an aspect, the glass part 1710 can include one or more features (e.g., molded feature(s) 1742) that are formed in situ during the gob-pressing process. Referring again to FIG. 18, the glass part 1210 is depicted. The glass part 1210 includes the outer surface 1222, (generally planar) having a molded feature 1242 thereon. The molded feature 1242a is a raised geometric shape (square), such that the enclosure is configured with a non-uniform or variable thickness (e.g., thicker at the molded feature 1242a), such as the jut 116 (FIGS. 1-2). Accordingly, a thickness of the molded feature 1242a may be greater than surrounding portions of the part 1710, such as at least 1.5 times as thick, such as at least twice as thick, such as at least times as thick, and/or no more than ten thousand times as thick, such as no more than one thousand times as thick. Notably as well, the molded feature 1242*a* does not overlay a geometric centroid of the part 1710, but is spaced apart therefrom, such as by a distance of at least 0.5 cm, such as at least 1 cm, such as at least 2 cm, such as at least 5 cm, and/or no more than 10 m. Locating the molded feature 1242*a* a distance from the geometric centroid uses disclosure provided herein, such as double-pressing technique, shaped gob, heated mold surfaces. Otherwise the glass may cool too quickly to sufficiently move to form the molded feature 1242*a*. The molded feature 1242 in the part 1710 shown also includes a curved portion or surface 1242*b* that extends from the outer surface 1222 to the raised, thicker molded feature 1242*a*. Notable as well for similar reasons, the curved portion or surface 1242*b* is spaced apart from the geometric centroid of the part 1710, such as by a distance of at least 0.5 cm, such as at least 1 cm, such as at least 2 cm, such as at least 5 cm, and/or no more than 10 m. While the part 1710 includes the curved portion or surface 1242*b* as part of the molded feature interior to edges of the part 1710, other parts as disclosed herein may include side walls and a curved portion or surface may extend into such walls (see generally side wall 126 of FIG. 1).

Referring again to FIG. 36, the glass part 1710 is depicted. The glass part 1710 includes the inner surface 1718 (e.g., inner side wall of a hand-held consumer electronics device) with the bend section 1730 of the glass body 1714 configured as a raised, perimetrical wall or edge surrounding the flat section 1726 of the glass body 1714. The glass part 1710 includes two different molded features, such as edge and holes 1742*c,* 1742*d*. One molded feature comprises a discontinuous edge 1742*c* located along the edge of the bend section 1730 (e.g., shown as a stepped, or cut-out feature imparted during gob-pressing). Another molded feature comprises two holes 1742*d* configured to extend entirely through the glass body 1714 from the inside surface 1718 to the outside surface 1722. According to an aspect, the holes 1742*d* may be positioned to correspond to locations of lens or apertures of a cell phone camera.

Various other molded features 1242 can be formed in or on the glass part 1710 during the gob-pressing process. According to an aspect, the molded feature is selected from a hole, a slot, a stepped edge, an indented portion, a raised portion, a non-uniform thickness, a thick portion, a thick corner, a thick edge, a thin portion, a thin edge, an inner surface pattern, an outer surface pattern, an edge surface pattern, an embossed feature, a varying radii of at least one of: an inside corner, and outside corner, an inside edge and an outside edge, a contoured outer edge, and a contoured inner surface. If the glass part 1710 includes one or more molded features 1242, the determination of an average wall thickness along a section configured with a constant wall thickness (e.g., except for a thickness contribution from the molded feature) may exclude the molded feature from the average wall thickness. Alternatively, if the glass part 1710 includes one or more molded features 1242, the determination of an average wall thickness along a section configured with a constant wall thickness may include the molded feature as a portion of the average wall thickness.

Figure 43:
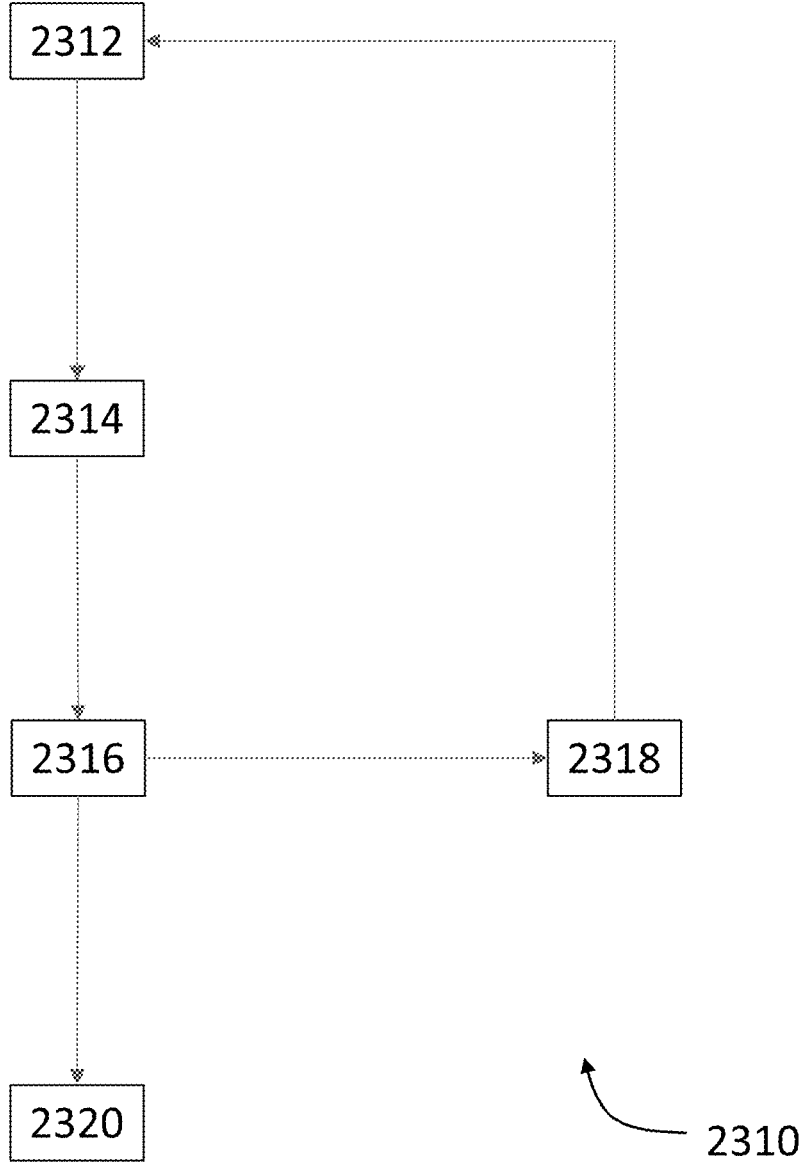
FIG. 43 is a flowchart diagram of another method of making a glass part according to aspects of the present disclosure.

A method 2310 for forming a thin, near net shape component, such as the 3D glass part 1710 of FIG. 36, via gob-pressing is shown in FIG. 43, a flow chart depicting various steps of the method 2310 according to an aspect. The method is further described with reference to FIGS. 31-32, 44-48C, which include schematic cross-sectional representations and digital images of components and additional processing steps associated with an aspect of the method. The method includes steps 2312, 2314, 2316, 2318, 2320, where the step 2312 comprises depositing a glass in a molten state into a mold, the step 2314 comprises actuating a plunger towards the mold, thereby pressing the glass between the plunger and the mold to form a near net shape component having a three-dimensional (3D) shape and shaped inside and outside surfaces, the step 2316 asks does a profile deviation of the inside and outside surfaces from a target 3D shape exceed a predetermined tolerance, if yes, the step 2318 comprises applying a process modification based on one or more current process parameters and returns the process to the step 2312, if no, the step 2320 comprises removing the near net shape component from the mold.

Figure 44:
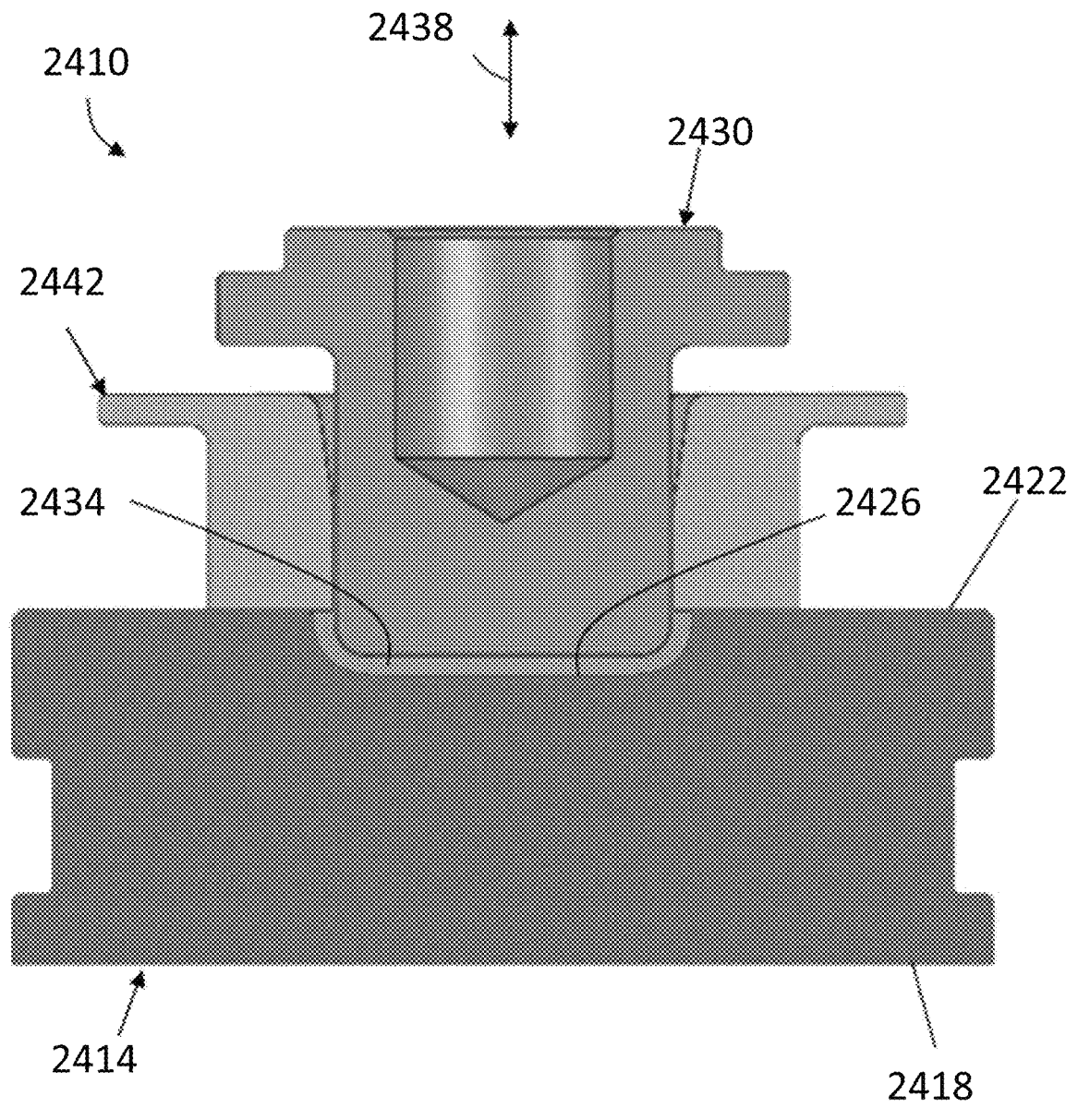
FIG. 44 is a front view of a system for gob-pressing a glass part according to aspects of the present disclosure.

The method 2310 includes use of a mold assembly such as the mold assembly 2410 shown in FIGS. 31-32 and 44. The mold assembly 2410 includes a mold 2414 (see also mold body 1524) that is configured to retain the gob 224 in a molten state (e.g., glass gob, molten glass), which may be dog-bone or otherwise shaped as disclosed above. The mold 2414 comprises a bottom end 2418 and a top end 2422 disposed opposite the bottom end 2418. According to an aspect, the mold 2414 has an open cavity 2426 within which one or more mold surfaces of the mold 2414 are configured to define the mold pattern. The open cavity 2426 opens to the top end 2422 of the mold 2414 according to an aspect of the present disclosure.

As shown in FIG. 44, the mold assembly 2410 also includes a plunger 2430 that is configured to actuate towards or with the mold 2414 to press the glass between the mold 2414 and the plunger 2430. The plunger 2430 has one or more plunger surfaces that define a plunger pattern. Each of the mold pattern and the plunger pattern is configured to impart or form features (e.g., in the negative) into respective areas of the gob 224 during the pressing to form the near gob-pressed part 110 (FIG. 1) with an accurate, as-formed 3D shape having minimal to no deviation from a target 3D shape.

Referring now to FIGS. 31-32, 43-44, the method 2310 comprises depositing the gob 224 in the molten state into (the open cavity 2426 of) the mold 2414 of the mold assembly 2410. The gob 224 (e.g., glass or glass ceramic) can be placed at a center of the mold 2414 (also referred to as gathering), though the gob 224 may be placed approximately at the center (e.g., FIGS. 12 and 13) or spaced from the center (e.g., FIG. 14).

According to an aspect, the gob 224 is deposited into the mold 2414 according to predetermined gathering conditions. For example, the glass (e.g., glass or glass-ceramic) can be configured with a target temperature, target shape, target mass/weight/volume, and target viscosity prior to deposition or delivery into the mold. There are several considerations for determining the target temperature, target shape, target mass/weight/volume, and target viscosity of the gob 224. For instance, temperature will dictate the viscosity of the glass as it enters the mold and, thus, its ability to fill out the mold (if desired) prior to pressing the glass with the plunger. Another consideration is the die design (e.g., the mold pattern and the plunger pattern), which includes the thickness, tightness of tolerances and/or scale of the features in the die design (e.g., how far the glass has to travel and/or the size or smallness of the features). Another consideration is the amount of pressure utilized in the pressing force. Additional consideration can include a size of the near net shape component, a complexity of the mold pattern, a complexity of the plunger pattern, and a composition of the glass. The gathering conditions are configured to be compatible with the specifications of the mold assembly 2410.

According to an aspect, the gob 224 is deposited into the mold 2414 in a mounded form or a flattened/shaped form, as described above. According to an aspect, the gob 224 has a viscosity of at least 1000 P, such as in a range of from about 1500 P to about 7000 P, but may be otherwise, such as from about 10 P to about 500 P. According to an aspect, the gob 224 may have a smaller or a larger viscosity range. According to an aspect, the gob is 224 a glass, such as soda lime glass or a multi-component silicate glass. According to an aspect, the glass may subsequently be heat treated (cerammed) to become a glass-ceramic.

The method further comprises actuating the plunger 2430 of the mold assembly 2410 towards the mold 2414 and into the open cavity 2426 to press the gob 224 into a closed volume 2434 to form a part, such as the gob-pressed part 110, 1710 (FIGS. 1 and 36). According to an aspect, the plunger 2430 is configured to translate along an axis (axis 2438 in FIG. 44) towards the mold 2414 in a first direction when actuated to press the gob 224 into the closed volume 2434. The plunger 2430 is configured to translate along the axis 2438 away from the mold 2414 in a second direction opposite the first direction when actuated to release the gob-pressed part 110, 1710 from the mold assembly 2410 or to perform a process modification (e.g., to account for profile deviations as described herein). As shown in FIG. 10, the closed volume 2434 is defined by the mold 2414 (e.g., the mold pattern) and the plunger 2430 (e.g., the plunger pattern).

According to an aspect of the present disclosure, the closed volume 2434 has a three-dimensional shape such that when the gob 224 is pressed into the closed volume 2434, the glass body 1214, 1714, 1814 (FIGS. 18, 36-37) of the gob-pressed part 110, 1710 is formed with a three-dimensional shape corresponding to the three-dimensional shape of the closed volume 2434. The gob-pressed part 110, 1710, after the pressing, has the three-dimensional shape, an inside surface 1218, 1718, 1818, and an outside surface 1222, 1722, 1822 spaced from the inside surface 1218, 1718, 1818.

Each of the mold pattern and/or the plunger pattern may have a configuration of features that is imparted/formed (e.g., in the negative) into respective areas or regions of the gob 224 when pressed by the plunger 2430 so as to form the gob-pressed part 110, 1710 with a three-dimensional shape (i.e., with minimal or no post-processing). The surfaces of the glass part 1710 imparted/formed via the mold pattern and the plunger pattern can be planar (e.g., the flat section 1226, 1726, 1826) and/or curved (e.g., the bend section(s) 1230, 1730, 1830) in portions though the surfaces are configured with the three-dimensional shape.

The part 110 (FIG. 1) further includes molded features or attributes that are imparted/formed via the mold pattern and/or the plunger pattern during the pressing. According to an aspect, the molded features included one or more of holes (circular, rectangular, elliptical, etc.; see generally feature 122), a stepped edge (e.g., a cut-out through which device buttons are positioned; see generally side wall 126), curved sides (e.g., extending upward from a generally flat portion of the component and/or curving inwardly over itself; see generally side wall 126), among other features. Other molded features include non-uniform thickness, including a thicker edge, a thicker corner, a thicker portion or a thinner portion of the component (e.g., raised shape or raised region (thicker), an embedded shape or embedded region (thinner), among other configurations; see generally jut 116). Another non-limiting example of a molded feature includes textured surface finishes that can be embossed from pressing contact with the mold pattern and/or plunger pattern.

The mold assembly 2410 may further comprise a ring portion 2442 configured to cover a portion (e.g., a peripheral portion) of the open cavity 2426 of the mold 2414. The ring portion 2442 is configured to define a portion of the closed volume 2434. For example, when the plunger 2430 is actuated towards the mold 2414 and presses the gob 224, the gob 224 is squeezed between the plunger pattern of the plunger 2430 (e.g., the plunger pattern) and the mold 2414 (e.g., the mold pattern) with portions of the gob 224 radiating away from an origin of the initially deposited gob in directions that are substantially parallel to the surfaces defining the plunger and mold patterns until contact with the ring portion 2442.

According to an aspect, the ring portion 2442 is separate from (i.e., not an integral part of) the mold 2414 and the plunger 2430. According to such an aspect, the ring portion 2442 is disposed on the mold 2414 (e.g., on the top end 2422 of the mold 2414) and configured to define a ring opening through which the plunger 2430 moves and makes sliding contact with the ring portion 2442 when the plunger 2430 is actuated during a pressing operation. Alternatively, the ring portion may be an integral part of the mold 2414 such that the mold is a monolithic component.

During the pressing operation while the plunger 2430 is actuated towards the mold 2414, the closed volume 2434 (also referred to as a compression volume) decreases or reduces until the plunger 2430 is actuated to or reaches a predetermined distance from the mold 2414, such as position of the plunger 2430 shown in FIG. 44. The plunger 2430 is actuated with a pressing speed and a pressing force configured to ensure the plunger 2430 reaches the predetermined distance and the gob 224 is pressed so as to completely fill the closed volume 2434. The plunger 2430 moves quickly enough that the glass remains fluid enough to move though the mold.

According to an aspect, one or both of the mold 2414 (e.g., the mold pattern) and the plunger 2430 (e.g., plunger pattern) can individually or collectively define an outlet through which excess glass (e.g., extra glass not needed in the near net shape component) can be directed out of the mold 2414 into a glass-containing overflow channel or region during the pressing. The excess glass in the overflow channel can be machined or otherwise removed from the part 110 (FIG. 1) after the pressing.

According to an aspect, prior to depositing the gob 224 in the mold 2414, the method can include applying a lubricant (e.g., solid lubricant, coating, soot as disclosed above, etc.) to the surfaces of the mold 2414 and/or the surfaces of the plunger 2430 to improve flow of the molten glass and/or operation of the mold assembly 2410 during pressing and facilitate removal of the glass part 1710 from the mold 2414 after pressing.

According to an aspect of the present disclosure, the method further comprises preheating a portion of the mold 2414. According to an aspect, the method further comprises preheating (an entirety of) the mold 2414. According to an aspect, the method further comprises preheating a portion of the plunger 2430. According to an aspect, the method further comprises preheating (an entirety of) the plunger 2430. According to an aspect, at least one of the mold 2414 and the plunger 2430 are preheated to a temperature of at least 250° C. According to an aspect, the mold 2414 is preheated to a temperature at least 100° C. and not greater than 500° C. According to an aspect, the plunger 2430 is preheated to a temperature at least 100° C. and not greater than 500° C.

According to an aspect, a portion of at least one of the mold 2414 and the plunger 2430 are (selectively) cooled. According to an aspect, the mold 2414 can be (selectively) heated and (selectively) cooled in different areas or regions. According to an aspect, the method further comprises cooling the gob 224 during the pressing to form the part 110 (FIG. 1).

After the gob 224 is pressed to form the gob-pressed part 110, 1710, one or more of the inside surface 1218, 1718, 1818 and the outside surface 1222, 1722, 1822 of the glass body 1214, 1714, 1814 of the as-formed gob-pressed part 110, 1710 are configured to have a profile within a predetermined tolerance (e.g., ±200 μm) from a target shape. Deviation of the profile from the target shape and corresponding tolerances are discussed herein with respect to the gob-pressed part(s) 110, 1710 for example and apply to other such parts.

According to an aspect of the present disclosure, the glass body 1214, 1714, 1814 of the as-formed glass part 1710 is further configured to have the wall thickness (e.g., total variation, section-to-section thickness difference, per section continuous thickness variation, etc.) and the section configurations (e.g., flat section 1226, 1726, 1826 and/or bend section 1230, 1730, 1830) discussed hereinabove with respect to the gob-pressed part(s) 110, 1710 for example and apply to other such parts.

According to an aspect, if the inside surface 1218, 1718, 1818 and/or the outside surface 1222, 1722, 1822 of the part 110, 1710 (FIGS. 1, 36) formed by the method (e.g., method 2310) has a deviation from the target shape that exceeds the predetermined tolerance (e.g., ±200 μm), the method can include applying a process modification based on one or more current process parameters of the method.

According to an aspect, the process modification comprises adjusting the pressing (e.g., increasing a number of pressing cycles or increasing a dwell time of the pressing) of the gob 224 and is based on a composition of the gob 224. Through experiments, Applicants discovered a correlation between the deviation (e.g., warp) of the as-formed glass part 1710 and the dwell time during pressing (e.g., time the mold 2414 and the plunger 2430 are in contact with the gob 224 under pressure during the pressing). In particular, Applicants discovered that a longer dwell time can help reduce the profile deviation of the as-formed glass part 1710. However, increased dwell time may lead to defects, such as sticking, high stress, and/or cracking.

Effects of dwell time relate to a viscosity curve of the glass. If the composition of the glass has a long working range or shallow slope to change in viscosity with time under cooling conditions, dwell time during the pressing can be increased to allow for more heat extraction from the glass to the plunger and the mold. Such heat extraction can improve the profile of the as-formed gob-pressed parts 110, 1710. The plunger 2430 can be retracted before the temperature of the glass approaches the strain point or before the temperature of the glass decreases below the strain point thereof; otherwise, pressing may induce stress in the glass body, causing cracks or other defects before or during annealing, such as upon removal from the mold 2414. Thus, if the inside surface 1218, 1718, 1818 and/or the outside surface 1222, 1722, 1822 of the part 110, 1710 (FIGS. 1 and 36) formed by the method 2310 has a deviation from the target shape that exceeds a tolerance and the glass has a long working range, the process modification may include increasing dwell time during the pressing. According to an aspect, the increased dwell time is applied while a viscosity of the glass, during the pressing, is in a range of from about 102 P and 109 P, enabling varying dwell time without defects, such as sticking, high stress, and/or cracking.

If the composition of the glass has a short working range or steep slope, dwell time during the pressing may need to be decreased. According to an aspect, preheating the surface of the mold with a low-intensity flame prior to depositing the glass thereon can mitigate or prevent small cracks on the inside and outside surfaces after the pressing. Depending on the wall thickness of the glass body 1214, 1714, 1814 after a first pressing, the glass body 1214, 1714, 1814 can be pressed again (e.g., a second pressing) subsequent to a first retracting of the plunger after the first pressing. Use of flame to treat surfaces of the mold, such as to a temperature between 100° C. and 500° C., may provide an additional benefit of depositing soot, which may facilitate removal of thin parts of wide area, as disclosed herein. However, molds and/or plungers may benefit from other methods of temperature control for surfaces thereof, such as resistive heaters, inductive heaters, etc., which may be used in conjunction with flame treatment or in place thereof, such as where a different lubricant is used or where no lubricant is needed. Resistive heaters treating surfaces of the mold and plunger may be more precisely controlled than flame, for example.

According to an aspect of the present disclosure, glass parts herein may comprise silicate glass, such as aluminosilicate glass, such as aluminoborosilicate glass, and accordingly comprise silica ($SiO_2$), alumina ($Al_2O_3$), and/or boria ($B_2O_3$) as exemplary batch constituents while having viscosities and other properties disclosed herein suitable for gob-press forming, and for use of the glass parts as enclosures for electronics or other devices. Additionally, the glass may include colorant(s). The glass may further include alkali metal oxides ($R_2O$), such as lithia ($Li_2O$) and/or soda ($Na_2O$), to facilitate ion-exchange chemical strengthening of the parts 110, 1710. In aspects, the glass may include other compositional constituents. Note that "mol %" is an abbreviation for molar percentage of the respective constituent in the glass on an oxide basis when measured.

According to an aspect of the present disclosure, silica is a primary glass former in the glass and may stabilize the molecular network structure of the glass. The concentration of silica in the glass articles should be sufficiently high (e.g., 40 mol % or more) to enhance the chemical durability of the glass and, in particular, the resistance of the glass to degradation upon exposure to acidic solutions, basic solutions, and in water. However, silica may be limited (e.g., 80 mol % or less) to control melting point of the glass composition, as the melting point of pure silica is undesirably high and may not be suitable for gob-pressing as a practical matter. According to an aspect, the glass may comprise a positive amount of silica, such as at least 1 mol %, such as at least 40 mol %, such as at least 50 mol %, such as at least 55 mol %, such as at least 60 mol %, and/or not pure silica, such as no more than 85 mol %, such as no more than 80 mol %.

Like silica, alumina may also stabilize the network of the glass and provide mechanical strength and chemical durability. Alumina may be included such that the resultant glass article has the desired fracture toughness (e.g., greater than or equal to 0.7 $MPa \cdot m^{1/2}$). The amount of alumina may also influence viscosity of the glass. According to an aspect, the glass may comprise a positive amount of alumina, such as at least 1 mol %, such as at least 2 mol %, such as at least 4 mol %, such as at least 7 mol %, and/or no more than 35 mol %, such as no more than 30 mol %, such as no more than 25 mol %, such as no more than 20 mol %.

Applicants find that boria decreases a melting point of the respective glass, which may help facilitate gob-press forming. Also, boria may reduce formation of non-bridging oxygen, the presence of which may reduce fracture toughness. However, if there is too much boria (e.g., >20 mol %), an annealing point and a strain point may decrease, influencing dwell time of the press, as described above. According to an aspect, the glass may comprise a positive amount of boria, such as at least 0.5 mol %, such as at least 1 mol %, such as at least 3 mol %, and/or no more than 20 mol %, such as no more than 12 mol %.

As described above, the glass may contain alkali metal oxides, such as lithia, soda, or potash (K$_2$O) for example, which may facilitate chemical strengthening of the parts. Applicants find that lithia also generally reduces the softening point of the glass, thereby increasing formability. However, if the amount of lithia is too high (e.g., >25 mol %), a liquidus temperature may increase too much, thereby harming manufacturability, such as with gob-press forming. According to an aspect, the glass may comprise a positive amount of lithia, such as at least 0.5 mol %, such as at least 1 mol %, such as at least 4 mol %, such as at least 6 mol %, and/or no more than 20 mol %, such as no more than 15 mol %. Applicants find soda improves diffusivity of alkali ions in the glass and thereby reduces time to chemically strengthen the glass, and helps achieve a desired surface compressive stress (e.g., 300 MPa or more). Also, soda generally improves formability but if too much soda is added, the melting point may be too low, perhaps increasing sticking to a mold. According to an aspect, the glass may comprise a positive amount of soda, such as greater than 0.1 mol %, such as greater than 0.5 mol %, such as at least 1 mol %, such as at least 3 mol %, and/or no more than 25 mol %, such as no more than 20 mol %. Potash may also facilitate ion-exchange, such as by increasing depth of compression. Further potash may decrease a melting point of the glass to improve the formability, but too much potash may cause the melting point and a surface compressive stress, after chemical strengthening, to be too low. According to an aspect, the glass may comprise a positive amount of potash, such as greater than 0.1 mol %, such as greater than 0.5 mol %, such as at least 1 mol %, such as at least 3 mol %, and/or no more than 25 mol %, such as no more than 20 mol %. Different alkali metal oxides may be mixed and matched to achieve similar results as described. According to an aspect, concentration of alkali metal oxides in the glass may be positive, such as at least 1 mol %, such as at least 5 mol %, such as at least 10 mol %, and/or not more than 40 mol %, such as not more than 30 mol %, such as not more than 25 mol %.

According to aspects of the present disclosure, the glass articles can further include alkaline earth metal oxides, such as magnesia (MgO) or similar oxides, such as zinc oxide (ZnO) lower melting point of the glass, such as for higher silica concentrations for example. For colored glasses, it is also believed that partially replacing lithia and/or soda with magnesia and/or zinc oxide may help improve retention of colorants, such as if the lithia and/or soda are included in the batch via raw materials such as lithium carbonate and sodium carbonate, where carbonate gas is released from the glass composition, because colorants may be carried from molten glass in the carbonate gas. Further, Applicants find that magnesia and zinc oxide generally lower viscosity of the glass, but with too much diffusivity of sodium and potassium ions decreases which may adversely impact ion-exchange. According to an aspect, a sum (in mol %) of magnesia and/or zinc oxide in the glass is positive, such as at least 0.1 mol %, such as at least 0.5 mol %, and/or no more than 10 mol %, such as no more than 8 mol %. Similarly, other alkaline earth oxides, such as quicklime (CaO), strontia (SrO), and baria (BaO), may decrease a melting point of the glass, and the glass may comprise a positive amount of some or each, such as at least 0.1 mol %, such as at least 0.5 mol %, and/or no more than 10 mol %, such as no more than 8 mol %. As used herein, R'O is a sum in mol % of MgO, ZnO, CaO, BaO, and SrO According to an aspect, R'O in the glass may be greater than 0 mol %, 0.5 mol % or more, 1 mol % or more, 1.5 mol % or more, 2 mol % or more, 2.5 mol % or more, and/or 8 mol % or less, 7.5 mol % or less, 7 mol % or less, 6.5 mol % or less, 6 mol % or less, 5.5 mol % or less, 5 mol % or less, 4.5 mol % or less, 4 mol % or less, or 3.5 mol % or less.

According to aspects of the present disclosure, the glass described can further comprise phosphorus pentoxide (P$_2$O$_5$) as a constituent. Phosphorus pentoxide may the ion exchange characteristics of the glass and/or even steam strengthening, but too much may reduce retention of colorants. According to an aspect, the glass may comprise a positive amount of phosphorus pentoxide, such as at least 0.5 mol %, such as at least 1 mol %, such as at least 3 mol %, and/or no more than 20 mol %, such as no more than 12 mol %.

According to aspects of the disclosure, the glass may comprise at least one colorant. According to an aspect, the colorant may comprise at least one of Au, Ag, Cr$_2$O$_3$, transition metal oxides (e.g., CuO, NiO, Co$_3$O$_4$, TiO$_2$, Cr$_2$O$_3$, V$_2$O$_5$), rare earth metal oxides (e.g., CeO$_2$), and/or combinations thereof. For example, colorants based on transition metal oxides and/or rare earth oxides may further include oxides of V, Mn, Fe, Cu, Zr, Nb, Mo, Tc, Ru, Rh, Pd, Cd, Hf, Ta, W, Re, Os, Ir, Pt, Pr, Nd, Sm, Eu, Gd, Tb, Dy, Ho, and Er. According to an aspect, the glass may comprise a colorant or colorant package such that the glass comprises $1\times10^{-6}$ mol % to 10 mol % of any one of the above colorants, and/or a sum of two of the above colorants may be between $1\times10^{-6}$ mol % to 10 mol %, and/or a sum of three of the above colorants may be between $1\times10^{-6}$ mol % to 10 mol %, and/or a sum of four of the above colorants may be between $1\times10^{-6}$ mol % to 10 mol %, a sum of five of the above colorants may be between $1\times10^{-6}$ mol % to 10 mol %. (i.e., the sum of all colorants in the colorant package). According to an aspect, concentration of any one of the above colorants in the glass may be 3 ppm or more (e.g., for gold), 5 ppm or more, $1\times10^{-6}$ mol % or more, 0.0005 mol % or more, 0.001 mol % or more, 0.01 mol % or more, 0.1 mol % or more, and/or 10 mol % or less, 3 mol % or less, 1 mol % or less, 0.5 mol % or less. In aspects, the difference between R$_2$O and Al$_2$O$_3$ (i.e. R$_2$O (mol %)–Al$_2$O$_3$ (mol %)) in the glass articles described herein may be adjusted to produce a desired observable color (e.g., pink, purple, red, orange, or blue).

According to an aspect, the gob-pressed glass may be colored and have a transmittance color coordinate in the CIELAB color space. Depending upon colorants used, a* and b* may be positive or negative and range from −110 to 110, and L* may be from 0 to 100. For colored glasses other than black or dark colors or extremely white colors, L* may be greater than or equal to 20 and less than or equal to 98.5. For example, gob-pressed colored glass may have a transmittance color coordinate in the CIELAB color space of L* greater than or equal to 55 and less than or equal to 96.5, a* greater than or equal to −10 and less than or equal to 25, and b* greater than or equal to −20 and less than or equal to 5. Unless otherwise specified, the transmittance color coordinates in the CIELAB color space are specified at a thickness of the respective part unless otherwise specified (such as at thicknesses of 0.4 to 5 mm) under F2 illumination and a 10° standard observer angle. Other contemplated glasses, such as black opaque glass may be otherwise colored (e.g., lesser L* for example).

According to an aspect, based on use of the above-described constituents, the glass herein may have a $K^{IC}$ fracture toughness, as measured by ASTM chevron-notch short bar testing according to ASTM C1421-10, "Standard Test Methods for Determination of Fracture Toughness of Advanced Ceramics at Ambient Temperature," prior to ion exchange, of 0.7 MPa·m$^{1/2}$ or more, 0.8 MPa·m$^{1/2}$ or more, 0.9 MPa·m$^{1/2}$ or more, or 1.0 MPa·m$^{1/2}$ or more. Similarly, a dielectric constant $D_k$ of the glass measured using a split post dielectric resonator (SPDR) at a frequency of 10 GHz on samples of the glass article having a length of 3 inches (76.2 mm), a width of 3 inches (76.2 mm), and a thickness of less than 0.9 mm includes a dielectric constant $D_k$ at 10 GHz of 6.8 or less, 6.7 or less, 6.4 or less, 6.2 or less, 6 or less, and/or 5.6 or more, 5.7 or more, 5.8 or more, 5.9 or more, or 6.0 or more.

Referring back to FIG. 44, Applicants find after the plunger is retracted and is not in contact with the glass body 1214, 1714, 1814 after the first pressing, the glass may reheat since the center of the glass body is hotter than the inside and outside surfaces of the glass body, which were in contact with the mold and the plunger during the first pressing. At this point, the glass body may be pressed again (e.g., a second pressing) to improve dimensional control of the part, if needed, while not inducing too much stress in the glass body 1214, 1714, 1814 as long as a temperature of the glass during the second pressing is above the strain point. Thus, if the inside surface 1218, 1718, 1818 and/or the outside surface 1222, 1722, 1822 of the part 110 (FIG. 1) formed by the method has a deviation from the target shape that exceeds the predetermined tolerance and the glass has a short working range, a process modification may comprise (i) preheating a surface of the mold with a low-intensity flame prior to depositing the glass thereon and/or (ii) increasing a number of pressing cycles during the pressing, such as to at least include a second pressing.

According to an aspect, the gob 224 of the part 110 (FIG. 1) formed via the gob-pressing methods disclosed herein may contain some defects, such as indentations (or dimples—depressions in the surface of the glass body), surface checks/cracks, blisters, chips, cords, dice, observable crystals, laps, seeds, stones, and stria. According to an aspect, there are less than an average of 50, 40, 30, 20, 10, 5, 4, 3, 2, or 1 of any one type of such defect(s) that are 150 μm in largest dimension on or beneath a 25 mm by 25 mm area of the part, as measured by optical microscopy. While such defects may be undesirable, they may also provide indicia or a fingerprint in a finished part that the part was made by gob-pressing, as further explained below.

Figure 45:
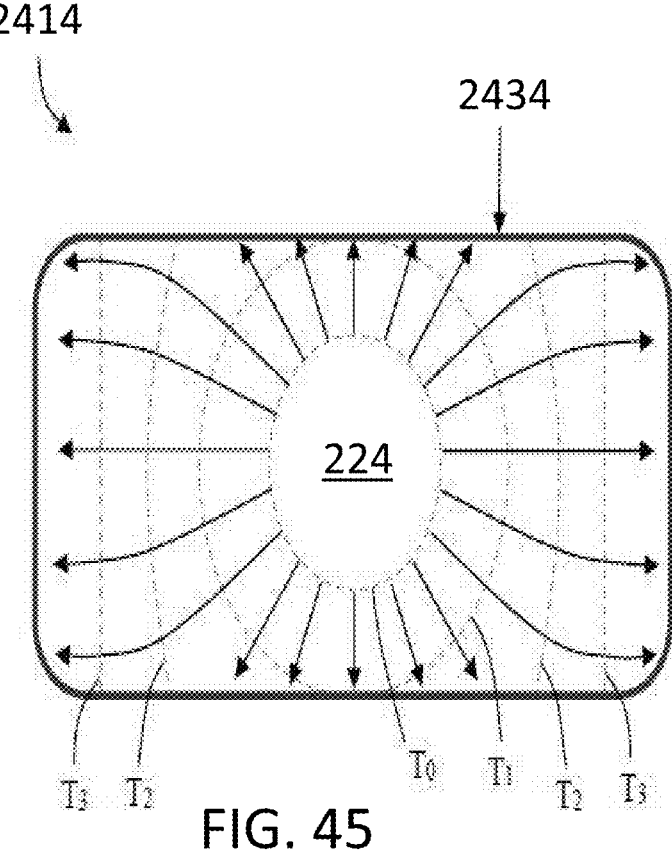
FIG. 45 is a top-down conceptual diagram of glass moving through a mold during gob-pressing according to aspects of the present disclosure.

Gob-pressing as disclosed herein may result in high-velocity glass flow of the gob 224 when in the molten state during the pressing, especially during the initial portion of the pressing. FIG. 45 shows a top view schematically depicting the high-velocity glass flow of the gob 224 within the closed volume 2434 (e.g., defined by the mold 2414 and the plunger 2430) during the pressing. The solid line indicated by reference number 2434 demarks a boundary of the closed volume. The dashed lines illustrate gob flow front evolution at different times, such as at an initial time $T_0$ when the gob is first deposited in the mold, a first time $T_1$ when the gob is initially pressed and expands within the closed volume 2434, a second time $T_2$ when the gob is pressed more and further expands within the closed volume, and so on. The arrows indicate glass flow paths from different starting positions about an origin of the gob 224. As illustrated, the glass flow comprises radial glass flow disposed proximate to the origin (e.g., at $T_0$) and radiating away from the origin and across at least a portion of the glass body in different directions. Once the gob flow front meets an edge or boundary of the closed volume 2434, the radial glass flow transitions to axial glass flow (e.g., the arrows are substantially parallel to one another).

Without being bound by theory, defects may manifest in the glass in a manner indicative of the forming process. According to an aspect of the present disclosure, indicia of gob-pressing may comprise elongate seeds (or small air bubbles) dispersed throughout the glass. Each of the elongate seeds has a lengthwise axis that extends in a direction of elongation and may aligned with the corresponding glass flow. Such seeds (e.g., prior to elongation) may arise from typical melting processes associating with glass. According to an aspect, the seeds could be introduced into the melt such that the glass can be "tagged" with the seeds. According to an aspect, the lengthwise axis of each elongate seed has a length in a range of from about 100 nm to about 50 μm. For glass flow radiating from a location of a gob, seeds may be oriented differently from one another, and those proximate to the location of the gob may extend lengthwise to and from that location; put another way, they may point to that location. Those further from the location of the gob may become more aligned with one another.

Figure 46:
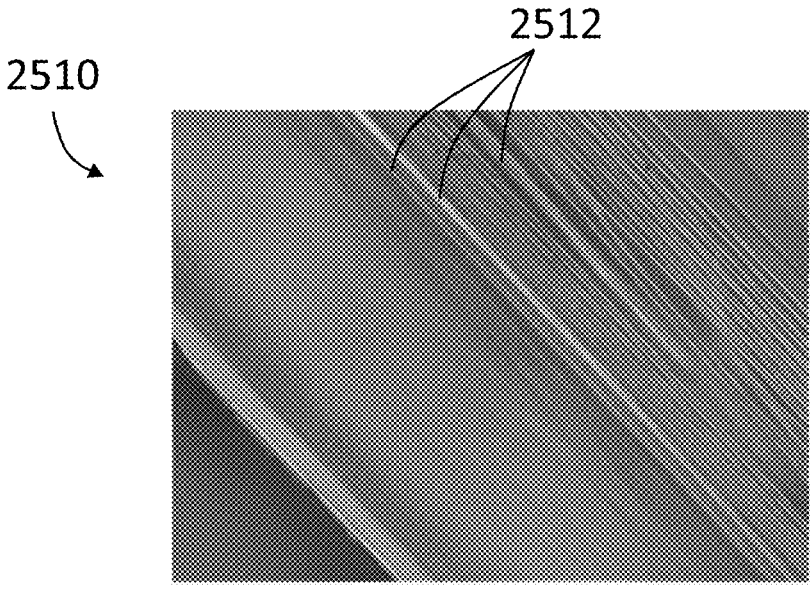
FIG. 46 is a digital image of defects oriented along a flow direction of glass.

According to an aspect, indicia may comprise acicular (i.e. needle-like, elongate) particles dispersed throughout glass of the part 110, 1710. Each acicular particle may have a lengthwise axis aligned with the glass flow. According to an aspect, the lengthwise axis of each acicular particle has a length in a range of from about 100 nm to about 50 μm. Similarly, according to an aspect, indicia may comprise cords or striae disposed within the glass and aligned along the high-velocity glass flow. Such defects extend from partially melted raw or material that is not homogenously mixed. According to an aspect, the cords or striae impart stress within the glass that results in a retardation of at least 5 nm for detection using polarized light. Referring to FIG. 46, a glass part 2510 includes striae 2512 generally aligned with one another showing a flow path of the glass, aligned with the lengthwise direction of the striae 2512. As with the seeds, acicular particles, cords, and striae may orient along glass flow radiating from a location of a gob, such defects may be oriented differently from one another, and those proximate to the location of the gob may extend lengthwise to and from that location. Those further from the location of the gob may become more aligned with one another.

According to an aspect, a density of the glass may indicate the high-velocity flow glass flow in gob-pressing. Without being bound by theory, it is believed there may be a gradient with a lower density closest to the inside and outside surfaces where the cooling is faster and higher density within the bulk where the cooling is slower. Thus, according to an aspect, the density can have a density gradient that is substantially symmetrical between the inside and outside surfaces. According to an aspect, the density gradient comprises a surface density that increases from each of the inside and outside surfaces to a bulk density disposed centrally between the inside and outside surfaces.

According to an aspect, the method of gob-pressing to form a glass part further comprises (e.g., before optional post-processing) removing the part 110, 1710 from the mold 2414. According to an aspect, the part 110, 1710 may be removed from the mold 2414 by gravity after the pressing. According to an aspect, the part 110, 1710 may be removed from the mold 2414 via a vacuum cup. According to an aspect, the removing may be automated.

According to an aspect, the method of gob-pressing to form a glass part optionally comprises additional post-processing, such as annealing, machining, surface finishing, chemically strengthening, heat treating (e.g., ceramming), laser processing (e.g., cutting, imparting indicia, selectively strengthening portions or regions of the final part), and/or combinations thereof.

According to an aspect, the method of making the gob-pressed part 110, 1710 may further comprise a step of chemically strengthening the part 110, 1710. As such, the part 110, 1710 may comprise one or more compressive stress regions. According to an aspect, chemically strengthening may comprise an ion exchange process, where ions in a surface layer of glass of the part 110, 1710 are replaced by—or exchanged with—larger ions having the same valence or oxidation state. Without wishing to be bound by theory, chemically strengthening the gob-pressed part 110, 1710 may facilitate good impact resistance, good puncture resistance, and/or higher flexural strength. A compressive stress region may extend into a portion of part 110, 1710 for a depth called the depth of compression (DOC). As used herein, depth of compression means depth at which the stress in the chemically strengthened part 110, 1710 described herein changes from compressive stress to tensile stress.

Depth of compression is measured by a surface stress meter or a scattered light polariscope (SCALP, wherein values reported herein were made using SCALP-5 made by Glasstress Co., Estonia). Where the stress in the glass article is generated by exchanging potassium ions into the substrate, a surface stress meter, for example, the FSM-6000 (Orihara Industrial Co., Ltd. (Japan)), may be used to measure depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the glass article, and the glass article is thicker than about 400 μm, scattered light polariscope (SCALP; e.g., SCALP-5 made by Glasstress Co., Estonia) is used to measure the depth of compression and central tension (CT). Where the stress in the glass article is generated by exchanging both potassium and sodium ions into the glass article, and the article being measured is thicker than about 400 μm, the depth of compression and CT are measured by SCALP.

Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample") method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement.

According to an aspect, the gob-pressed part 110, 1710 may comprise a first compressive stress region extending to a depth of compression from a major surface. According to an aspect, the part 110, 1710 may comprise a second compressive stress region extending to a second depth of compression from a second major surface. In aspects, either depth of compression as a percentage of the thickness can be 5% or more, 10% or more, 12% or more, 15% or more, and/or 30% or less, 25% or less, 22% or less, 20% or less, 17% or less, or 15% or less. According to an aspect, either depth of compression can be 10 μm or more beneath the respective surface, 20 μm or more, 30 μm or more, 40 μm or more, 50 μm or more, 60 μm or more, and/or 500 μm or less, 200 μm or less, 150 μm or less, 100 μm or less.

According to an aspect, the compressive stress region can comprise a maximum compressive stress. In further aspects, the maximum first compressive stress may be 100 megapascals (MPa) or more, 300 MPa or more, 400 MPa or more, 500 MPa or more, 600 MPa or more, 700 MPa or more, and/or 1,500 MPa or less, 1,200 MPa or less, 1,000 MPa or less, or 800 MPa or less. According to an aspect, the tensile stress region can be positioned between the first compressive stress region and the second compressive stress region and comprises a maximum tensile stress. According to an aspect, the maximum tensile stress can be 10 MPa or more, 30 MPa or more, 50 MPa or more, 60 MPa or more, 80 MPa or more, and/or 250 MPa or less, 200 MPa or less, 100 MPa or less, 80 MPa or less, or 60 MPa or less.

Figure 47:
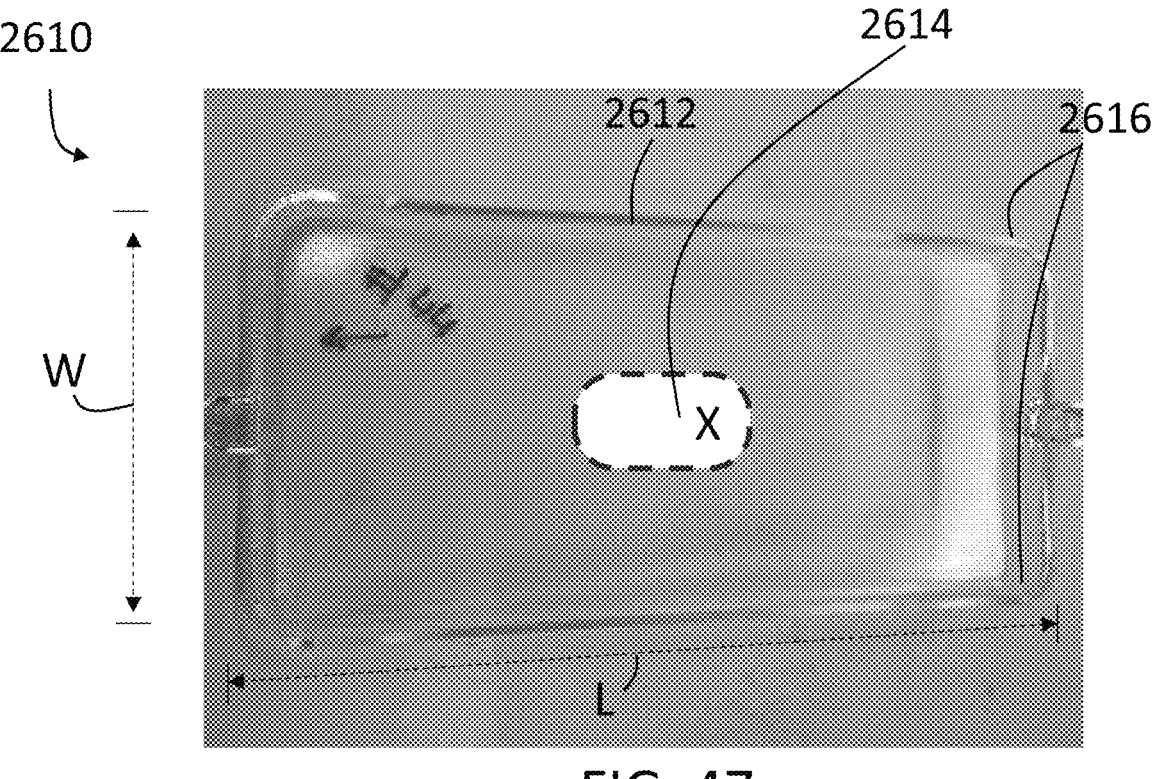
FIG. 47 is a digital image of a glass part formed from gob-pressing according to aspects of the present disclosure.

Referring to FIG. 47, a glass part 2610 formed by gob-pressing comprises a rectangular shape. A width (W) of the part 2610 is greater than a length (L), such as more than twice. The part 110, or other such parts as disclosed herein, has large major surfaces, such as greater than 4 cm$^2$, such as greater than 10 cm$^2$, greater than 25 cm$^2$, greater than 50 cm$^2$, such as greater than 100 cm$^2$, and/or no more than 1 m$^2$, such as no more than 0.25 m$^2$. The part 110, or other such parts as disclosed herein, has total surface area (e.g., sum area of major surfaces and edges, including side wall area less any holes) greater than 4 cm$^2$, such as greater than 10 cm$^2$, greater than 25 cm$^2$, greater than 50 cm$^2$, such as greater than 100 cm$^2$, such as greater than 200 cm$^2$, and/or no more than 1 m$^2$, such as no more than 0.5 m$^2$. Notably, with use of the methods and equipment disclosed herein, even with such large surfaces, the part 110, 2610 is remarkably thin, having a thickness (t; orthogonal to W and L) less than 5 mm, such as less than 3 mm, less than 2 mm, less than 1.5 mm, less than 1 mm, and/or at least 20 μm, such as at least 50 μm for a least a portion thereof.

Glass of the part 2610 is a silicate, such as an alumino-silicate, such as a boro-alumino-silicate and has corresponding properties as disclosed herein, such as viscosity and fracture toughness. More specifically the glass of the part 2610 has roughly 60 mol % silica, 18 mol % alumina, 6 mol % boria, 4 mol % magnesia, 11 mol % lithia, and small amounts of other constituents as disclosed herein, such as quicklime and soda.

Also notably the part 2610 includes a side wall 2612 and a hole 2614. The side wall 2612 is notable because sufficient volume of the glass was able to spread all the way from proximate to a geometric centroid (X), where the glass gob was positioned during gob-pressing of the part 2610, to the far corners 2616 and then overcome momentum to change direction and fill in the side wall 2612 and corners 2616. The hole 2614 may be pressed and formed as a thinner portion of the part 2610 during the gob-pressing, and then may be etched or cut away afterward.

Figure 48:
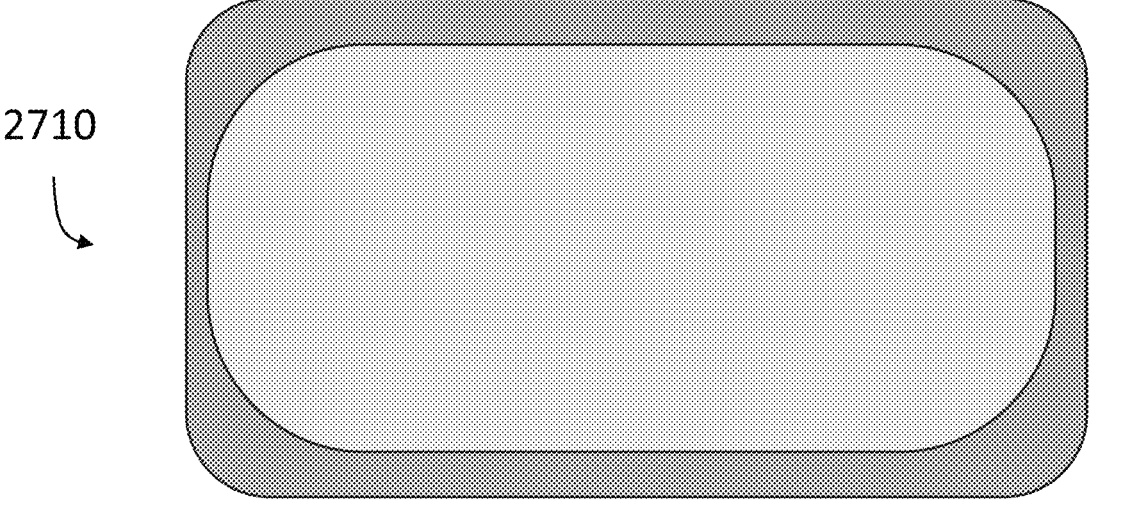
FIG. 48 is a digital image of a glass-ceramic part formed from gob-pressing according to aspects of the present disclosure.

Referring now to FIG. 48, a glass part 2710 is similar to the glass part 2610, but is opaque, colored white, and comprises a glass-ceramic. As such, the part 2710 has undergone heat treatment to ceram crystals within glass thereof. When forming such parts, prior to ceramming, glass of the part 2710 is a silicate, as described herein. More specifically, the glass of the part 2710 includes about 70 mol % silica, 4 mol % alumina, 20 mol % lithia, 2 mol % zirconia, 1 mol % phosphorus pentoxide as well as small amounts of other constituents as disclosed herein, such as potash. After ceramming, the part 2710 includes crystals of lithium disilicate and petalite. Other such glass-ceramics may include beta-quartz, lithium phosphate, cristobalite, for example, or other crystals. Both parts 2610 and 2710 have sufficient quantity and type of metal alkali oxides for chemical strengthening as disclosed herein.

Figure 49:
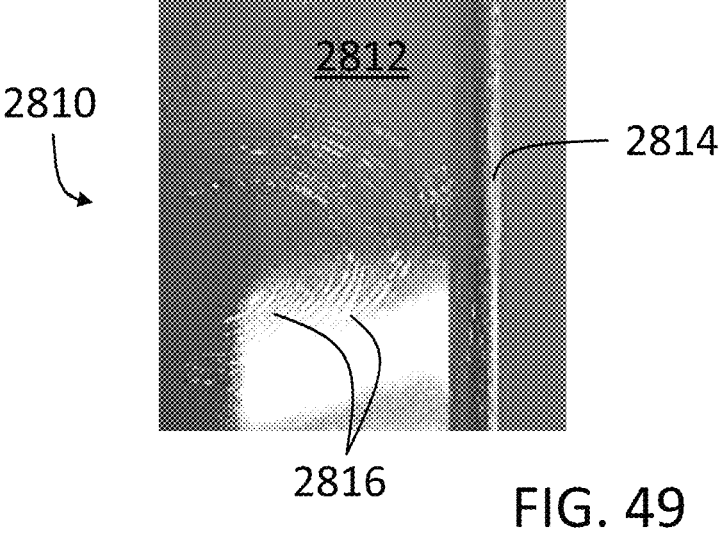
FIG. 49 is a digital image of another glass part formed from gob-pressing according to aspects of the present disclosure.
Figure 50:
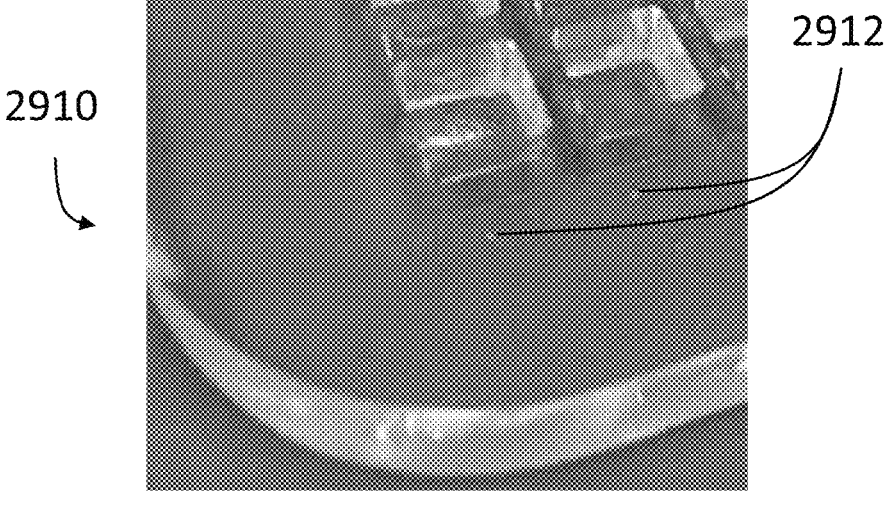
FIG. 50 is a digital image of a glass part similar to that of FIG. 49 after post-processing according to aspects of the present disclosure.

FIG. 49 shows another glass part 2810. The part is also rectangular and includes major surfaces 2812 and a side wall 2814. Notable in FIG. 49, chill wrinkles 2816 are present, showing a direction of glass flow away from a corner of the part 2810. Such defects may be polished out of a gob-pressed part, as evidence by a polished part 2910 of FIG. 50, which is transparent, as shown. Notably, the polished part 2910 comprises a seed, blister, or bubble 2912 stretched in a direction of glass flow. Other bubbles may be visible using microscopy.

Additional post-processing may comprise computer numerical control machining of details, polishing, decorating etc. Applicants find gob-pressing methods described herein provide both technical and commercial advantages: speed (e.g., pressing takes seconds, post-processing requires less grinding and polishing), flexibility (e.g., mold pattern and plunger pattern variable to provide multiple combinations and permutations of near net shape components having molded features thereon), material utilization (e.g., lower loss of material to make near net shape component or final part), and machining time (e.g., if any, on select regions or smaller areas).

Referring now to FIGS. 51-53C, glass parts, such as parts 2810, 2910, may be analyzed using Raman spectroscopy. For the analysis plotted in FIGS. 52 and 53A-53C glass parts, similar to parts 2810, 2910, were made by three different processes—(1) machining the part from a block of glass via computer numerical control, (2) forming the part from a sheet of molten glass, and (3) gob-pressing. Aesthetically the glass parts made by these three approaches appear very similar to one another, especially after post processing, such as polishing, annealing, ion-exchanging the parts. Part 3010 is representative, and includes first major surface 3012 and side walls 3014.

Figures 53A, 53B, 53C:
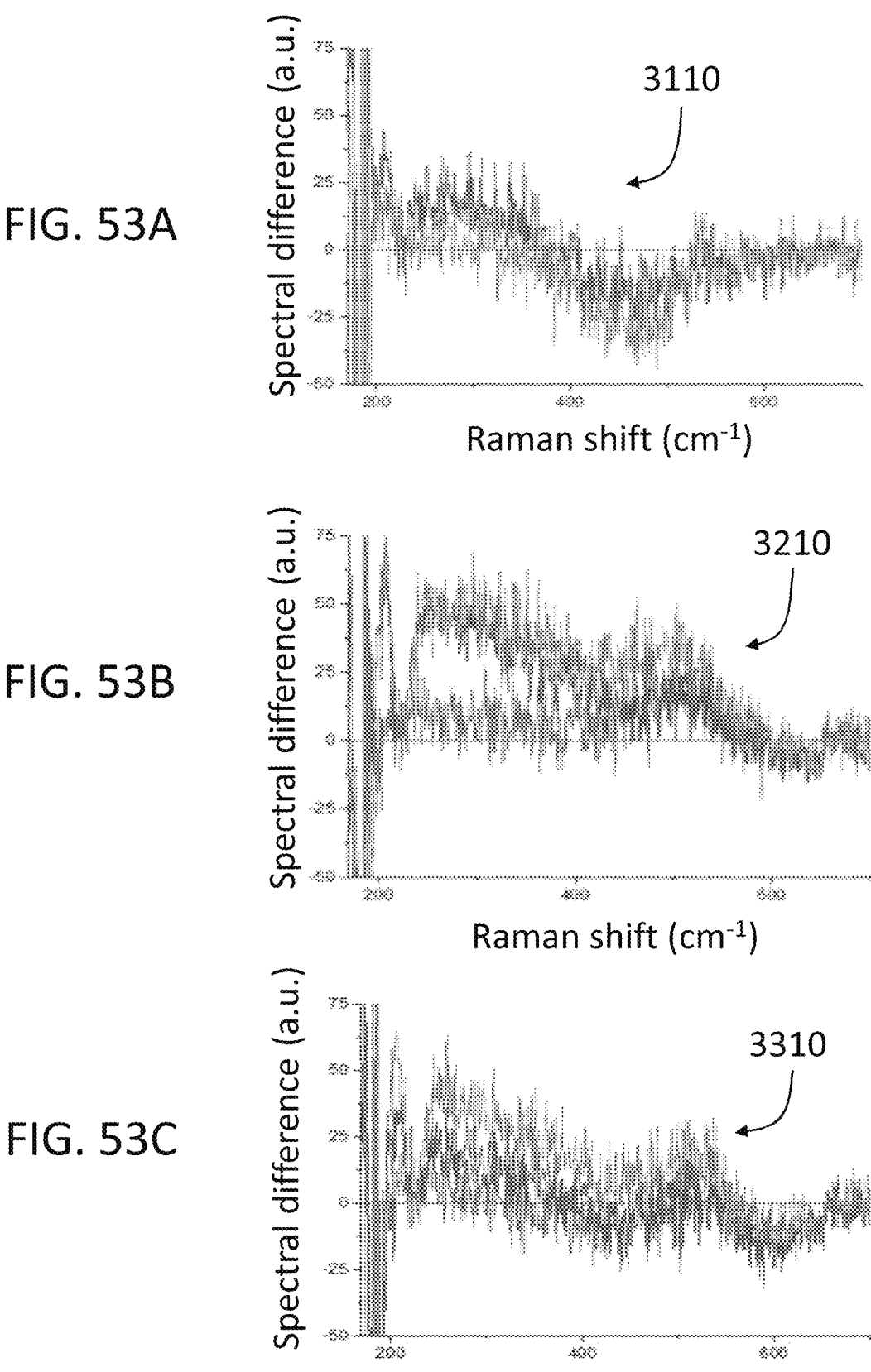
FIGS. 53A-53C are plots of Raman spectra for otherwise similar glass parts made by different methods.

When Raman analysis is conducted at the first major surface 3012 and side walls 3014 of many such parts made by each of the above three methods, Raman shift curves largely overlap. However, differences may be seen at the network bending modes, such as between 250-600 cm$^{-1}$, for the respective glasses. FIG. 53A presents the Raman shift 3110 of a side wall and major surface of a part, such as the part 2910, made by machining that part from a block of glass. By contrast, FIG. 53B presents the Raman shift 3210 of that for a part made by reshaping a glass sheet, or sheet pressing. By contrast still, FIG. 53C presents the Raman shift 3310 of that for a part made by gob-pressing, which shows a gradient from the center (e.g., gob position) of the part to the edge.

According to an aspect of the present disclosure, gob-pressed parts may comprise rounded corners, such as a location where two sides meet, coming together at a radiused corner, as opposed to a share point. The sides coming together may be oriented normal to one another. The corner may be rounded, such as generally having (over at least a portion thereof) a radius of curvature that is less than a furthest distance from the corner to the geometric centroid of the article. However, Applicants contemplate the radius of curvature may also be at least that distance or greater.

According to an aspect of the present disclosure, glass of parts may be at an elevated temperature at least for a small period of time, such as at a temperature over 100° C. for at least 10 seconds, such as at least 20 seconds, at least 1 minute, at least 10 minutes. The glass at the elevated temperature may serve to reduce residual stress in the glass and/or to grow a crystalline phase therein. Also, the glass part may be cooled and/or at a temperature below 100° C., such as during use of the part and/or integration of the part into a device as disclosed herein.

According to an aspect of the present disclosure, gob-pressed parts may have fairly large surfaces areas, as disclosed above; and a large percentage of that area corresponds to a particularly small thickness. Put another way, according to an aspect, a distance through the part normal to the surface (i.e. passing linearly through the part to from the respective surface to another surface) is small, such as less than 5 mm, such as less than 3 mm, such as less than 2 mm, such as less than 1 mm, such as less than 0.8 mm, and/or at least 20 μm, such as at least 100 μm, such as at least 300 μm, for most of the surface of the part, such as greater than 50% of the surface, greater than 60%, greater than 65%, greater than 70%, greater than 75%, greater than 80%, greater than 85%. However, according to an aspect, such parts may further comprise a thicker portion, such as the juts disclosed above, where the thicker portion is at least 1.1 times (i.e. 1.1×) at least another portion of the part, such as at least 1.25×, 1.5×, 1.8×, 2×, 3×, 5×, or even at least 10× at least another portion of the part, and where at least some of the thicker portion may be located away from a geometric centroid of the part, such as at least 0.5 cm away, at least 1 cm away, at least 1.5 cm away, at least 3 cm away, at least 5 cm away from the geometric centroid of the gob-pressed part.

According to an aspect of the present disclosure, a gob-pressed part is at least partially coated after the gob-pressing. The coating may overlay at least some of a surface of the part, such as at least 1% of a total surface area of the part, such as at least 2%, 5%, 10%, or 30% of a total surface area of the part. The coating may comprise an adhesive, such as to glue the part to another part of a device. The coating may comprise a translucent coating or even a transparent coating, such as allowing >80% transmittance in the visible 380-700 nm to pass normally or orthogonally through the coating, at a thickness of the coating, and/or through a 10 micrometer pathlength. The coating may be a so-called hard coating, providing scratch resistance to the part, and may have a modulus of elasticity within 50 GPa of glass of the part, such as within 30 GPa thereof, such as within 20 GPa, such as within 10 GPa, and/or glass of the part may have a high modulus of elasticity, such as over 70 GPa, such as over 80 GPa, such as over 90 GPa, such as over 100 GPa in some instances, but less than 150 GPa, where the coating may have a modulus greater than that of the glass, but within the above ranges relative thereto. The coating may comprise a stacking of more than one layers of different materials, such as an anti-reflective layer as well as an anti-scratch layer, where the anti-reflective layer itself may comprise alternating sublayers of different materials. According to an aspect, at least one of the coating layers is less than 1 mm, such as less than 500 μm, such as less than 300 μm, such as less than 100 μm, such as less than 50 μm, such as less than 30 μm, and/or at least 1 nm, such as at least 10 nm.

According to an aspect, glass parts disclosed herein may be coated with organic matter (e.g., conductive carbon), such as carbon-based polymeric chains, and/or another coating, such as oxides, nitrides, sulfides, metals, etc. The coating may comprise polymers for example, such as epoxy, acrylic, urethane, silicone, phenolic resin, polycarbonate, or others. The coating may comprise a thickness greater than 20 nm (as measured by cross-sectioning for example), such as greater than 50 nm, such as greater than 100 nm, and/or no more than 50 μm in many such as uses. Still other coatings may conceivably be thinner than 20 nm, such as those deposited by atomic layer deposition. According to an aspect, a method of making an article may comprise coating the parts disclosed herein, such as by sputtering, atomic layer deposition, spraying, vapor deposition, dipping, etc. The coating may provide a functional benefit to an article comprising the glasses or glass-ceramics. For example, coating may serve to improve scratch resistance, provide anti-reflective properties, change a coefficient of friction, etc.

According to an aspect of the present disclosure, molten glasses used for the gobs are fined, such as with relatively small amounts of tin (e.g., <5 mol % $SnO_2$) to remove large bubbles or blisters of gasses that may become trapped in the glass once the glass cools and solidifies. Gob-pressed parts may be completely free of large blisters, such as blisters having a cross-sectional dimension (e.g., linearly from one side through the bubble to another side) a greater than 1 mm. Furthermore, according to an aspect, through use of small particle raw materials, e.g., fine sand, as well as melting and mixing the constituents, the gob-pressed parts may be completely free of large inclusions of unmelted raw materials, such as particles having a cross-sectional dimension (e.g., linearly through the particle) greater than 1 mm. According to an aspect, glass of compositions disclosed above, such as silicate glass comprising alumina, lithia or other alkali metal oxides, possibly boria, etc., is amorphous, without any detectable crystals or precipitates. According to an aspect, heat treatment of at least some such glass may initiate/nucleate and promote crystal growth within the glass, converting the glass to a glass-ceramic. According to an aspect, a part may comprise glass with crystals distributed therein, such as homogenously distributed within at least a portion therein (e.g., over 50 vol %, over 60 vol %, over 90 vol %, all portions therein). According to an aspect, the crystals for at least 1 vol % (percent by volume of the part) of the part, such as at least 3 vol %, such as at least 5 vol %, such as at least 10 vol %, such as at least 20 vol %, such as at least 50 vol %, such as at least 70 vol %, and/or no more than 99 vol %, such as no more than 95 vol % with the rest being residual glass.

According to an aspect, glass of the present disclosure, such as glass in parts may appear clear and relatively color-less but be least partially colored, such as by having constituents that may color a glass, such as transition metals (e.g., Fe, Cu, Cr, Ti, Ag, Au, etc.) and/or rare earth metals, such as lanthanoids such as Ce, which may produce a yellow for example. According to an aspect, the glass (either alone or in a product, such as coupled with a coating as disclosed above) may have a CIELAB L* color coordinate of greater than 0 and less than 100 (e.g., greater than 10 and less than 99, greater than 20 and less than 98, greater than 30 and less than 97) and/or a CIELAB a* color coordinate of greater than −128 and less than 128, such as greater than −120 and less than 120; and/or a CIELAB b* color coordinate of greater than −128 and less than 128, such as greater than −120 and less than 120. Such measurements may be taken by commercially-available tools and software, for example, via a Shimadzu UV-1800 spectrophotometer equipped with an ISR-2600Plus integrating sphere, acquired as transmission scans between 380 nm and 700 nm and analyzed using the Shimadzu Color Analysis Software, where the CIELAB color space is selected for comparison using a D65 illuminant (midday light).

According to an aspect of the present disclosure, Applicants contemplate that the glass parts (including glass-ceramic parts) disclosed herein may be formed largely as or including a portion thereof that is essentially a sheet having major surfaces (i.e. surfaces with largest area; e.g., front and back surfaces) and edges or side-walls defining a perimeter of the sheet (see generally FIG. 1). According to an aspect, thickness varies very little between the major surfaces of the sheet except for certain features thereon, such as a jut, bump, shelf, etc., such that a difference in maximum and minimum values of thickness is close to zero between the most of major surfaces (e.g., >50% thereof, >80%), or as close as possible thereto while still being measurable under ASTM F657. Such high levels of geometric consistency may be achievable for sheets of small surface area, such as with careful polishing. However, according to an aspect, the major surfaces of at least some parts formed from the glasses and glass-ceramics disclosed herein have at least some total thickness variation therebetween, such as greater than 10 nm, greater than 20 nm, greater than 50 nm, greater than 75 nm, greater than 0.1 μm, greater than 0.2 μm, greater than 0.5 μm, greater than 1 μm, and/or less than 1 mm, such as less than 500 μm, such as less than 200 μm, for parts with geometries in alignment with the discussion above. For example, such parts may have total thickness variation greater than 0.1 μm and/or less than 1 mm (or other such values as just disclosed, and as may be controlled by polishing) over a majority of the major surfaces, as disclosed above.

According to an aspect, alternatively or in addition to such thickness, (1) surface(s) of the part may have a total area of greater than 25 $mm^2$ and no more than 10,000 $m^2$; (2) a body (i.e. continuous, contiguous monolith of glass, including glass ceramic) with volume greater than 25 $mm^3$ and no more than 100 $m^3$; and/or (3) a surface-to-surface dimension extending through a geometric centroid of the article that is greater than 5 mm and less than 5 km.

According to an aspect, glass parts (e.g., tube, container, sphere) may be cut, polished, or formed to have such geometric attributes, such as the above-disclosed total thickness variations in combination with one or more of the following attributes: (1) surface(s) with a total area of greater than 5 $cm^2$ and no more than 1000 $m^2$; (2) a body with volume greater than 50 $mm^3$ and no more than 1 $m^3$; and (3) a dimension extending from surface-to-surface through a geometric centroid of the article is greater than 5 cm and less than 5 m. With that said, an aspect of the present disclosure also includes articles of the presently disclosed glass or glass-ceramic, e.g., powder, microspheres, having a surface area less than 25 $mm^2$ and/or a volume less than 25 $mm^3$. Similarly, other glass or glass-ceramic articles, such as lenses or kitchenware of complex geometry may purposely include thickness variation greater than 1 mm, but may have any combination of other geometric attributes disclosed above.

Figure 54:
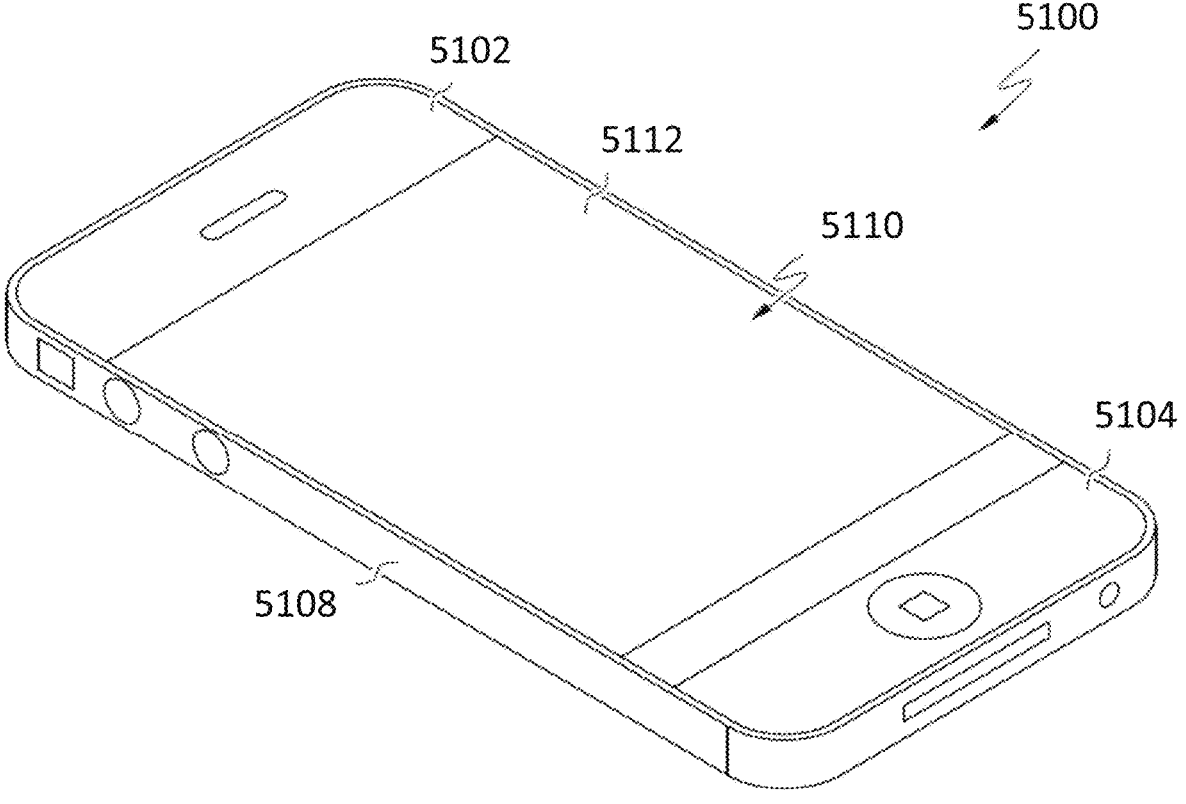
FIG. 54 is a generic device, such as handheld computer or communication device.

According to an aspect of the present disclosure, referring to FIG. 54, a device 5100 comprises the glass part(s) disclosed herein, such as a housing 5102, which may include side surfaces 5108. The glass part may form most of a display cover 5112 and/or the housing 5102 in terms of volume thereof. For example, the display cover 5112 may comprise a transparent glass-ceramic disclosed herein and the housing 5102 may comprise an opaque and/or colored glass-ceramic disclosed herein. The display cover 5112 or other article may be coated, such as with an anti-reflective coating (i.e. reduces reflection in visible), an anti-scratch coating (i.e. improves resistance to scratch), or another coating. The display cover 5112 or other article may include decoration, such as paint or dye. Likewise, the housing 5102, which may comprise glass disclosed herein, may be coated or decorated. The display cover 5112 or housing 5102 may be adhered or otherwise bonded to another part of the device 5100, such as the electronics, such as the display 5110, output, interface, window, etc. According to an aspect, such a glass part disclosed herein is in relatively close proximity to at least some of electrical components of the device, such as within 10 cm of the controller, memory, battery, circuit, wiring, and/or display pixel, such as within 1 cm, within 0.5 cm, 10 mm, and/or adjacent thereto or within direct contact thereof. According to an aspect, the device 5100 comprises materials other than the glass or glass-ceramic, such as metal (e.g., circuitry, encasements, fasteners) and/or plastic and the glass part (including glass-ceramic) disclosed herein is coupled thereto, either directly, such as with an adhesive or fastener for example, or indirectly, such as by way of other elements, such as an intermediate layer, guide, frame, or other feature. According to an aspect, Applicants contemplate the part(s) disclosed herein may be flexed or under a load in such a device 5100 or assembly, where an external force is applied from a different element of the device onto the glass part and the glass or glass-ceramic thereof is at least partially deformed in strain or bending therefrom. According to an aspect, the device 5100 includes an antenna (see generally squat rectangle on side surface 5108 in FIG. 54), a conductive coil, a magnet, wires, a circuit, an electronic speaker and/or receiver (see generally round feature on the top part of front surface 5104 in FIG. 54), a port coupled to the housing 5102 (see generally elongate on front surface 5104), an on/off switch (see generally circle surrounding square rectangle on bottom side surface 5108), a battery, a light source, and/or other elements, where the glass part disclosed herein (e.g., housing 5102 or display cover 5112) may be proximate thereto and provide support therefor, such as protection from an external environment, where the glass part serves as a display cover 5112, a housing 5102, and/or as another element of the device 5100, such as a board of a printed circuit, or an internal partition, or other purposes.

According to an aspect of the present disclosure, prior to ceramming, the glass disclosed herein may be fined during melting and/or during manufacturing, such as with fining agents such as arsenic, antimony oxides, sodium sulfate, redox oxide, and sodium chloride or others as disclosed herein, removing many bubbles therefrom, such that resulting solidified glass is relatively free of blisters (i.e. trapped gas bubbles having a diameter greater than about $\frac{1}{16}$ inch, or >1.5 mm) and seeds (diameter less than about $\frac{1}{16}$ inch, or <1.5 mm). According to an aspect, articles or parts (e.g., cover sheets, containers, windows, display glass sheets)

disclosed herein may have fewer than 100 blisters, such as fewer than 10 blisters, such as fewer than 2 blisters, such as none. Articles or parts disclosed herein may have fewer than 100 seeds having a diameter less than 1.5 mm and greater than 20 µm, such as fewer than 10 such seeds, such as fewer than 2 such seeds, such as none, and/or at least one. However, other aspects of the present disclosure include foamed parts or porous parts that may have many more seeds and blisters. While the glass and/or glass-ceramics disclosed herein may be relatively free of blisters and seeds, Applicants contemplate the glass and/or glass-ceramics may include at least one detectable seed, such as a seed having a diameter of less than 50 µm, such as less than 20 µm but greater than 20 nm, and/or detectable using microscopy for example. Similarly, glasses and glass-ceramics disclosed herein may be melted in a furnace, such as where batch constituents as disclosed above are thoroughly melted and mixed to form the glasses disclosed herein. As such, the glasses and/or glass-ceramics disclosed herein may be free of unmelted batch particles larger than 50 µm in largest cross-sectional dimension (e.g., length, width, height, diameter). However, Applicants contemplate that in some instances, glasses and glass-ceramics as disclosed herein may include at least one unmelted batch particle, such as one having a largest cross-sectional dimension less than 50 µm, such as less than 20 µm and/or greater than 20 nm.

According to an aspect of the present disclosure, a stack of the glass parts disclosed herein may comprise an interleaf material (e.g., paper, polymer) to help partition layers of the parts from one another during shipping and handling. The stack may be housed in a crate comprising a wooden pallet or other frame at least partially surrounding the stack. Parts within the stack may be packaged close to one another, such as within 1 cm of another such part. The stack may comprise at least 2 of the parts, such as at least 10.

Construction and arrangements of the compositions, structures, assemblies, and structures, as shown in the various aspects, are illustrative only. Although only a few examples of the aspects have been described in detail in this disclosure, modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. The order or sequence of any process, logical algorithm, or method steps may be varied or re-sequenced according to alternative embodiments. Other substitutions, modifications, changes and omissions may also be made in the design, operating conditions and arrangement of the various aspects without departing from the scope of the present inventive technology.

Additionally, when a gob is pressed in a close volume (e.g., mold), a pressure field within the volume tends to increase during the pressing process. Under certain conditions, the increasing pressure field may cause the molten glass to infiltrate unintended areas of the pressing system, and irreversibly damage the system. However, mold assemblies disclosed herein can be configured to manage or eliminate pressure fields that may develop during the pressing process. Such management or elimination of pressure fields can help avoid glass infiltration into unintended areas of the pressing system, thereby reducing downtime for maintenance and extending the operational life of the mold assemblies. The glass articles formed from such mold assemblies can have improved dimensional accuracy and low dimensional (shape) variability due to the management or elimination of the pressure fields during the pressing process. Consequently, the present disclosure includes mold assemblies and methods for forming thin, three-dimensional near net shape ("3DNNS") glass articles via gob pressing.

As used herein, the term "semi-closed volume" has a different meaning than the term "closed volume" described in connection with the reference mold assembly 2410 of FIG. 44 (e.g., closed volume 2434). The mold assemblies 6000, 6100, 6200 of FIGS. 60-62 discussed below are configured to reduce the local pressure field therein by connecting at least some local regions of a semi-closed volume 6026 to atmospheric pressure during actuation of a plunger 6020, 6220. In other words, the mold assemblies 6000, 6100, 6200 permit at least some egress of the glass-containing material from the semi-closed volume 6026 to reduce the local pressure field therein.

Figure 60:
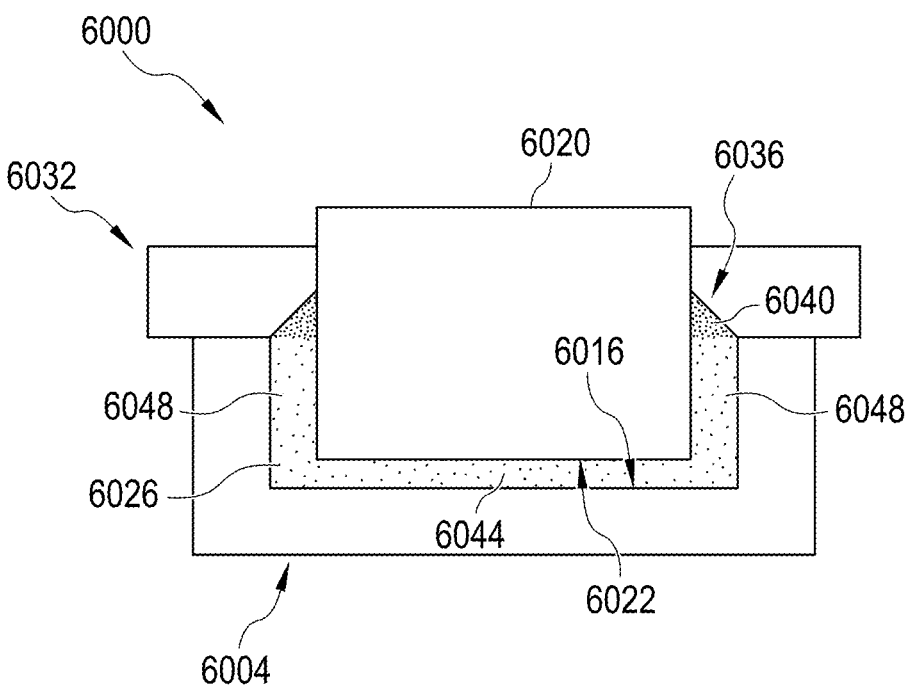
FIG. 60 is a cross-sectional representation of a mold assembly having an overflow region in accordance with aspects.
Figure 61:
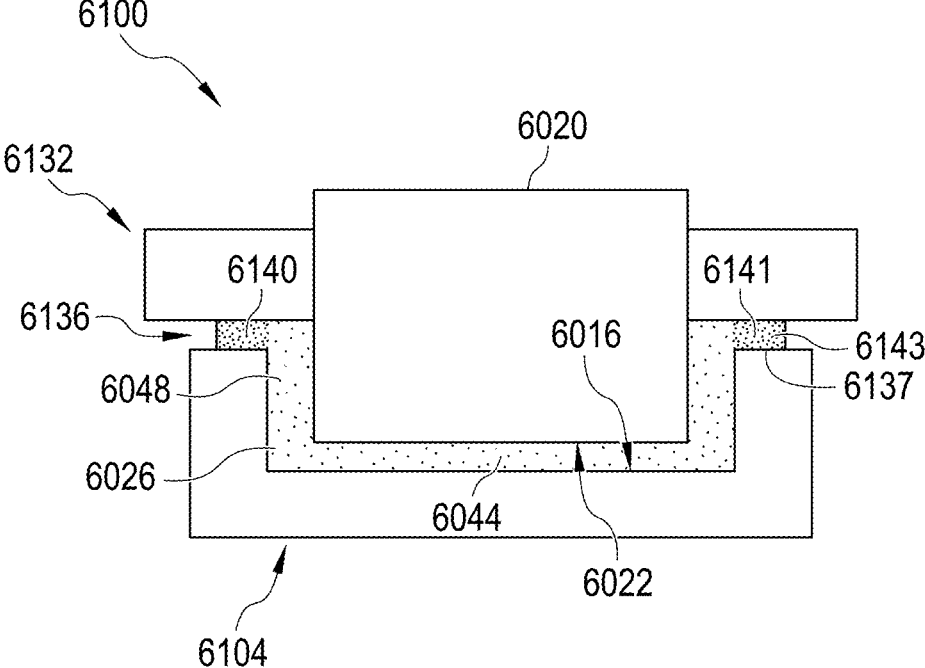
FIG. 61 is a cross-sectional representation of a mold assembly having an overflow region between the ring portion and the side walls in accordance with aspects.
Figure 62:
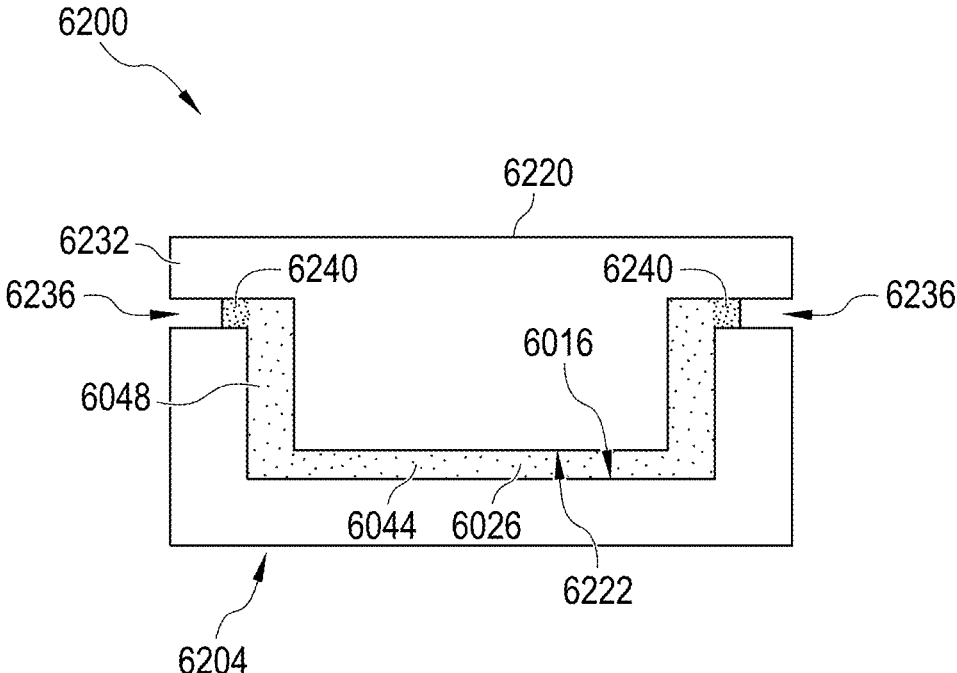
FIG. 62 is a cross-sectional representation of a mold assembly having an overflow region, where the ring portion and the plunger are integral in accordance with aspects.

Referring now to FIGS. 60-62, embodiments of mold assemblies 6000, 6100, 6200 configured to manage or eliminate pressure fields are now described. Each mold assembly 6000, 6100, 6200 includes a mold 6004, 6104, 6204 and a plunger 6020, 6220 positioned generally in the manner described with reference to FIG. 44 except as described otherwise hereinbelow. The mold assemblies 6000, 6100, 6200 further include an overflow region 6036, 6136, 6236 configured to receive an excess portion 6040, 6140, 6240 of the gob when pressed by the plunger 6020, 6220. The mold assemblies 6000, 6100, 6200 can include a ring portion 6032, 6132, 6232 configured to direct the excess portion 6040, 6140, 6240 of the gob into the overflow region 6036, 6136, 6236 when pressed by the plunger 6020, 6220.

In aspects, when the plunger 6020, 6220 reaches (i) the predetermined position relative to the mold 6004, 6104, 6204, and/or (ii) the predetermined pressure on the gob-filled semi-closed volume 6026 (e.g., the glass article or glass part 1210, 1710, 1810 formed therein), the semi-closed volume 6026 (e.g., as defined by the mold surface 6016 and the plunger surfaces 6222) comprises a flat central region 6044 (e.g., corresponding to the flat section 1226, 1726, 1826 of the glass part 1210, 1710, 1810) and a bend region (e.g., corresponding to the bend section 1230, 1730, 1830 of the glass part 1210, 1710, 1810) adjoining a periphery of the central planar region. In the embodiments shown, a low density dotted pattern fill is used to represent the semi-closed volume 6026 filled with the glass-containing material of the gob. As shown, the mold surface 6016, the plunger surface 6022, 6222 and portions of a ring surface adjacent the plunger surface 6022, 6222 define the semi-closed volume 6026 (e.g., depicted using low density dotted pattern fill to represent the semi-closed volume 6026 filled with the glass-containing material of the gob).

As shown in FIGS. 60-62, the overflow region 6036, 6136, 6236 adjoins an end of the bend region 6048 of the corresponding mold assembly 6000, 6100, 6200. As shown in FIGS. 60-62, the flat central region 6044 of the semi-closed volume 6026 of the mold assembly 6000, 6100, 6200 can be oriented substantially normal to an actuation axis (e.g., axis 2438 in FIG. 44) of the plunger 6020, 6220. According to an aspect, the gob is configured to comprise a volume of the glass-containing material that is configured to be greater than the semi-closed volume 6026 (e.g., taking into account variability/tolerance of the gob volume and the semi-closed volume) so that (i) the semi-closed volume is completely filled after pressing with the plunger 6020, 6220 and (ii) there is at least some of the excess portion 6040, 6140, 6240 of the gob disposed in overflow region 6036, 6136, 6236. More generally, in aspects, if the gob volume variability is known to be below a certain predetermined value, the ring portion 6032, 6132, 6332 can be configured with an overflow region 6036, 6136, 6236 that is larger than this gob volume variability to ensure both a correct product manufacturing and no local pressure field increase (e.g., close to the clearance between the plunger 6020 and the ring portion 6032 (if separate, as in FIGS. 60-61)).

In further aspects, as shown in FIGS. 60-61, the mold assemblies 6000, 6100 can have the ring portion 6032, 6132 as a separate part from (e.g., not integral with) the mold 6004, 6104 and the plunger 6020. As shown, the ring portion 6032, 6132 of the mold assembly 6000, 6100 defines a ring opening through which the plunger 6020 moves when actuated towards the mold 6004, 6104. The spacing or clearance between the ring portion 6032, 6132, 332 and the plunger 6020 is configured to allow the plunger to slide freely through ring opening while prevent the glass-containing material of the gob from infiltrating the clearance. In further aspects, although not shown, the contact surfaces between the ring portion 6032, 6132 and the plunger 6020 may include one or more lubricants to ensure the plunger slides freely relative to the ring portion.

In further aspects, as shown in FIG. 60, the ring portion 6032 and the plunger 6020 are configured to define the overflow region 6036. In even further aspects, the overflow region 6036 can comprise one or more discrete overflow regions 6036 positioned at different locations around an outer periphery of the plunger 6020. In even further aspects, the overflow region 6036 can comprise a single, continuous overflow region 6036 that completely encircles the plunger 6020. In further aspects, as shown, the excess portion 6040 can be configured to flow (e.g., be directed) into the overflow region 6036 in a direction parallel to the actuating axis (e.g., axis 2438 of FIG. 44) of the plunger 6020. In further aspects, the overflow region 6036 may not be fluidically connected to atmosphere such that the total volume of the overflow region 6036 can be configured to be greater than the expected volume of the excess portion of the gob to be received therein. For example, as shown in FIG. 60, the excess portion 6040 of the gob (e.g., depicted using high density dotted pattern fill) fills less of the available volume within the overflow region 6036 (space above the excess portion 6040 of the gob).

In further aspects, as shown in FIG. 61, the ring portion 6132 and the mold 6104 are configured to define the overflow region 6136. In even further aspects, as shown, the overflow region 6136 is integrated mainly in the mold 6104 (e.g., having a reduced height of a side wall of the mold on the left side shown in FIG. 61). For example, the overflow region 6136 shown in FIG. 61 may comprise a hole that fluidically connects the semi-closed volume 6026 with atmosphere via the hole. In even further aspects, as indicated by dashed line 2137 in combination with the overflow region 6136, the ring portion 6132 can spaced from the mold 6104 (e.g., the ring portion 6132 may not contact the mold 6104) such that the overflow region 6136 surrounds a periphery of the open cavity of the mold 6104 (by including the volume between dashed line 2137 and the ring portion 6132). In such aspects, the excess portion 6140 is configured to flow out of the semi-closed volume 6026 between opposing surfaces of the ring portion 6132 and the mold 6104 into the overflow region 6136 (including the volume 6141 between dashed line 2137 and the ring portion 6132). Also, the gap (e.g., spacing) between the mold 6104 and the ring portion 6132 (e.g., defining excess portion 6140) can be adjusted to accommodate a predetermined excess volume including a predetermined gob volume variability.

In further aspects, as shown in FIGS. 61-62, where the overflow region 6136, 6236 is integrated mainly in the mold 6104, 6204 and/or in which the ring portion 6132, 6232 is spaced entirely from the mold 6104, 6204, the excess portion 6140, 6240 of the gob is configured to be directed into the overflow region 6136, 6236 in a direction normal to the actuating axis (e.g., axis 2438 of FIG. 44) of the plunger 6020, 6220.

In further aspects, as shown in FIG. 62, the mold assembly 6200 can have the ring portion 6232 is integral with (e.g., not separate from) the plunger 6220 and extends laterally beyond a region corresponding to the flat central portion (e.g., mold surface 6016), where the ring portion 6232 and the mold 6204 are configured to define the overflow region 6236. In further aspects, as shown, the plunger 6220 can be configured such that when the plunger 6220 reaches (i) a predetermined position relative to the mold 6204 and/or (ii) the predetermined pressure on the gob-filled semi-closed volume 6026 (e.g., the glass part 1210, 1710, 1810 formed therein), the overflow region 6236 can comprise one continuous overflow region 6236 that completely encircles the downwardly protruding (e.g., towards the mold 6204) portion of the plunger 6220. In even further aspects, although not shown, the plunger 6220 may have one or more protruding portions that extend from the ring portion 6232 towards the mold 6204 and define a positive stop against the mold 6204 configured to coincide with the predetermined position and/or the predetermined pressure. In such aspects, the overflow region 6236 can comprise one or more discrete overflow regions 6236 positioned at different locations about the downwardly protruding (e.g., towards the mold 6204) portion of the plunger 6220. In even further aspects, the overflow region 6236 can decrease in size (e.g., volume) when the plunger 6220 is actuated towards the mold 6204 since the ring portion 6232 moves with the plunger 6220. In even further aspects, mold assembly 6200 can be insensitive to gob volume variability since glass cannot infiltrate between the ring portion 6232 and the plunger 6220 when these structures are integral. However, in some still further aspects, some additional volume of the gob may be needed to compensate the glass flowing out through the gap between the plunger 6220 and the mold 6204 over the whole periphery thereof. To limit the additional volume that may be needed, the plunger can be further adapted to increase flow restriction to the periphery. In even further aspects, although now shown, the surface of the ring portion 6232 and the surface of the mold 6204 that define the overflow region 6236 may not parallel to one another to form a narrowing of the overflow region 6236 in a direction laterally outward along the direction of gob flow during pressing. The angle of the surfaces can reduce excess glass quantity by approximately 20 g.

In aspects, methods of using one of the mold assemblies 6000, 6100, 6200 can comprise: depositing a gob of a glass-containing material in a molten state into an open cavity of the mold 6004, 6104, 6204; actuating the plunger 6020, 6220 towards the mold 6004, 6104, 6204 and into the cavity to press the gob into a semi-closed volume 6026 having a three-dimensional (3D) shape defined by forming surfaces of the mold and the plunger to form the glass part with the 3D shape; directing an excess portion 6040, 6140, 6240 of the gob into the overflow region 6036, 6136, 6236, during the actuating.

The mold assemblies and methods disclosed herein enable gob pressing of thin glass parts with high force (e.g., several tons) via tooling configurations that allow some glass to flow out of a (normally) closed cavity. The various overflow regions can have different sizes and locations, but the general operating principle is avoidance glass pressure field build up close to the clearance or gap between the plunger and the ring portion. When the clearance is maintained (e.g., the ring portion is configured to be separate from the plunger), overflow regions can be obtained by one or more of: limiting the ring portion stroke and allowing a gap between the ring portion and the mold; modifying the ring portion so that when it is in contact with the mold, there are at least some passages or holes present to allow some glass to leave the semi-closed volume; and modifying the mold so that even if the ring portion is in contact with the mold, there are at least some passages or holes present to allow some glass to leave the semi-closed volume. Limiting glass infiltration by any one of the aforementioned configurations limits the tooling damage and limits the propagation of cracks on the gob pressed glass article. Thus, providing better tooling durability, product quality, and product yield.

Figure 51:
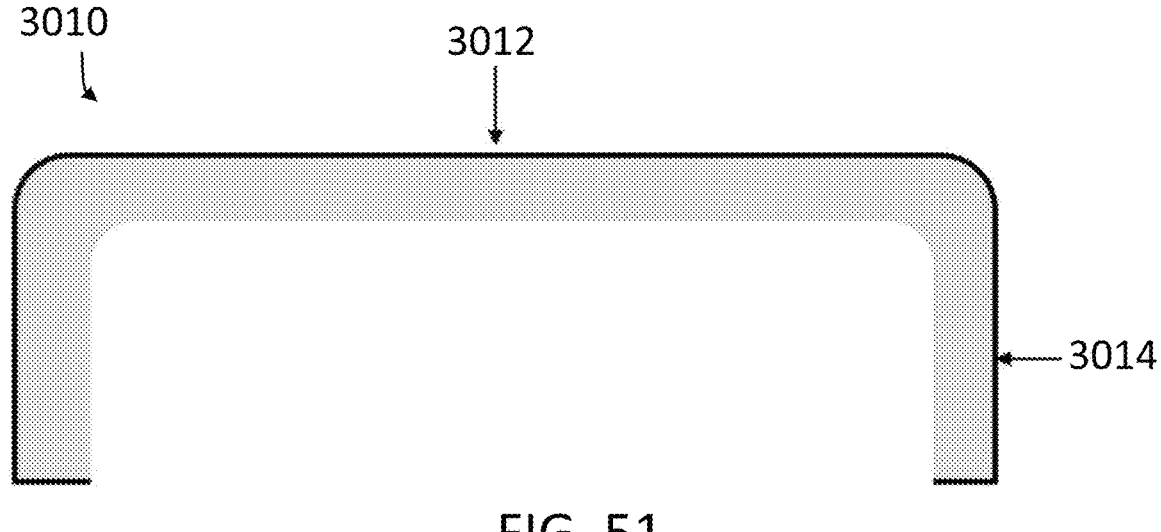
FIG. 51 is a side cross-sectional view of a part similar to the part of FIG. 50.
Figure 52:
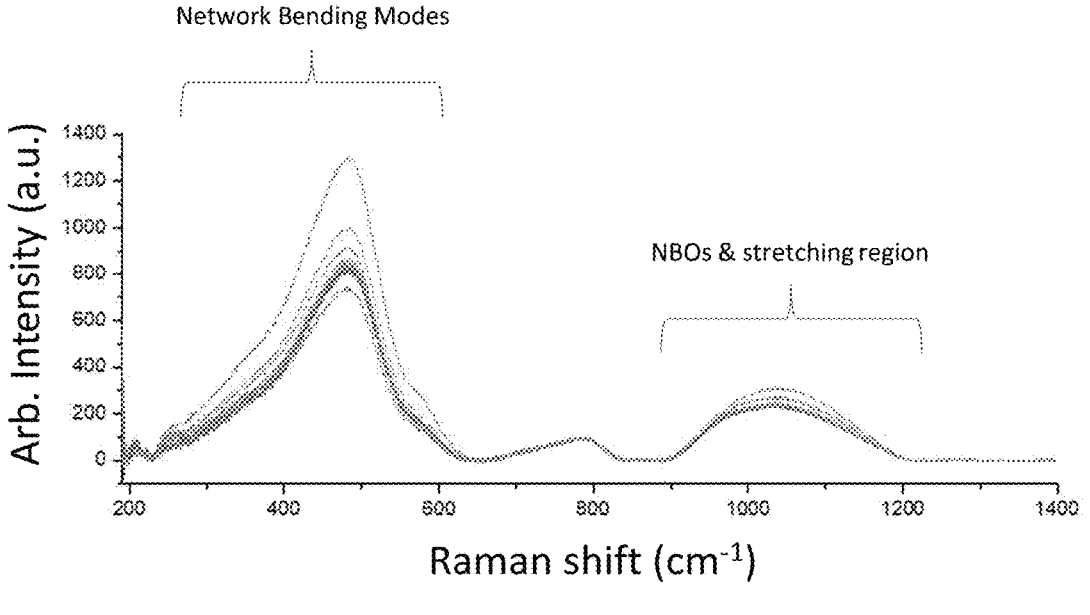
FIG. 52 is a plot of Raman spectra for otherwise similar glass parts made by different methods.

Additional aspects of glass parts producing using methods of the present disclosure will now be discussed with reference to the Raman spectra, calculated differences, and integrals thereof and FIGS. 55-59. These figures compare Examples 11-12, 21-22, and AA-BB. These examples (Examples 11-12, 21-22, and AA-BB) had a thickness of 1.5 mm between opposing major surfaces and had a three-dimensional shape (see schematic in FIG. 51 showing a part 3010 having a major surface 3013 and side walls 3014) with the same nominal composition and were chemically strengthened by an identical method comprising immersing each sample in a molten salt bath of potassium nitrate maintained at 460° C. for 6.5 hours. Examples 11-12 and 21-22 were formed by gob-pressing in accordance with aspects of the disclosure. Examples 11-12 had a higher density (associated with lower pressing force) than Examples 21-22. Examples AA-BB were machined from a sheet (not made using gob-pressing). Examples 11 and 12 were manufactured identically; Examples 21 and 22 were manufactured identically; and Examples AA and BB were manufactured identically. After being chemically strengthened, Examples 11-12 had a central tension of about 45 MPa, Examples 21-22 had a central tension of about 40 MPa, and Examples AA-BB had a central tension of about 40 MPa.

Figure 55:
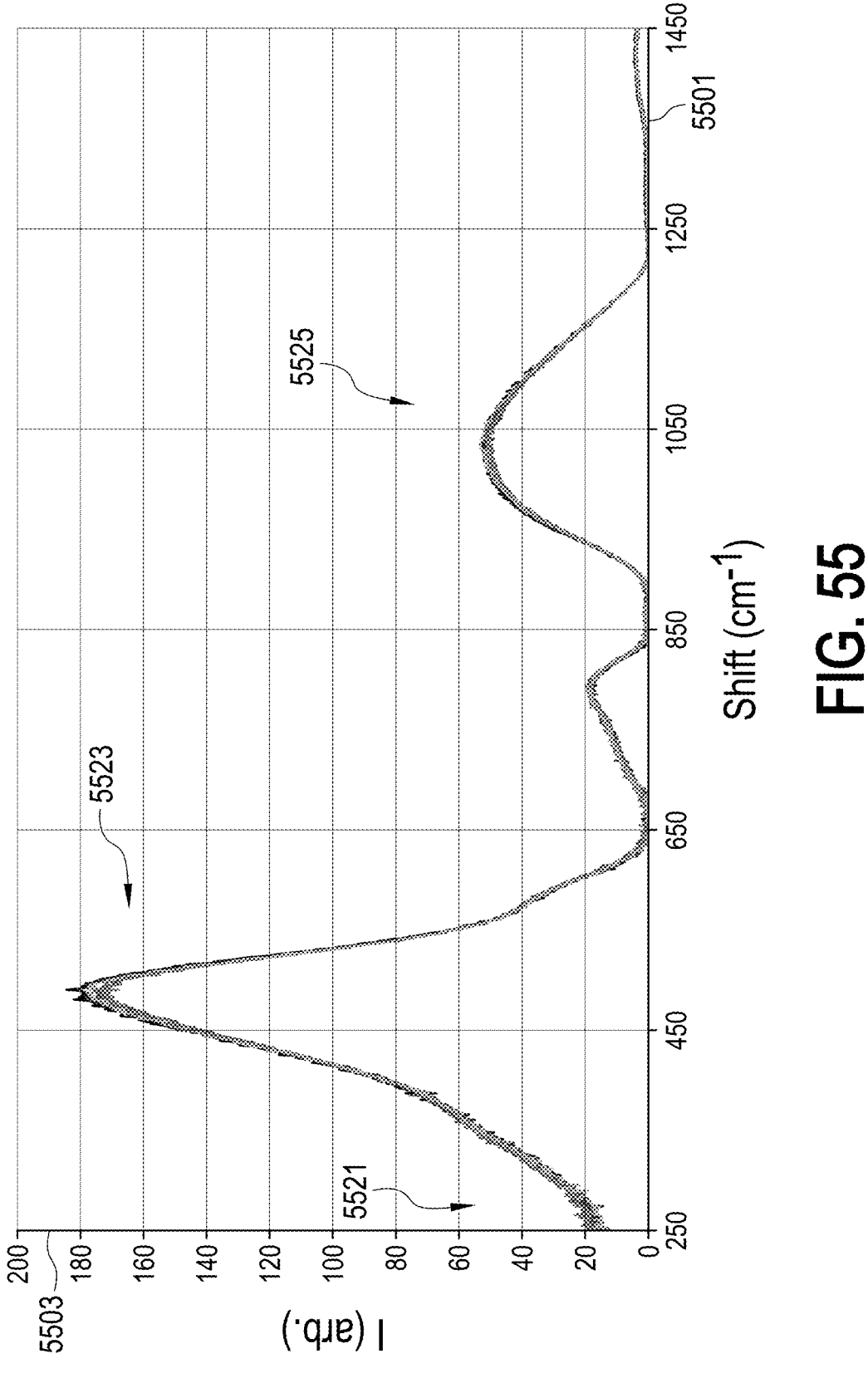
FIG. 55 is a plot of Raman spectra measured at a central location on a first major surface of otherwise similar glass parts made by different methods.

FIG. 55 presents Raman spectra measured at the middle (e.g., center of geometry) of the first major surface for Examples 11-12, 21-22, and AA-BB, where the detected intensity is presented on the vertical axis 5503 (i.e., y-axis) as a function of the shift in wavenumber ($cm^{-1}$) on the horizontal axis 5501 (i.e., x-axis). The first major surface was substantially planar; so, these measurements were taken at areas with no discernable curvature. All of these spectra have similar shape, as indicated by common curve 5521, which has noticeable intensity associated with network bending modes 5523 from 250-600 $cm^{-1}$ as well as non-bridging oxygens and stretching modes 5525 from 900-1200 $cm^{-1}$. Due to minimal processing at the measured location, it is not surprising that the same glass composition produces similar Raman spectra when processing effects are not pronounced. However, as discussed below, noticeable and significant differences between the parts can be determined at locations where machining is more pronounced (for Examples AA-BB) and/or differential cooling may have occurred due to glass flow and/or differential thickness during gob-pressing (for Examples 11-12 and/or 21-22).

FIGS. 56-67 present differences between Raman spectra measured at different locations on the same part, where the difference (Δ) is shown on the vertical axis 5603, 5703 (i.e., y-axis) as a function of the Raman shift (shift) in wavenumber (cm$^{-1}$) on the horizontal axis 5601, 5701 (i.e., x-axis). Curves 5605 and 5705 correspond to Example 11; curves 5607 and 5707 correspond to Example 12; curves 5609 and 5709 correspond to Example 21; curves 5611 and 5711 correspond to Example 22; curves 5613 and 5713 correspond to Example AA; and curves 5615 and 5715 correspond to Example BB.

Figure 57:
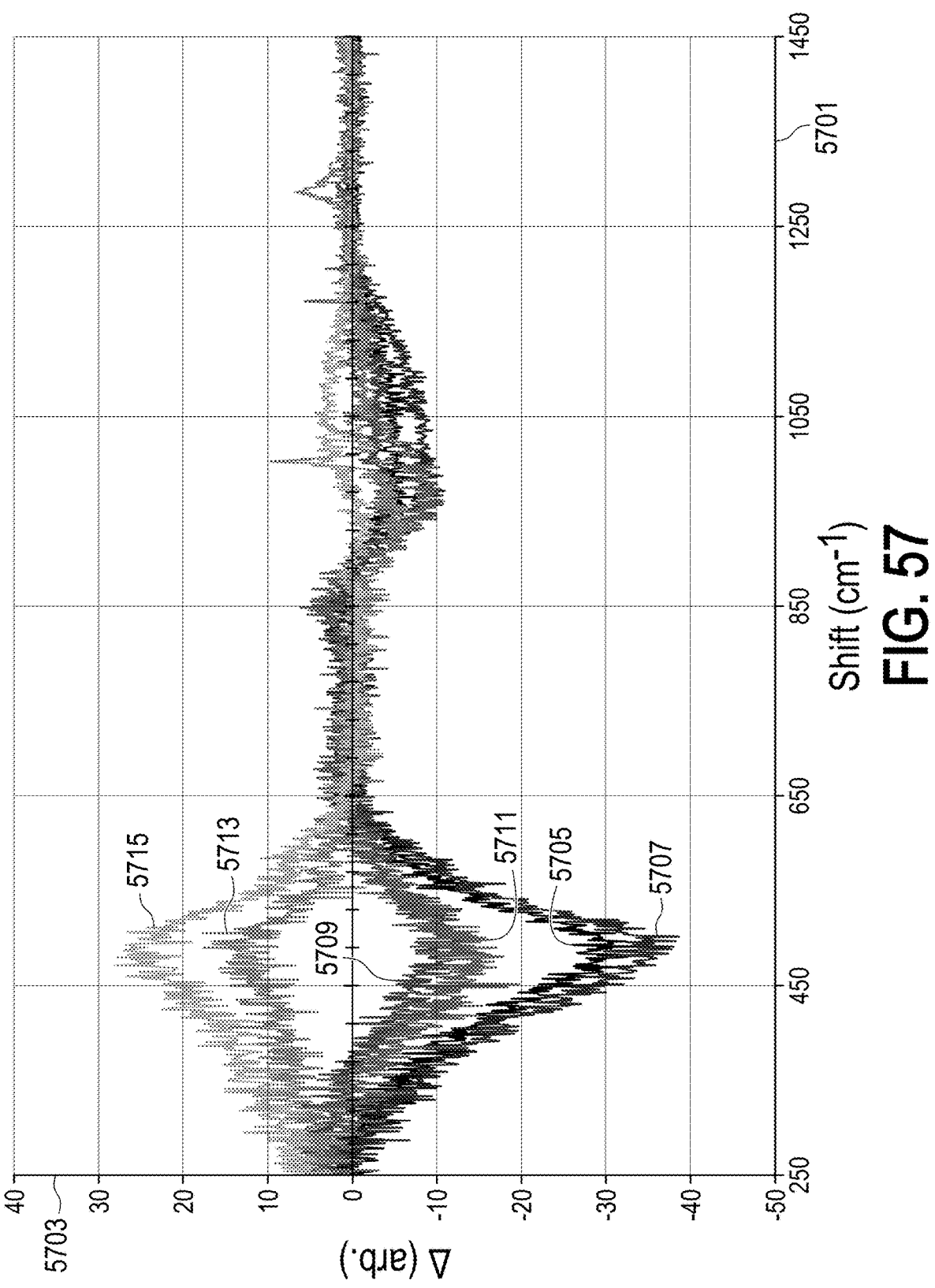
FIG. 57 is a plot showing differences in Raman spectra between measurements at a corner having convex curvature of the glass part and at the central location on the first major surf of the same glass part, where differences are shown for parts made by different methods.

FIG. 57 presents a difference in Raman spectra between the Raman spectrum measured at the edge of the part (e.g., second location—convex corner, location of maximum convex curvature, between the first major surface 3012 and the side wall 3014—top right and/or top left of FIG. 51) and the Raman spectrum measured at the center (e.g., center of geometry) of the first major surface (e.g., first location—center of the first major surface 3012 shown in FIG. 51). As used herein, a difference between measurements at a second location and a first location means the value at the second location minus the value at the first location—R(1)–R(2). As shown in FIG. 57, Examples 11-12 (curves 5705 and 5707) and 21-22 (curves 5709 and 5911) have negative differences for 250-600 cm$^{-1}$ (e.g., network bending modes) as well as 900-1200 cm$^{-1}$ (e.g., non-bridging oxygens and stretching modes) while AA-BB (curves 5713 and 5715) show positive differences in those regions. Consequently, measurements at the corner of the part can distinguish between the gob-pressed parts and the machined parts (based on sign of the deviations alone). In aspects, the difference in Raman spectra at the edge of the part and the center of the first major surface of the part can be negative in the region from 250-600 cm$^{-1}$ (e.g., network bending modes).

Figure 56:
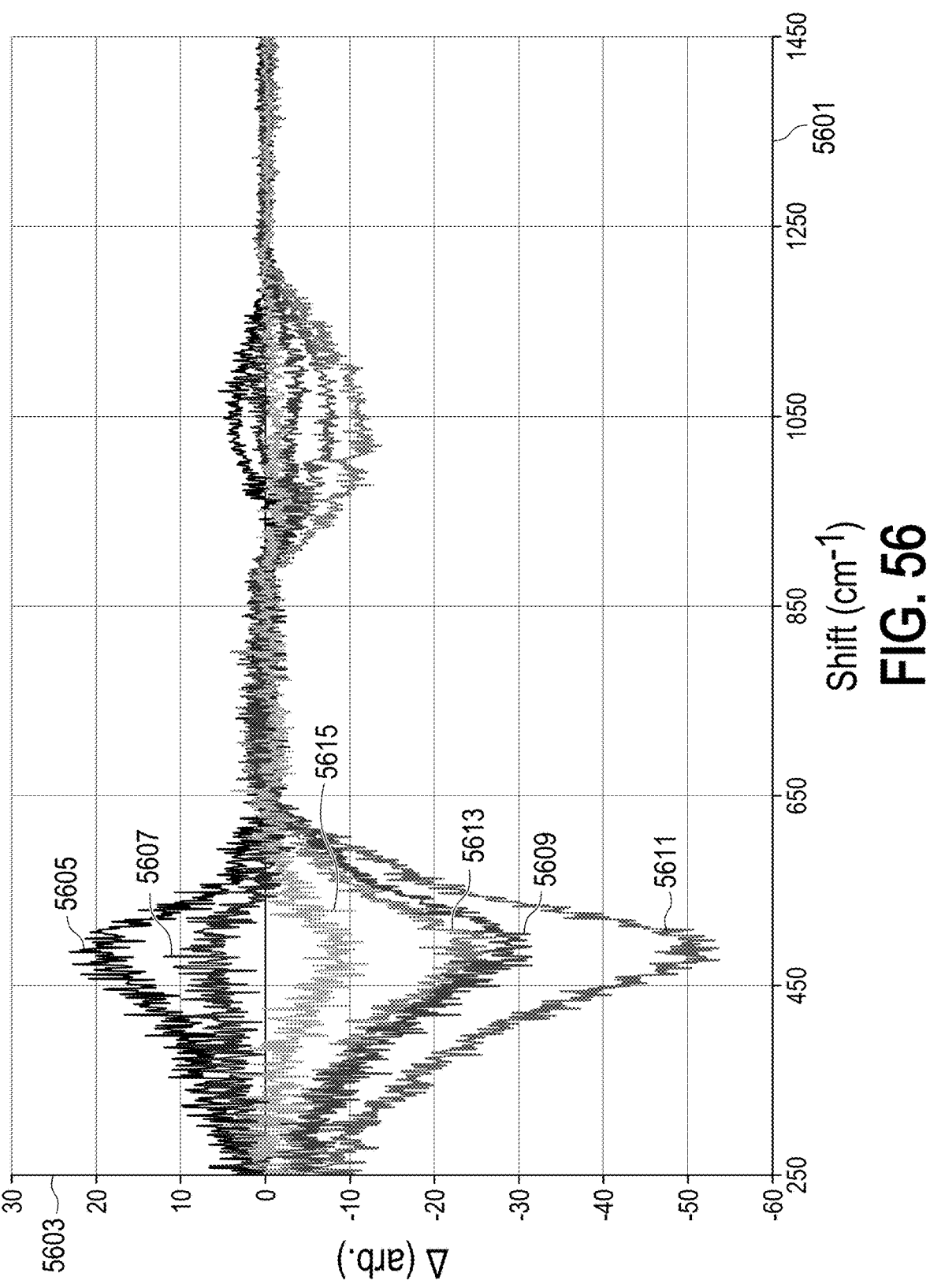
FIG. 56 is a plot showing differences in Raman spectra between measurements at an edge of the glass part and at the central location on the first major surf of the same glass part, where differences are shown for parts made by different methods.

FIG. 56 presents a difference in Raman spectra between the Raman spectrum measured at the edge of the part (e.g., third location—outer peripheral portion of the side wall 3014—bottom right and/or bottom left of FIG. 51) and the Raman spectrum measured at the center (e.g., center of geometry) of the first major surface (e.g., first location—center of the first major surface 3012 shown in FIG. 51). As shown in FIG. 56, Examples 11-12 (curves 5605 and 5607) have positive differences for 250-600 cm$^{-1}$ (e.g., network bending modes) as well as 900-1200 cm$^{-1}$ (e.g., non-bridging oxygens and stretching modes) while Examples 21-22 (curves 5609 and 5611) and AA-BB (curves 5613 and 5615) show negative difference in those regions. Consequently, measurements at the edge of the part can distinguish between the high density gob-pressed parts and the lower density gob-pressed parts (as well as machined parts)—based on sign of the deviations alone. In aspects, the difference in Raman spectra at the edge of the part and the center of the first major surface of the part can be positive in the region(s) from 250-600 cm$^{-1}$ (e.g., network bending modes) and/or 900-1200 cm$^{-1}$ (e.g., non-bridging oxygens and stretching modes).

To more quantitatively characterize aspects of the spectral differences, the spectral differences (FIGS. 56-57) can be normalized by the maximum absolute value of the corresponding spectrum from 250-1650 cm$^{-1}$ to produce a scaled spectral difference S(x)

$$\left(\text{i.e., } S(x) = \frac{R2(x) - R1(x)}{\max(|R2(a) - R1(a)|)}\right).$$

The spectral difference accounts for differences in the base composition of the part and calibration offsets in the measurement. Further, normalizing (e.g., scaling) the spectral difference accounts for differences in sensitivity of instrumentation. As such, it is believed that the scaled spectral differences (and the integrals discussed herein) are transferable (i.e., broadly applicable) to distinguish between (a) gob-pressed parts versus machined parts and/or (a) high-density gob-pressed parts versus machined or low-density gob-pressed parts. FIGS. 58-69 present scaled spectral differences between Raman spectra measured at different locations on the same part, where the scaled spectral difference (ΔS) is shown on the vertical axis 5803, 5903 (i.e., y-axis) as a function of the Raman shift (shift) in wavenumber (cm$^{-1}$) on the horizontal axis 5801, 5901 (i.e., x-axis). Curves 5805 and 5905 correspond to Example 11; curves 5807 and 5907 correspond to Example 12; curves 5809 and 5909 correspond to Example 21; curves 5811 and 5911 correspond to Example 22; curves 5813 and 5913 correspond to Example AA; and curves 5815 and 5915 correspond to Example BB.

Table 1 presents integrals calculated using various scaled spectral differences. As used with reference to Table 1, the scaled spectral difference of the "Corner" refers to the normalized difference between the Raman spectrum R2(x) at the corner (second location—convex corner between the first major surface and side wall) and the Raman spectrum R1(x) at the center of the first major surface, where the spectral difference is scaled by the maximum absolute value of the corresponding spectral difference from 250-1650 cm$^{-1}$. This scaled spectral difference is then integrated from either 300 cm$^{-1}$ to 500 cm$^{-1}$ or 1000 cm$^{-1}$ to 1200 cm$^{-1}$:

$$\int_{300\,cm^{-1}}^{500\,cm^{-1}} \frac{R2(x) - R1(x)}{\max(|R2(a) - R1(a)|)} dx$$

$$\int_{1000\,cm^{-1}}^{1200\,cm^{-1}} \frac{R2(x) - R1(x)}{\max(|R2(a) - R1(a)|)} dx$$

Likewise, the scaled spectral difference of the "edge" refers to normalized difference between the Raman spectrum R3(x) at the edge (e.g., third location—outer periphery of the side wall) and the Raman spectrum R1(x) at the center of the first major surface, where the spectral difference is scaled by the maximum absolute value of the corresponding spectral difference from 250-1650 cm$^{-1}$. This scaled spectral difference is then integrated from either 300 cm$^{-1}$ to 500 cm$^{-1}$ or 1000 cm$^{-1}$ to 1200 cm$^{-1}$:

$$\int_{300\,cm^{-1}}^{500\,cm^{-1}} \frac{R3(x) - R1(x)}{\max(|R3(a) - R1(a)|)} dx$$

$$\int_{1000\,cm^{-1}}^{1200\,cm^{-1}} \frac{R3(x) - R1(x)}{\max(|R3(a) - R1(a)|)} dx$$

TABLE 1

| Integrals of Scaled Spectral Differences for Examples 11-12, 21-22, and AA-BB | | | | | |
| Scaled Spectral Diff./Example | 11 | 12 | 21 | 22 | AA | BB |
|---|---|---|---|---|---|---|
| Corner (300 cm$^{-1}$ to 500 cm$^{-1}$) | −111.4 | −118.4 | −79.7 | −88.8 | 107.3 | 128.9 |
| Corner (1000 cm$^{-1}$ to 1200 cm$^{-1}$) | −18.1 | −27.8 | −25.3 | −12.5 | −8.8 | 13.8 |
| Edge (300 cm$^{-1}$ to 500 cm$^{-1}$) | 110.6 | 80.8 | −126.9 | −130.2 | −120.6 | −85.0 |
| Edge (1000 cm$^{-1}$ to 1200 cm$^{-1}$) | 17.9 | 3.8 | −15.8 | −19.1 | −55.0 | −12.3 |

Figure 59:
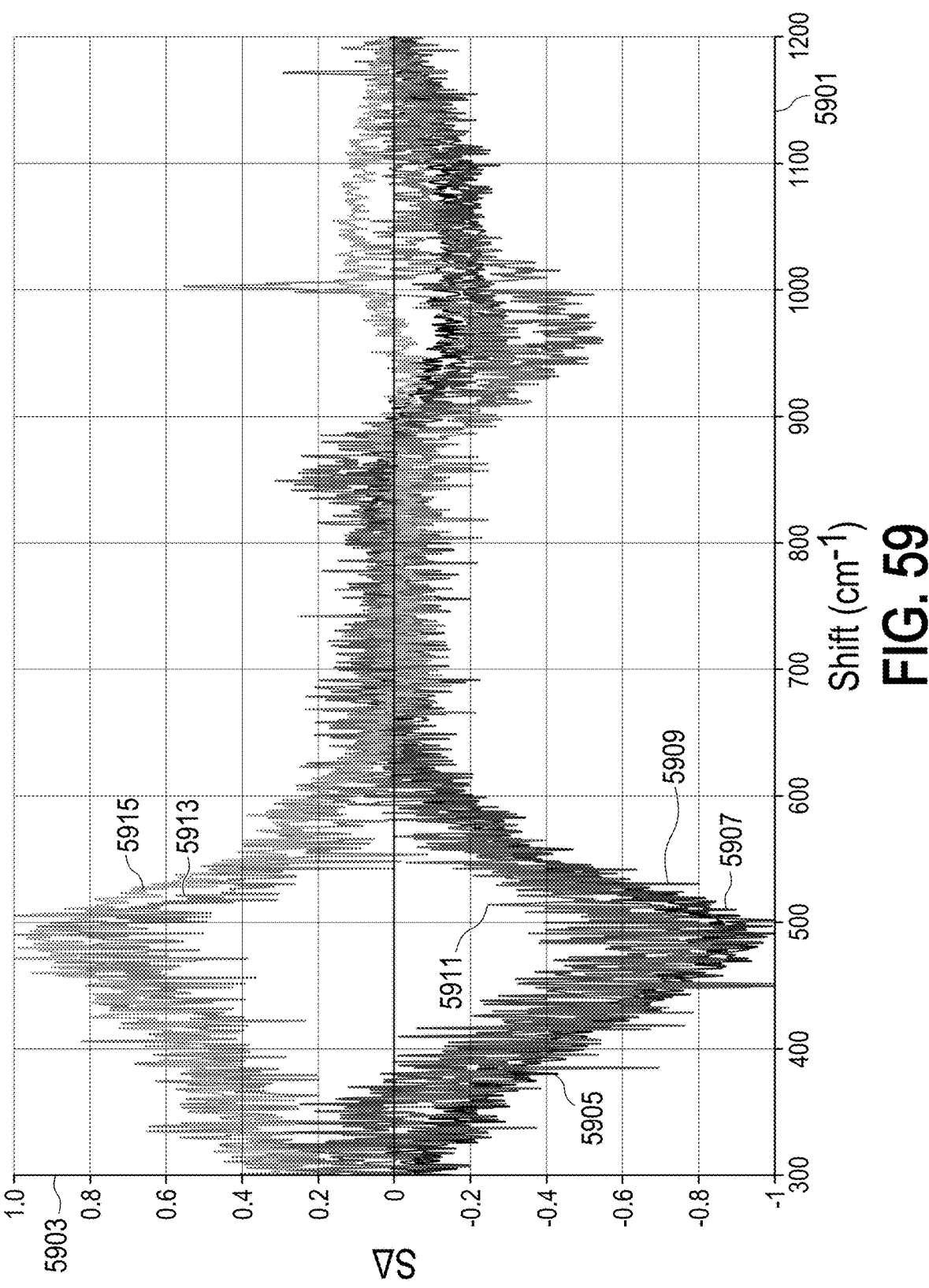
FIG. 59 is a plot showing scaled differences in Raman spectra corresponding to the difference curves in FIG. 57, where each difference curve is scaled so the maximum absolute value is 1.

FIG. 59 presents a scaled spectral difference in Raman spectra between a second Raman spectrum R2(x) measured at an outer corner of the part (e.g., second location—convex corner between the first major surface 3012 and the side wall 3014—top right and/or top left of FIG. 51) and a first Raman spectrum R1(x) measured at the center (e.g., center of geometry) of the first major surface (e.g., first location—center of the first major surface 3012 shown in FIG. 51), where the spectral difference is divided by (i.e., normalized, scaled) by the maximum spectral difference from 250-1650 cm$^{-1}$. For differences associated with the network bending modes, an integral of this scaled spectral difference from 300 cm$^{-1}$ to 500 cm$^{-1}$ $$\left( \text{i.e., } \int_{300\,cm^{-1}}^{500\,cm^{-1}} \frac{R2(x) - R1(x)}{\max(|R3(a) - R1(a)|)} dx \right)$$

can be less than or equal to −70 cm$^{-1}$, less than or equal to −80 cm$^{-1}$, less than or equal to −90 cm$^{-1}$, less than or equal to −100 cm$^{-1}$, less than or equal to −105 cm$^{-1}$, −110 cm$^{-1}$, greater than or equal to −200 cm$^{-1}$, greater than or equal to −180 cm$^{-1}$, greater than or equal to −160 cm$^{-1}$, greater than or equal to −140 cm$^{-1}$, greater than or equal to −130 cm$^{-1}$, greater than or equal to −125 cm$^{-1}$, and/or greater than or equal to −120 cm$^{-1}$. In aspects, the integral (of this scaled spectral difference from 300 cm$^{-1}$ to 500 cm$^{-1}$) can be in a range from greater than or equal to −200 cm$^{-1}$ to less than or equal to −70 cm$^{-1}$, from greater than or equal to −180 cm$^{-1}$ to less than or equal to −80 cm$^{-1}$, from greater than or equal to −160 cm$^{-1}$ to less than or equal to −90 cm$^{-1}$, from greater than or equal to −140 cm$^{-1}$ to less than or equal to −100 cm$^{-1}$, from greater than or equal to −130 cm$^{-1}$ to less than or equal to −105 cm$^{-1}$, from greater than or equal to −125 cm$^{-1}$ to less than or equal to −110 cm$^{-1}$, from greater than or equal to −120 cm$^{-1}$ to less than or equal to −110 cm$^{-1}$, or any range or subrange therebetween. For example, as shown in Table 1, Examples 11-12 and 21-22 have a corresponding integral value less than −70 cm$^{-1}$ (e.g., from −160 cm$^{-1}$ to −100 cm$^{-1}$ for Examples 11-12) while Examples AA-BB have an integral value greater than 0 cm$^{-1}$ (e.g., from 100 cm$^{-1}$ to 130 cm$^{-1}$). Likewise, Examples 11-12 have a corresponding integral value less than −90 cm$^{-1}$ (or −100 cm$^{-1}$) while Examples 21-22 (and AA-BB) have integral values greater than −90 cm$^{-1}$.

Likewise, differences associated with the non-bridging oxygens and/or stretching modes (for the difference between the corner and the center of the first major surface) can be quantified using an integral of this scaled spectral difference (between the third location at the edge and the first location at the center of the first major surface) from 1000 cm$^{-1}$ to 1200 cm$^{-1}$ $$\left( \text{i.e., } \int_{1000\,cm^{-1}}^{1200\,cm^{-1}} \frac{R2(x) - R1(x)}{\max(|R2(a) - R1(a)|)} dx \right),$$

which can be less than or equal to −10 cm$^{-1}$, less than or equal to −12 cm$^{-1}$, less than or equal to −15 cm$^{-1}$, less than or equal to −17 cm$^{-1}$, greater than or equal to −100 cm$^{-1}$, greater than or equal to −50 cm$^{-1}$, greater than or equal to −40 cm$^{-1}$, and/or greater than or equal to −35 cm$^{-1}$. In aspects, this integral (of this scaled spectral difference from 1000 cm$^{-1}$ to 1200 cm$^{-1}$) can be in a range from greater than or equal to −100 cm$^{-1}$ to less than or equal to −10 cm$^{-1}$, from greater than or equal to −50 cm$^{-1}$ to less than or equal to −12 cm$^{-1}$, from greater than or equal to −40 cm$^{-1}$ to less than or equal to −15 cm$^{-1}$, from greater than or equal to −35 cm$^{-1}$ to less than or equal to −17 cm$^{-1}$, or any range or subrange therebetween. For example, as shown in Table 1, Examples 11-12 and 21-22 have values of the corresponding integral that is less than or equal to −10 cm$^{-1}$ (e.g., from −10 cm$^{-1}$ to −30 cm$^{-1}$) while Examples AA-BB are greater than −10 cm$^{-1}$.

Figure 58:
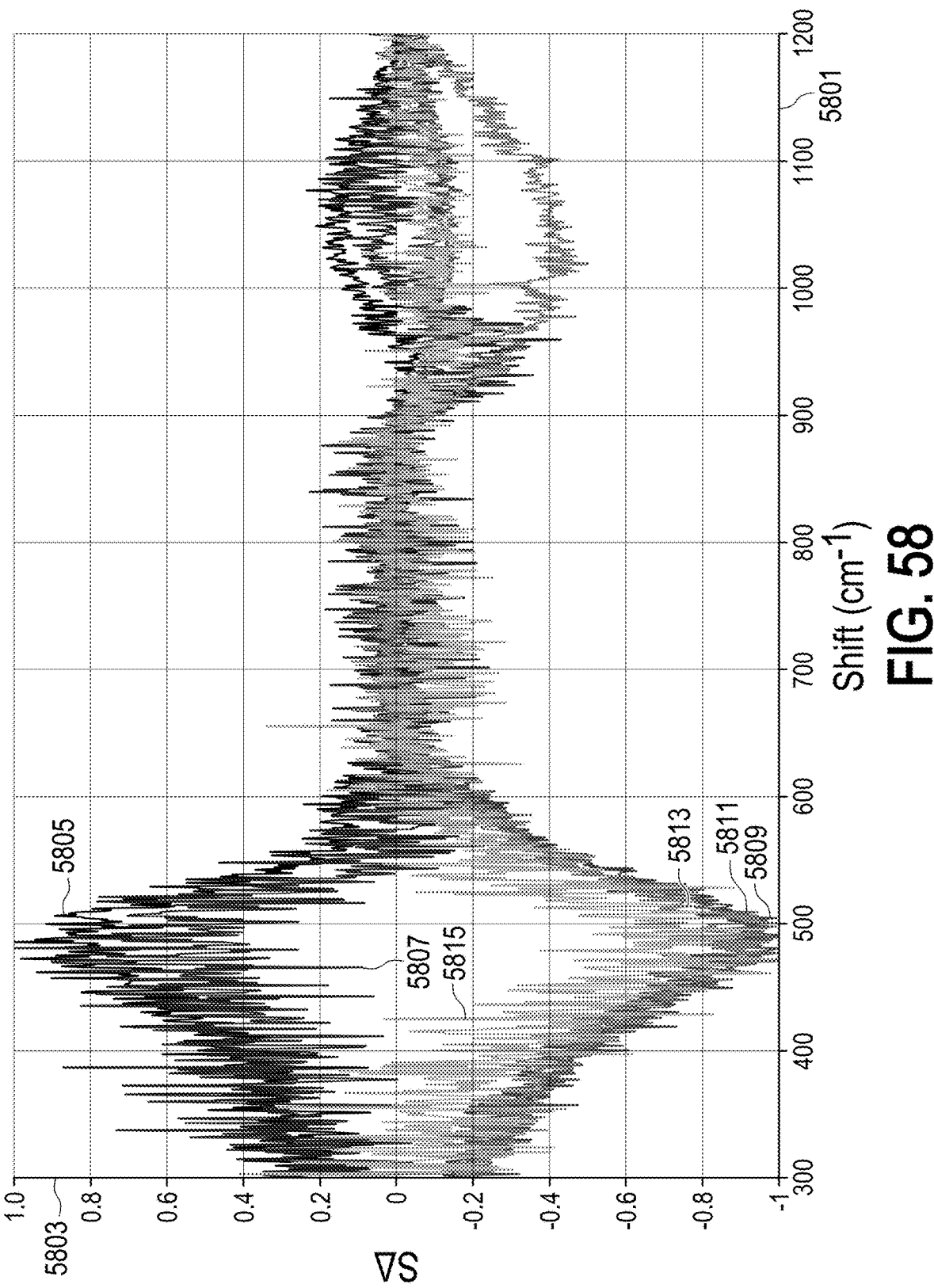
FIG. 58 is a plot showing scaled differences in Raman spectra corresponding to the difference curves in FIG. 56, where each difference curve is scaled so the maximum absolute value is 1.

FIG. 58 presents a scaled spectral difference in Raman spectra between a third Raman spectrum R3(x) measured at the edge of the part (e.g., third location—outer peripheral portion of the side wall 3014—bottom right and/or bottom left of FIG. 51) and a first Raman spectrum R1(x) measured at the center (e.g., center of geometry) of the first major surface (e.g., first location—center of the first major surface 3012 shown in FIG. 51), where the spectral difference is divided by (i.e., normalized, scaled) by the maximum spectral difference from 250-1650 cm$^{-1}$. For differences associated with the network bending modes, an integral of this scaled spectral difference from 300 cm$^{-1}$ to 500 cm$^{-1}$ $$\left( \text{i.e., } \int_{300\,cm^{-1}}^{500\,cm^{-1}} \frac{R3(x) - R1(x)}{\max(|R3(a) - R1(a)|)} dx \right)$$

can be greater than or equal to 0 cm$^{-1}$, greater than or equal to 30 cm$^{-1}$, greater than or equal to 50 cm$^{-1}$, greater than or equal to 60 cm$^{-1}$, greater than or equal to 70 cm$^{-1}$, greater than or equal to 75 cm$^{-1}$, greater than or equal to 80 cm$^{-1}$, less than or equal to 200 cm$^{-1}$, less than or equal to 150 cm$^{-1}$, less than or equal to 140 cm$^{-1}$, less than or equal to 130 cm$^{-1}$, less than or equal to 120 cm$^{-1}$, and/or less than or equal to 115 cm$^{-1}$. In aspects, the integral (of this scaled spectral difference from 300 cm$^{-1}$ to 500 cm$^{-1}$) can be in a range from greater than or equal to 0 cm$^{-1}$ to less than or equal to 200 cm$^{-1}$, from greater than or equal to 30 cm$^{-1}$ to less than or equal to 150 cm$^{-1}$, from greater than or equal to 50 cm$^{-1}$ to less than or equal to 140 cm$^{-1}$, from greater than or equal to 60 cm$^{-1}$ to less than or equal to 130 cm$^{-1}$, from greater than or equal to 70 cm$^{-1}$ to less than or equal to 125 cm$^{-1}$, from greater than or equal to 75 cm$^{-1}$ to less than or equal to 125 cm⁻¹, or any range or subrange therebetween. For example, as shown in Table 1, Examples 11-12 have a corresponding integral value greater than 0 cm⁻¹ and greater than 70 cm⁻¹ (e.g., from 80 cm⁻¹ to −120 cm⁻¹ for Examples 11-12) while Examples 21-22 and AA-BB have an integral value less than 0 cm⁻¹ (e.g., from −80 cm⁻¹ to −140 cm⁻¹).

Likewise, differences associated with the non-bridging oxygens and/or stretching modes (for the difference between the edge of the part and the center of the first major surface) can be quantified using an integral of this scaled spectral difference (between the third location at the edge and the first location at the center of the first major surface) from 1000 cm⁻¹ to 1200 cm⁻¹

$$\left( \text{i.e., } \int_{1000\,cm^{-1}}^{1200\,cm^{-1}} \frac{R3(x) - R1(x)}{\max(|R2(a) - R1(a)|)} dx \right).$$

which can be greater than or equal to 0 cm⁻¹, greater than or equal to 1.0 cm⁻¹, greater than or equal to 2.0 cm⁻¹, greater than or equal to 3.0 cm⁻¹, greater than or equal to 3.5 cm⁻¹, less than or equal to 100 cm⁻¹, less than or equal to 50 cm⁻¹, less than or equal to 30 cm⁻¹, and/or less than or equal to 20 cm⁻¹. In aspects, this integral (of this scaled spectral difference from 1000 cm⁻¹ to 1200 cm⁻¹) can be in a range from greater than or equal to 0 cm⁻¹ to less than or equal to 100 cm⁻¹, from greater than or equal to 1.0 cm⁻¹ to less than or equal to 50 cm⁻¹, from greater than or equal to 2.0 cm⁻¹ to less than or equal to 30 cm⁻¹, from greater than or equal to 3.0 cm⁻¹ to less than or equal to 30 cm⁻¹, from greater than or equal to 3.5 cm⁻¹ to less than or equal to 25 cm⁻¹, or any range or subrange therebetween. For example, as shown in Table 1, Examples 11-12 and 21-22 have values of the corresponding integral that is greater than or equal to 0 cm⁻¹ (e.g., from −1.0 cm⁻¹ to −30 cm⁻¹) while Examples 21-22 and AA-BB are less than −10 cm⁻¹.

Some example aspects of the disclosure are described below with the understanding that any of the features of the various aspects may be used alone or in combination with one another.

Aspect 1. A glass part comprising:
a first location on a first major surface having a minimum local radius of curvature; and
a second location having a maximum local convex radius of curvature,
wherein a first integral of a ratio of a quantity of a difference in Raman spectra of a second Raman spectrum at the second location (R2) minus a first Raman spectrum at the first location (R1) divided by a first scaling factor over wavenumbers from 300 cm⁻¹ to 500 cm⁻¹

$$\int_{300\,cm^{-1}}^{500\,cm^{-1}} \frac{R2(x) - R1(x)}{\max(|R2(a) - R1(a)|)} dx$$

is less than or equal to −70 cm⁻¹, where the first scaling factor max(|R2(a)−R1(a)|) is a maximum value of an absolute value between R2 and R1 at the same wavenumber a between 250 cm⁻¹ and 1600 cm⁻¹.

Aspect 2. The glass part of aspect 1, wherein the first integral is from greater than or equal to −160 cm⁻¹ to less than or equal to −100 cm⁻¹.

Aspect 3. The glass part of any one of aspects 1-2, wherein a second integral of the ratio of the quantity of the difference in Raman spectra of the second Raman spectrum at the second location (R2) minus the first Raman spectrum at the first location (R1) divided by the first scaling factor over wavenumbers from 1000 cm⁻¹ to 1200 cm⁻¹

$$\int_{1000\,cm^{-1}}^{1200\,cm^{-1}} \frac{R2(x) - R1(x)}{\max(|R2(a) - R1(a)|)} dx$$

is less than or equal to −10 cm⁻¹.

Aspect 4. The glass part of aspect 3, wherein the second integral is from greater than or equal to −50 cm⁻¹ to less than or equal to −15 cm⁻¹.

Aspect 5. The glass part of any one of aspects 1-4, further comprising a third location corresponds to an edge of the glass part that is closer to the second location than the first location, wherein a third integral of a ratio of a quantity of a difference in Raman spectra of a third Raman spectrum at the third location (R3) minus a first Raman spectrum at the first location (R1) divided by a third scaling factor over wavenumbers from 300 cm⁻¹ to 500 cm⁻¹

$$\int_{300\,cm^{-1}}^{500\,cm^{-1}} \frac{R3(x) - R1(x)}{\max(|R3(a) - R1(a)|)} dx$$

is greater than or equal to 30 cm⁻¹, where the third scaling factor max(|R3(a)−R1(a)|) is a maximum value of an absolute value between R3 and R1 at the same wavenumber a between 250 cm⁻¹ and 1600 cm⁻¹.

Aspect 6. The glass part of aspect 5, wherein the third integral is from greater than or equal to 70 cm⁻¹ to less than or equal to 150 cm⁻¹.

Aspect 7. The glass part of aspect 6, wherein a second integral of the ratio of the quantity of the difference in Raman spectra of the second Raman spectrum at the second location (R3) minus the first Raman spectrum at the first location (R1) divided by the first scaling factor over wavenumbers from 1000 cm⁻¹ to 1200 cm⁻¹

$$\int_{1000\,cm^{-1}}^{1200\,cm^{-1}} \frac{R3(x) - R1(x)}{\max(|R3(a) - R1(a)|)} dx$$

is from greater than or equal to 1.0 cm⁻¹ to less than or equal to 30 cm⁻¹.

Aspect 8. The glass part of any one of aspects 5-7, wherein the glass part comprises a side wall, the side wall is positioned on a periphery of the part, the side wall extends at least 2 mm normal to at least a portion of the first major surface, and the third location is located at an outer periphery of the side wall.

Aspect 9. The glass part of aspect 8, wherein the side wall extends around a corner of the part, the corner is at least 1 cm from the geometric centroid, and the second location is positioned on the corner.

Aspect 10. The glass part of any one of aspects 1-9, wherein:
the first location is at a location on the first major surface furthest from locations having a local radius of curvature of 1 m or less; and
the second location is on a rounded corner adjacent to the first major surface.

Aspect 11. The glass part of any one of aspects 1-10, further comprising a compressive stress region extending from the first major surface to a first depth of compression, a maximum compressive stress of the first compressive stress region is from greater than or equal to 500 MegaPascals to less than or equal to 1,500 MegaPascals, and the depth of compression is greater than or equal to 10 micrometers.

Aspect 12. The glass part of any one of aspects 1-11, wherein:

the glass part comprises a second major surface facing away from the first major surface, a thickness orthogonal to the first major surface and the second major surface and extending therebetween, and the thickness for at least a portion of the part between the major surfaces is less than 2 millimeters;

the first major surface and the second major surface each have an area of at least 4 cm$^2$ the part has length and width aligned with the first major surface and the second major surfaces and orthogonal to one another, and the length is greater than the width;

a cross-sectional portion of the part between the first and second major surfaces extending along a 2 cm linear path varies in thickness less than 100 µm;

a curvature of at least a portion of the first major surface that comprises a radius of curvature of less than 1 m;

the glass has a dielectric constant $D_k$ at 10 GHz less than or equal to 6.8; and the glass part is an aluminosilicate glass, comprising in molar percentage on an oxide basis from greater than or equal to 40 mol % to less than or equal to 80 mol % $SiO_2$, from greater than or equal to 2 mol % to less than or equal to 30 mol % $Al_2O_3$, from greater than or equal to 5 mol % to less than or equal to 25 mol % $R_2O$, where $R_2O$ is a total amount of $Li_2O$, $Na_2O$, $K_2O$, $Cs_2O$, and $Rb_2O$.

Aspect 13. The glass part of aspect 12, wherein the thickness for the portion of the part is a first thickness and wherein the part comprises a second thickness that is greater than the first thickness, and the second thickness is located at least 1 cm away from the geometric centroid.

Aspect 14. The glass part of any one of aspects 12-13, wherein the aluminosilicate glass comprises a colorant selected from a group consisting of Au, Ag, $Cr_2O_3$, transition metal oxides, and rare earth metal oxides in an amount from greater than or equal to $1\times10^{-6}$ mol % to less than or equal to 10 mol % in the aluminosilicate glass on an oxide basis.

Aspect 15. The glass part of any one of aspects 12-14, wherein the glass part has an average total transmission of greater than 40% between wavelengths of 450 nm and 650 nm fully through the thickness of at least a portion of the glass part.

Aspect 16. The glass part of any one of aspects 12-14, further comprising a transmittance through at least a portion of the thickness with color coordinate in CIELAB color space of L* greater than or equal to 55 and less than or equal to 98.5, a* greater than or equal to −10 and less than or equal to 25, and b* greater than or equal to −20 and less than or equal to 5 under F2 illumination and a 10° standard observer angle.

Aspect 17. A glass part comprising: a first location on a first major surface; and a second location corresponding to a position of a maximum absolute value of a thermal gradient calculated by a thermal model of the glass part cooling from 500° C. to 25° C., wherein the first location corresponds to a position of a minimum absolute value of the thermal gradient by the thermal model for the same configuration that the maximum absolute value of the thermal gradient was identified, and wherein a first integral of a ratio of a quantity of a difference in Raman spectra of a second Raman spectrum at the second location (R2) minus a first Raman spectrum at the first location (R1) divided by a first scaling factor over wavenumbers from 300 cm$^{-1}$ to 500 cm$^{-1}$ $$\int_{300\,cm^{-1}}^{500\,cm^{-1}} \frac{R2(x) - R1(x)}{\max(|R2(a) - R1(a)|)} dx$$

is less than or equal to −70 cm$^{-1}$, where the first scaling factor $\max(|R2(\alpha)-R1(\alpha)|)$ is a maximum value of an absolute value between R2 and R1 at the same wavenumber $\alpha$ between 250 cm$^{-1}$ and 1600 cm$^{-1}$.

Aspect 18. The glass part of aspect 17, wherein the first integral is from greater than or equal to −160 cm$^{-1}$ to less than or equal to −100 cm$^{-1}$.

Aspect 19. The glass part of any one of aspects 17-18, wherein a second integral of the ratio of the quantity of the difference in Raman spectra of the second Raman spectrum at the second location (R2) minus the first Raman spectrum at the first location (R1) divided by the first scaling factor over wavenumbers from 1000 cm$^{-1}$ to 1200 cm$^{-1}$ $$\int_{1000\,cm^{-1}}^{1200\,cm^{-1}} \frac{R2(x) - R1(x)}{\max(|R2(a) - R1(a)|)} dx$$

is less than or equal to −10 cm$^{-1}$.

Aspect 20. The glass part of aspect 19, wherein the second integral is from greater than or equal to −50 cm$^{-1}$ to less than or equal to −15 cm$^{-1}$.

Aspect 21. The glass part of any one of aspect 17-20, further comprising a third location corresponds to an edge of the glass part article that is closer to the second location than the first location, wherein a third integral of a ratio of a quantity of a difference in Raman spectra of a third Raman spectrum at the third location (R3) minus a first Raman spectrum at the first location (R1) divided by a third scaling factor over wavenumbers from 300 cm$^{-1}$ to 500 cm$^{-1}$ $$\int_{300\,cm^{-1}}^{500\,cm^{-1}} \frac{R3(x) - R1(x)}{\max(|R3(a) - R1(a)|)} dx$$

is greater than or equal to 30 cm$^{-1}$, where the third scaling factor $\max(|R3(a)-R1(a)|)$ is a maximum value of an absolute value between R3 and R1 at the same wavenumber a between 250 cm$^{-1}$ and 1600 cm$^{-1}$.

Aspect 22. The glass part of aspect 21, wherein the third integral is from greater than or equal to 70 cm$^{-1}$ to less than or equal to 150 cm$^{-1}$.

Aspect 23. The glass part of aspect 21, wherein a second integral of the ratio of the quantity of the difference in Raman spectra of the second Raman spectrum at the second location (R3) minus the first Raman spectrum at the first location (R1) divided by the first scaling factor over wavenumbers from 1000 cm$^{-1}$ to 1200 cm$^{-1}$ $$\int_{1000\,cm^{-1}}^{1200\,cm^{-1}} \frac{R3(x) - R1(x)}{\max(|R3(a) - R1(a)|)} dx$$

is from greater than or equal to 1.0 cm$^{-1}$ to less than or equal to 30 cm$^{-1}$.

Aspect 24. The glass part of any one of aspects 21-23, wherein the glass part comprises a side wall, the side wall is positioned on a periphery of the part, the side wall extends at least 2 mm normal to at least a portion of the first major surface, and the third location is located at an outer periphery of the side wall.

Aspect 25. The glass part of aspect 24, wherein the side wall extends around a corner of the part, the corner is at least 1 cm from the geometric centroid, and the second location is positioned on the corner.

Aspect 26. The glass part of any one of aspects 17-25, wherein the first location corresponds to a center-of-geometry of the glass part.

Aspect 27. The glass part of any one of aspects 17-26, wherein the first location is at a location on the first major surface furthest from locations having a local radius of curvature of 1 m or less; and the second location is on a rounded corner adjacent to the first major surface.

Aspect 28. The glass part of any one of aspects 17-27, further comprising a compressive stress region extending from the first major surface to a first depth of compression, a maximum compressive stress of the first compressive stress region is from greater than or equal to 500 MegaPascals to less than or equal to 1,500 MegaPascals, and the depth of compression is greater than or equal to 10 micrometers.

Aspect 29. The glass part of any one of aspects 17-28, wherein:

the glass part comprises a second major surface facing away from the first major surface, a thickness orthogonal to the first major surface and the second major surface and extending therebetween, and the thickness for at least a portion of the part between the major surfaces is less than 2 millimeters;

the first major surface and the second major surface each have an area of at least 4 cm² the part has length and width aligned with the first major surface and the second major surfaces and orthogonal to one another, and the length is greater than the width;

a cross-sectional portion of the part between the first and second major surfaces extending along a 2 cm linear path varies in thickness less than 100 μm;

a curvature of at least a portion of the first major surface that comprises a radius of curvature of less than 1 m;

the glass has a dielectric constant $D_k$ at 10 GHz less than or equal to 6.8; and the glass part is an aluminosilicate glass, comprising in molar percentage on an oxide basis from greater than or equal to 40 mol % to less than or equal to 80 mol % $SiO_2$, from greater than or equal to 2 mol % to less than or equal to 30 mol % $Al_2O_3$, from greater than or equal to 5 mol % to less than or equal to 25 mol % $R_2O$, where $R_2O$ is a total amount of $Li_2O$, $Na_2O$, $K_2O$, $Cs_2O$, and $Rb_2O$.

Aspect 30. The glass part of aspect 29, wherein the thickness for the portion of the part is a first thickness and wherein the part comprises a second thickness that is greater than the first thickness, and the second thickness is located at least 1 cm away from the geometric centroid.

Aspect 31. The glass part of any one of aspects 29-30, wherein the aluminosilicate glass comprises a colorant selected from a group consisting of Au, Ag, $Cr_2O_3$, transition metal oxides, and rare earth metal oxides in an amount from greater than or equal to $1\times10^{-6}$ mol % to less than or equal to 10 mol % in the aluminosilicate glass on an oxide basis.

Aspect 32. The glass part of any one of aspects 29-31, wherein the glass part has an average total transmission of greater than 40% between wavelengths of 450 nm and 650 nm fully through the thickness of at least a portion of the glass part.

Aspect 33. The glass part of any one of aspects 29-31, further comprising a transmittance through at least a portion of the thickness with color coordinate in CIELAB color space of L* greater than or equal to 55 and less than or equal to 98.5, a* greater than or equal to −10 and less than or equal to 25, and b* greater than or equal to −20 and less than or equal to 5 under F2 illumination and a 10° standard observer angle.

Aspect 34. A glass part comprising: a first location at a center of geometry of a first major surface; and a second location at a location on a convex rounded corner adjacent to the first major surface, wherein differences in Raman spectrum between a second Raman spectrum at the second location minus a first Raman spectrum at the first location are consistent with the glass part having been formed by a gob-pressing method.

Aspect 35. The glass part of aspect 34, wherein a first integral of a ratio of a quantity of a difference in Raman spectra of a second Raman spectrum at the second location (R2) minus a first Raman spectrum at the first location (R1) divided by a first scaling factor over wavenumbers from 300 $cm^{-1}$ to 500 $cm^{-1}$ $$\int_{300\,cm^{-1}}^{500\,cm^{-1}} \frac{R2(x) - R1(x)}{\max(|R2(a) - R1(a)|)} dx$$

is less than or equal to −70 $cm^{-1}$, where the first scaling factor $\max(|R2(a)-R1(a)|)$ is a maximum value of an absolute value between R2 and R1 at the same wavenumber a between 250 $cm^{-1}$ and 1600 $cm^{-1}$.

Aspect 36. The glass part of aspect 35, wherein the first integral is from greater than or equal to −160 $cm^{-1}$ to less than or equal to −100 $cm^{-1}$.

Aspect 37. The glass part of any one of aspects 34-36, wherein a second integral of the ratio of the quantity of the difference in Raman spectra of the second Raman spectrum at the second location (R2) minus the first Raman spectrum at the first location (R1) divided by the first scaling factor over wavenumbers from 1000 $cm^{-1}$ to 1200 $cm^{-1}$ $$\int_{1000\,cm^{-1}}^{1200\,cm^{-1}} \frac{R2(x) - R1(x)}{\max(|R2(a) - R1(a)|)} dx$$

is less than or equal to −10 $cm^{-1}$.

Aspect 38. The glass part of aspect 37, wherein the second integral is from greater than or equal to −50 $cm^{-1}$ to less than or equal to −15 $cm^{-1}$.

Aspect 39. The glass part of any one of aspects 34-38, further comprising a third location corresponds to an edge of the glass part that is closer to the second location than the first location, wherein a third integral of a ratio of a quantity of a difference in Raman spectra of a third Raman spectrum at the third location (R3) minus a first Raman spectrum at the first location (R1) divided by a third scaling factor over wavenumbers from 300 $cm^{-1}$ to 500 $cm^{-1}$ $$\int_{300\,cm^{-1}}^{500\,cm^{-1}} \frac{R3(x) - R1(x)}{\max(|R3(a) - R1(a)|)} dx$$

is greater than or equal to 30 cm$^{-1}$, where the third scaling factor max(|R3($\alpha$)–R1($\alpha$)|) is a maximum value of an absolute value between R3 and R1 at the same wavenumber $\alpha$ between 250 cm$^{-1}$ and 1600 cm$^{-1}$.

Aspect 40. The glass part of aspect 39, wherein the third integral is from greater than or equal to 70 cm$^{-1}$ to less than or equal to 150 cm$^{-1}$.

Aspect 41. The glass part of aspect 39, wherein a second integral of the ratio of the quantity of the difference in Raman spectra of the second Raman spectrum at the second location (R3) minus the first Raman spectrum at the first location (R1) divided by the first scaling factor over wavenumbers from 1000 cm$^{-1}$ to 1200 cm$^{-1}$ $$\int_{1000\,cm^{-1}}^{1200\,cm^{-1}} \frac{R3(x) - R1(x)}{\max(|R3(a) - R1(a)|)} dx$$

is from greater than or equal to 1.0 cm$^{-1}$ to less than or equal to 30 cm$^{-1}$.

Aspect 42. The glass part of any one of aspects 39-41, wherein the glass part comprises a side wall, the side wall is positioned on a periphery of the part, the side wall extends at least 2 mm normal to at least a portion of the first major surface, and the third location is located at an outer periphery of the side wall.

Aspect 43. The glass part of aspect 42, wherein the side wall extends around a corner of the part, the corner is at least 1 cm from the geometric centroid, and the second location is positioned on the corner.

Aspect 44. The glass part of any one of aspects 34-43, wherein the first location corresponds to a center-of-geometry of the glass part.

Aspect 45. The glass part of any one of aspects 34-44, wherein: the first location is at a location on the first major surface furthest from locations having a local radius of curvature of 1 m or less; and the second location is on a rounded corner adjacent to the first major surface.

Aspect 46. The glass part of any one of aspects 34-45, further comprising a compressive stress region extending from the first major surface to a first depth of compression, a maximum compressive stress of the first compressive stress region is from greater than or equal to 500 MegaPascals to less than or equal to 1,500 MegaPascals, and the depth of compression is greater than or equal to 10 micrometers.

Aspect 47. The glass part of any one of aspects 34-46, wherein: the glass part comprises a second major surface facing away from the first major surface, a thickness orthogonal to the first major surface and the second major surface and extending therebetween, and the thickness for at least a portion of the part between the major surfaces is less than 2 millimeters; the first major surface and the second major surface each have an area of at least 4 cm$^2$, the part has length and width aligned with the first major surface and the second major surfaces and orthogonal to one another, and the length is greater than the width; a cross-sectional portion of the part between the first and second major surfaces extending along a 2 cm linear path varies in thickness less than 100 μm; a curvature of at least a portion of the first major surface that comprises a radius of curvature of less than 1 m; the glass has a dielectric constant D$_k$ at 10 GHz less than or equal to 6.8; and the glass part is an aluminosilicate glass, comprising in molar percentage on an oxide basis from greater than or equal to 40 mol % to less than or equal to 80 mol % SiO$_2$; from greater than or equal to 2 mol % to less than or equal to 30 mol % Al$_2$O$_3$; and from greater than or equal to 5 mol % to less than or equal to 25 mol % R$_2$O, where R$_2$O is a total amount of Li$_2$O, Na$_2$O, K$_2$O, Cs$_2$O, and Rb$_2$O.

Aspect 48. The glass part of aspect 47, wherein the thickness for the portion of the part is a first thickness and wherein the part comprises a second thickness that is greater than the first thickness, and the second thickness is located at least 1 cm away from the geometric centroid.

Aspect 49. The glass part of any one of aspects 47-48, wherein the aluminosilicate glass comprises a colorant selected from a group consisting of Au, Ag, Cr$_2$O$_3$, transition metal oxides, and rare earth metal oxides in an amount from greater than or equal to 1×10$^{-6}$ mol % to less than or equal to 10 mol % in the aluminosilicate glass on an oxide basis.

Aspect 50. The glass part of any one of aspects 47-49, wherein the glass part has an average total transmission of greater than 40% between wavelengths of 450 nm and 650 nm fully through the thickness of at least a portion of the glass part.

Aspect 51. The glass part of any one of aspects 47-49, further comprising a transmittance through at least a portion of the thickness with color coordinate in CIELAB color space of L* greater than or equal to 55 and less than or equal to 98.5, a* greater than or equal to −10 and less than or equal to 25, and b* greater than or equal to −20 and less than or equal to 5 under F2 illumination and a 10° standard observer angle.

Aspect 52. A glass part consistent with the glass part having been formed by a gob-pressing method.

What is claimed is:

1. A method of making a glass part, comprising:
gob-pressing a gob of molten glass to form the glass part,
wherein the gob-pressing comprises pressing the molten glass into a mold such that the gob spreads outward in the mold to form the molten glass to a shape of the glass part,
wherein the shape comprises first and second major surfaces facing away from one another and a thickness orthogonal to the first and second major surfaces and extending therebetween, and wherein the shape has a length and a width aligned with the first and second major surfaces and orthogonal to one another;
wherein the length of the shape is greater than the width;
wherein the first and second major surfaces each have an area of at least 4 cm$^2$;
wherein the thickness for at least a portion of the shape between the major surfaces is less than 2 mm;
wherein a cross-sectional portion of the shape between the first and second major surfaces extending along a 2 cm linear path varies in thickness less than 100 μm;
wherein the shape comprises curvature of at least a portion of surfaces thereof that comprises a radius of curvature of less than 1 m;
wherein the glass of the glass part is an aluminosilicate, comprising in molar percentage on an oxide basis at least 40 mol % silica and no more than 80 mol % silica, and at least 2 mol % alumina and no more than 30 mol % alumina;
wherein the glass of the part has a high modulus of elasticity such that the modulus is over 80 GPa,
wherein the glass has a dielectric constant D$_k$ at 10 GHz less than or equal to 6.8; and
wherein the glass is configured for chemical strengthening, comprising at least 5 mol % alkali metal oxides and no more than 25 mol % of the alkali metal oxides; and
coating the glass part, wherein the coating has a modulus of elasticity within 50 GPa of the modulus of elasticity of the glass of the part.

2. The method of claim 1, wherein the high modulus of elasticity of the glass is at least 100 GPa.

3. The method of claim 2, wherein the high modulus of elasticity of the glass is less than 150 GPa.

4. The method of claim 1, further comprising shaping the gob, during the conveying, to a dog-bone-shape such that the gob includes a central region attached to and extending between a first glass end and a second glass end.

5. The method of claim 1, further comprising chemically strengthening the glass of the glass part, wherein the glass has a surface compressive stress and a central tension.

6. The method of claim 5, wherein the glass part, after chemical strengthening, has a surface compressive stress of at least 300 MPa and a depth of compression of at least 10 μm.

7. The method of claim 1, further comprising heat treating the glass of the glass part to grow crystals therein, wherein the crystals comprise at least 50 vol % of the glass part and no more than 99 vol %.

8. The method of claim 7, wherein the crystals comprise lithium disilicate.

9. The method of claim 1, wherein the glass has an average total transmission of greater than 40% between wavelengths of 450 nm and 650 nm fully through the thickness.

10. The method of claim 1, wherein the shape comprises a side wall, wherein the side wall is positioned on a periphery of the shape, wherein the side wall extends at least 2 mm normal to at least a portion of the first and second major surfaces.

11. The method of claim 10, wherein the side wall extends around a corner of the shape, and wherein the corner is at least 1 cm from the geometric centroid.

12. The method of claim 1, wherein the glass comprises one or more colorants selected from the group consisting of Au, Ag, $Cr_2O_3$, transition metal oxides, and rare earth metal oxides.

13. The method of claim 12, wherein the glass comprises greater than $1 \times 10^{-6}$ mol % to no more than 10 mol % of the colorants on an oxide basis.

14. The method of claim 1, wherein the shape is rectangular and comprises rounded corners positioned at least 2 cm from the geometric centroid of the shape.

15. The method of claim 14, wherein the first and second major surfaces each have an area of at least 50 cm² and the thickness is less than 1.5 mm.

16. The method of claim 14, wherein the thickness is a first thickness and wherein the shape comprises a second thickness that is greater than the first thickness; and wherein the second thickness is located at least 1 cm away from the geometric centroid.

17. The method of claim 1, wherein the glass comprises at least 2 mol % lithia and a positive amount of soda.

18. A method of making a glass part, comprising:

gob-pressing a gob of molten glass to form the glass part, wherein the gob of molten glass has a viscosity of less than 1200 poise, wherein the viscosity is at least 10 poise;

wherein the gob-pressing comprises pressing the molten glass into a mold such that the gob spreads outward in the mold to form the molten glass to a shape of the glass part, wherein the shape comprises first and second major surfaces facing away from one another and a thickness orthogonal to the first and second major surfaces and extending therebetween, and wherein the shape has a length and a width aligned with the major surfaces and orthogonal to one another;

wherein the first and second major surfaces each have an area of at least 4 cm²;

wherein the thickness is less than 2 mm for at least a portion of the shape between the major surfaces;

wherein a cross-sectional portion of the shape between the first and second surfaces extending along 2 cm linear path varies in thickness less than 100 μm;

wherein the glass of the glass part is a silicate;

wherein the glass has an average total transmission of greater than 40% between wavelengths of 450 nm and 650 nm through the thickness;

wherein the glass has a modulus of elasticity of at least 100 GPa; and wherein the thickness is a first thickness and wherein the shape comprises a second thickness that is at least twice the first thickness.

19. The method of claim 18, further comprising heat treating the glass, subsequent to the gob-pressing, to grow crystals therein;

wherein the crystals are distributed within the glass of the glass part, and wherein a volume percent of crystals is less than 95% of the glass part; and wherein fracture toughness of the glass part is 1.0 $MPa \cdot m^{1/2}$ or more.

\* \* \* \* \*